US012198286B2

(12) United States Patent
Delgado et al.

(10) Patent No.: US 12,198,286 B2
(45) Date of Patent: *Jan. 14, 2025

(54) SYSTEMS AND METHODS FOR PROVIDING AUGMENTED MEDIA

(71) Applicant: SHOPIFY INC., Ottawa (CA)

(72) Inventors: Byron Leonel Delgado, Ottawa (CA); Stephan Leroux, East Gwillimbury (CA); Daniel Beauchamp, Toronto (CA)

(73) Assignee: SHOPIFY INC., Ottawa (CA)

( * ) Notice: Subject to any disclaimer, the term of this patent is extended or adjusted under 35 U.S.C. 154(b) by 0 days.

This patent is subject to a terminal disclaimer.

(21) Appl. No.: 18/308,324

(22) Filed: Apr. 27, 2023

(65) Prior Publication Data

US 2023/0260241 A1  Aug. 17, 2023

Related U.S. Application Data

(63) Continuation of application No. 17/591,780, filed on Feb. 3, 2022, now Pat. No. 11,670,065, which is a
(Continued)

(51) Int. Cl.
*G06T 19/20* (2011.01)
*G06F 16/9538* (2019.01)
(Continued)

(52) U.S. Cl.
CPC .......... *G06T 19/20* (2013.01); *G06F 16/9538* (2019.01); *G06T 19/003* (2013.01); *G06V 20/20* (2022.01); *G06Q 30/0643* (2013.01)

(58) Field of Classification Search
CPC ... G06T 19/20; G06T 19/003; G06F 16/9538; G06K 9/00671; G06Q 30/0643
See application file for complete search history.

(56) References Cited

U.S. PATENT DOCUMENTS 8,878,846 B1   11/2014   Francis, Jr. et al.
9,128,404 B2   9/2015    Higaki
(Continued)

FOREIGN PATENT DOCUMENTS

CN   104603865 A   5/2015
CN   106937531 A   7/2017
(Continued)

OTHER PUBLICATIONS

Busta, Hallie, "Three Augmented and Virtual Reality Apps for Design and Constructions," Aug. 27, 2015, architectMagazine.com. 5 pages. Accessed at https://www.architectmagazine.com/technology/products/three-augmented-and-virtual-reality-apps-for-design-and-construction_o.
(Continued)

*Primary Examiner* — Jitesh Patel

(57) ABSTRACT

The present disclosure relates, in part, to spatially aware media that includes three-dimensional (3D) spatial information pertaining to a real-world space. The spatially aware media may map this 3D spatial information to media such as an image, for example, to provide 3D spatial context for the media. This may allow users to more flexibly and efficiently interact with virtual content in real-world spaces that are relevant to them. According to one embodiment, spatially aware media is augmented to provide an image of a real-world space overlaid with a render of a 3D model defined relative to the 3D spatial features of the real-world space. Before augmenting the spatially aware media, a recommended position for the 3D model relative to the 3D spatial features of the real-world space may be determined based on the 3D model and/or on the spatially aware media.

20 Claims, 21 Drawing Sheets

Related U.S. Application Data continuation of application No. 17/082,216, filed on Oct. 28, 2020, now Pat. No. 11,276,247.

(51) Int. Cl.
*G06T 19/00* (2011.01)
*G06V 20/20* (2022.01)
*G06Q 30/0601* (2023.01)

(56) References Cited

U.S. PATENT DOCUMENTS

| | | | |
|---|---|---|---|
| 9,129,404 | B1 | 9/2015 | Wagner |
| 9,734,634 | B1 | 8/2017 | Mott et al. |
| 9,782,668 | B1* | 10/2017 | Golden .......... A63F 13/00 |
| 10,026,229 | B1 | 7/2018 | Yalniz et al. |
| 10,319,150 | B1 | 6/2019 | Canada et al. |
| 10,573,019 | B1 | 2/2020 | Anadure et al. |
| 11,276,247 | B1 | 3/2022 | Delgado et al. |
| 11,321,768 | B2 | 5/2022 | Beauchamp |
| 11,593,870 | B2 | 2/2023 | Delgado et al. |
| 11,842,385 | B2 | 12/2023 | Beauchamp |
| 2007/0116119 | A1* | 5/2007 | Wang ............ H04N 19/503 375/E7.181 |
| 2008/0071559 | A1 | 3/2008 | Arrasvuori |
| 2011/0258338 | A1 | 10/2011 | Vass |
| 2012/0120113 | A1 | 5/2012 | Hueso |
| 2012/0249416 | A1 | 10/2012 | Maciocci et al. |
| 2013/0259308 | A1 | 10/2013 | Klusza et al. |
| 2014/0132633 | A1 | 5/2014 | Fekete et al. |
| 2015/0170260 | A1 | 6/2015 | Lees et al. |
| 2015/0332509 | A1 | 11/2015 | Jovanovic |
| 2017/0132841 | A1 | 5/2017 | Morrison |
| 2017/0132842 | A1* | 5/2017 | Morrison .......... G06F 3/04815 |
| 2017/0161404 | A1 | 6/2017 | High et al. |
| 2017/0323488 | A1 | 11/2017 | Mott et al. |
| 2018/0132841 | A1 | 5/2018 | Dreyfuss |
| 2018/0268615 | A1 | 9/2018 | Smet et al. |
| 2018/0330544 | A1 | 11/2018 | Corso et al. |
| 2019/0197599 | A1* | 6/2019 | Zia .............. G06Q 30/0631 |
| 2019/0371060 | A1* | 12/2019 | Energin ........... G06T 19/003 |
| 2020/0202419 | A1 | 6/2020 | Beauchamp |
| 2020/0258144 | A1 | 8/2020 | Chaturvedi et al. |
| 2022/0129974 | A1 | 4/2022 | Delgado et al. |
| 2022/0157035 | A1 | 5/2022 | Delgado et al. |
| 2022/0222741 | A1 | 7/2022 | Beauchamp |
| 2024/0013288 | A1 | 1/2024 | Beauchamp |

FOREIGN PATENT DOCUMENTS

| | | |
|---|---|---|
| CN | 107783648 A | 3/2018 |
| CN | 108475118 A | 8/2018 |
| CN | 108604118 A | 9/2018 |
| WO | 2013063299 A1 | 5/2013 |
| WO | 2016077798 A1 | 5/2016 |
| WO | 2017177019 A1 | 10/2017 |

OTHER PUBLICATIONS

Motti, Judy, "Wayfair advances AR strategy with mobile app 3D feature", Dec. 12, 2017, retailCustomerExperience. 4 pages. Accessed at https://www.retailcustomerexperience.com/articles/wayfair-advances-ar-strategy-with-mobile-app-3d-feature/.

Satkin, Scott, et al., "3DNN: 3D Nearest Neighbor," International Journal of Computer Vision, vol. 111, Kluwer Academic Publishers, Norwell, U.S. Jul. 22, 2014, pp. 69-97.

Weiss, Tomer, et al., "Automated Layout Synthesis and Visualization from Images of Interior or Exterior Spaces," 2017, IEEE Conference on Computer Vision and Pattern Recognition Workshops (CVPRW), IEEE, Jul. 21, 2017, pp. 41-47.

Szeliski, Richard, "Computer Vision: Algorithms and Applications (Chapter 4: Feature detection and matching)", Sep. 3, 2010, pp. 205-266.

Ong, Thuy. "Amazon's app now lets you place items inside your home using AR / Following in Ikea and Target's footsteps". Nov. 1, 2017. Accessed Apr. 18, 2024, from https://www.theverge.com/2017/11/1/16590160/amazon-furniture-placement-ar-feature-too. 5 pages.

* cited by examiner

SYSTEMS AND METHODS FOR PROVIDING AUGMENTED MEDIA

CROSS-REFERENCE TO RELATED APPLICATIONS

This application is a continuation of U.S. patent application Ser. No. 17/591,780, entitled "Systems and Methods for Providing Augmented Media", which was filed on Feb. 3, 2022, and which in turn is a continuation of U.S. patent application Ser. No. 17/082,216, entitled "Systems and Methods for Providing Augmented Media", which was filed on Oct. 28, 2020. The contents of each of the above-noted applications are incorporated herein by reference in their entirety.

FIELD

The present application relates to augmented media and, in particular embodiments, to providing augmented media.

BACKGROUND

AR relates to the enhancement of real-world experiences using computer-generated or virtual content. In some cases, AR involves superimposing virtual content over physical real-world content. This superposition can be either constructive or destructive. Constructive AR adds content to a real-world experience, whereas destructive AR masks content in a real-world experience. AR differs from virtual reality (VR). VR relates to the creation of a completely virtual experience, whereas AR maintains at least a portion of the real-world experience, but alters the perception of that real-world experience using virtual content.

SUMMARY

A limitation of conventional AR experiences is that a user typically needs to be physically present in a real-world space in order to augment that real-world space with virtual content. In some cases, however, a user might wish to augment and view a real-world space when the user is not present in that real-world space. Another limitation of conventional AR experiences is that they can typically only be viewed from one perspective at a time, but a user might benefit from viewing an AR experience from multiple different perspectives simultaneously. A further limitation of a conventional AR experience is that, once ended, the AR experience may need to be reinitialized by scanning a real-world space, for example.

Some aspects of the present disclosure relate to generating and storing "spatially aware media" that includes, for example, visual, audio and/or haptic content corresponding to a real-world space and information identifying three-dimensional (3D) spatial features of the real-world space. In some cases, spatially aware media can be augmented with virtual content to create virtual user experiences. Augmented spatially aware media, which is also referred to as augmented media herein, may be implemented to help overcome the aforementioned limitations of conventional AR experiences.

In some embodiments, spatially aware media corresponding to a particular real-world space may be stored on a server and accessed by a device from anywhere in the world. The spatially aware media may include an image of the real-world space and information identifying the 3D spatial features of the real-world space. Identifying the 3D spatial features of the real-world space may allow for virtual content to be generated and overlaid onto the image in a realistic manner, such that the virtual content may appear to be physically present in the real-world space. Because the spatially aware media can be accessed remotely, there is no need for the device to be physically present in the real-world space when augmenting the spatially aware media. The spatially aware media may also allow the device to view the augmented real-world space from multiple different perspectives at the same time. Further, and in contrast to AR experiences, the device may augment the same spatially aware media at different times without any need for reinitialization.

According to an aspect of the present disclosure, there is provided a computer-implemented method including obtaining results of a search query. The search query may originate from user input at a device associated with a user and the results may include a plurality of 3D models. Each of the plurality of 3D models may correspond to different products, for example. The method may also include obtaining stored media from memory, the stored media including an image of a real-world space and information identifying 3D spatial features of the real-world space. Optionally, the stored media also includes lighting information for the real-world space. The method may further include providing augmented media based on the stored media and on at least some of the plurality of 3D models. The provided augmented media could include multiple different instances of augmented media, the multiple different instances of augmented media each including at least a portion of the image of the real-world space overlaid with a render of a respective one of the at least some of the plurality of 3D models defined relative to the 3D spatial features. Optionally, the multiple different instances of augmented media are output for simultaneous display on the device.

In some embodiments, the image is a first image of the real-world space associated with the user from a first perspective, the stored media further includes a second image of the real-world space associated with the user from a second perspective, and the provided augmented media includes further different instances of augmented media each including at least a portion of the second image of the real-world space overlaid with a render of a respective one of the at least some of the plurality of 3D models defined relative to the 3D spatial features.

In some embodiments, providing the augmented media includes rendering the at least some of the 3D models based on the first perspective and/or rendering the at least some of the 3D models based on the second perspective.

In some embodiments, the method further includes receiving, from the device, while the device is displaying a first instance of augmented media of the multiple different instances of augmented media, an instruction to virtually reposition a particular 3D model of the at least some of the plurality of 3D models relative to the 3D spatial features of the real-world space. This first instance of augmented media may include at least a portion of the first image of the real-world space overlaid with a render of the particular 3D model defined relative to the 3D spatial features. The method may then include redefining the particular 3D model relative to the 3D spatial features of the real-world space based on the instruction and providing an updated first instance of augmented media. The updated first instance of augmented media may include at least a portion of the first image overlaid with a first updated render of the particular 3D model redefined relative to the 3D spatial features of the real-world space. Additionally, the method may include receiving, from the device, an instruction to display an updated second instance of augmented media based on the second image, and providing the updated second instance of augmented media including at least a portion of the second image overlaid with a second updated render of the particular 3D model redefined relative to the 3D spatial features of the real-world space.

In some embodiments, the stored media includes a video of the real-world space, the first image corresponding to a first frame of the video and the second image corresponding to a second frame of the video.

In some embodiments, the method further includes generating the stored media, which may be done in multiple different sessions. For example, generating the stored media may include identifying the 3D spatial features based on a 3D scan of the real-world space; capturing the first image of the real-world space; after capturing the first image, reinitializing the device within the 3D scan of the real-world space; and, after reinitializing the device, capturing the second image of the real-world space using the device. Reinitializing the device within the 3D scan of the real-world space may include determining a position of the device relative to the 3D spatial features.

In some embodiments, the image is captured by a further device, which may be the same as, or different from, the device associated with the search query. The stored media further may then include a position of the further device relative to the 3D spatial features when capturing the first image and camera parameters of the further device.

In some embodiments, the 3D spatial features of the real-world space include a surface within the real-world space. For each of the multiple different instances of augmented media, the respective one of the at least some of the plurality of 3D models is defined relative to the surface such that the render of the respective one of the at least some of the plurality of 3D models depicts a corresponding object resting on the surface.

Some aspects of the present disclosure relate to automatically determining a suitable position for a 3D model relative to the 3D spatial features of a real-world space defined by spatially aware media. The spatially aware media may then be augmented based on the determined position for the 3D model so as to depict an object represented by the 3D model at that position in the real-world space. This may enable a system to show virtual objects in contextually relevant locations within the real-world space, without any user input.

According to another aspect of the present disclosure, a computer-implemented method is provided that includes receiving, from a user device associated with a user, a request for a resource, and replying or responding to the request. The replying may include obtaining media including an image of a real-world space associated with the user and information identifying 3D spatial features of the real-world space, obtaining a 3D model of an object, and/or determining, based on at least one of the media and the 3D model, a recommended position for the 3D model relative to the 3D spatial features of the real-world space. The replying may further include instructing the user device to display the resource, the resource including augmented media in which at least a portion of the image is overlaid with a render of the 3D model defined at the position relative to the 3D spatial features.

In some embodiments, the 3D spatial features of the real-world space include a surface within the real-world space, the recommended position for the 3D model includes a coordinate on the surface, and the 3D model is defined relative to the surface such that the augmented media depicts the object resting on the surface.

In some embodiments, determining the recommended position for the 3D model relative to the 3D spatial features of the real-world space includes providing an input to a trained machine learning (ML) model, the input based on at least one of the media and the 3D model, and obtaining, based on an output of the ML model, the position for the 3D model relative to the 3D spatial features of the real-world space.

In some embodiments, the input to the ML model includes at least some of the information identifying the 3D spatial features of the real-world space. Here, the ML model may be trained using a training data set that includes information identifying 3D spatial features of a plurality of real-world spaces and user-defined positions of 3D models in those real-world spaces. These 3D models may include one or both of the 3D models and other 3D models similar to the 3D model. If the training data set includes only user-defined positions of the 3D model, then the ML model may be specific to the 3D model. Alternatively, if the training data set also or instead includes user-defined positions of the other 3D models similar to the 3D model, then the ML model may be specific to a type of object. For example, all of the 3D models may represent the same type of object.

In some embodiments, the input to the ML model includes product information for the object. The ML model may be trained using a training data set, the training data set including product information for a plurality of objects and user-defined positions for corresponding 3D models relative to the 3D spatial features of the real-world space. Here, the ML model may be specific to the real-world space.

In some embodiments, the input to the ML model includes at least some of the information identifying the 3D spatial features of the real-world space associated with the user and product information for the object. The ML model may be trained using a training data set, the training data set including information identifying 3D spatial features of a plurality of real-world spaces, product information for a plurality of objects, and user-defined positions of corresponding 3D models in those real-world spaces. For example, the ML model may be generalized for multiple real-world spaces and/or objects.

In some embodiments, the position for the 3D model overlaps with a particular 3D spatial feature of the real-world space and the particular 3D spatial feature is removed in the augmented media. Here, the information may further identify the particular 3D spatial feature as moveable. The particular 3D spatial feature may help determine the position for the 3D model. For example, determining the recommended position for the 3D model relative to the 3D spatial features of the real-world space may include determining that the particular 3D spatial feature of the real-world space relates to the object and determining the recommended position for the 3D model based on a position of the particular 3D spatial feature relative to the other 3D spatial features of the real-world space.

According to yet another aspect of the present disclosure, there is provided a system including memory to store information such as media, spatial information, user-defined positions, instructions, and models, for example, and one or more processors configured to perform any method disclosed herein.

According to a further aspect of the present disclosure, there is provided a non-transitory computer readable medium storing computer executable instructions which, when executed by a computer, cause the computer to perform any method disclosed herein.

BRIEF DESCRIPTION OF THE DRAWINGS

Embodiments will be described, by way of example only, with reference to the accompanying figures wherein.

DETAILED DESCRIPTION

For illustrative purposes, specific example embodiments will now be explained in greater detail below in conjunction with the figures.

Example e-Commerce Platform

In some embodiments, the methods disclosed herein may be performed on or in association with a commerce platform, which will be referred to herein as an e-commerce platform. Therefore, an example of an e-commerce platform will be described.

Figure 1:
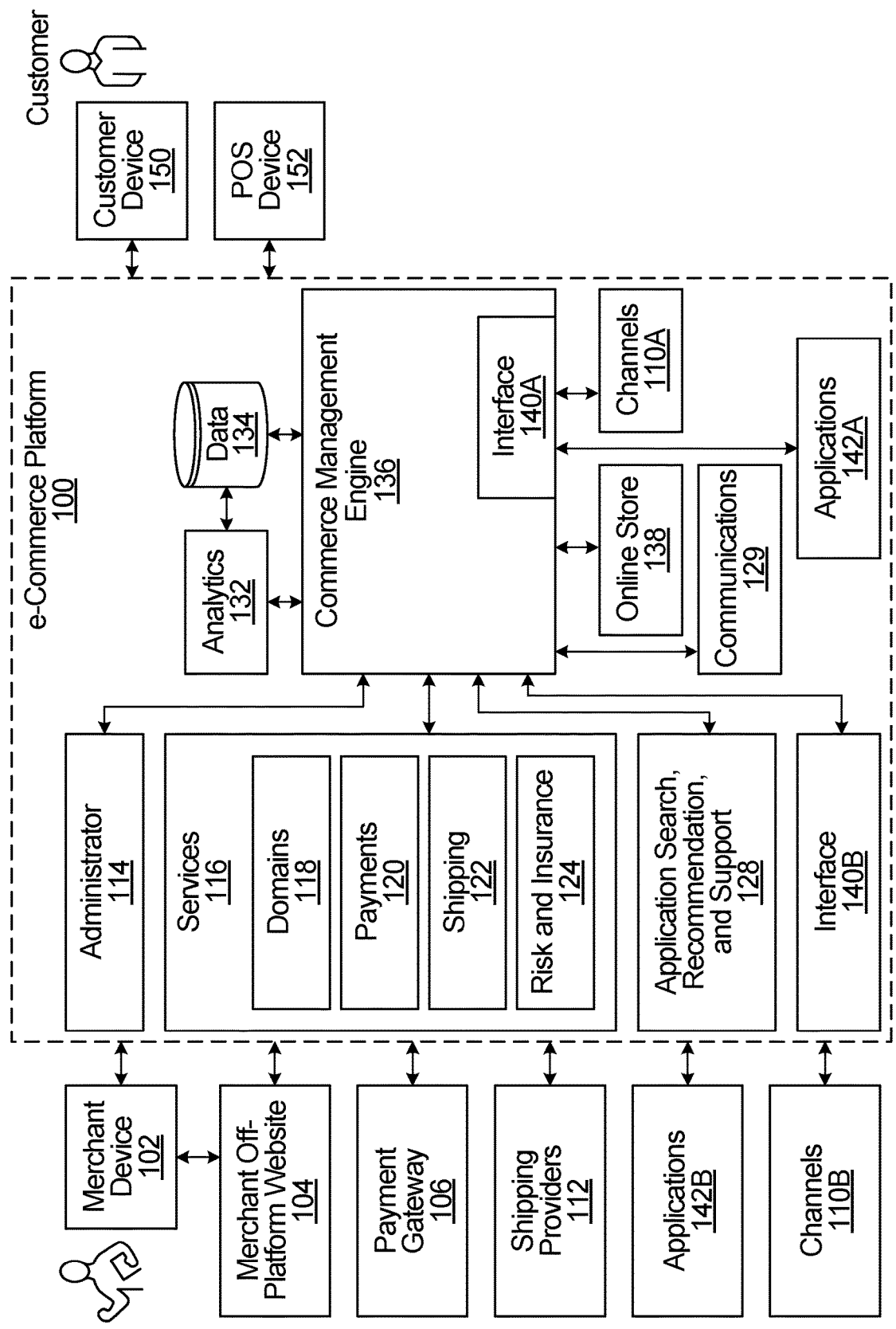
FIG. 1 is a block diagram of an e-commerce platform, according to an embodiment.

FIG. 1 illustrates an e-commerce platform 100, according to one embodiment. The e-commerce platform 100 may be used to provide merchant products and services to customers. While the disclosure contemplates using the apparatus, system, and process to purchase products and services, for simplicity the description herein will refer to products. All references to products throughout this disclosure should also be understood to be references to products and/or services, including physical products, digital content, tickets, subscriptions, services to be provided, and the like.

While the disclosure throughout contemplates that a 'merchant' and a 'customer' may be more than individuals, for simplicity the description herein may generally refer to merchants and customers as such. All references to merchants and customers throughout this disclosure should also be understood to be references to groups of individuals, companies, corporations, computing entities, and the like, and may represent for-profit or not-for-profit exchange of products. Further, while the disclosure throughout refers to 'merchants' and 'customers', and describes their roles as such, the e-commerce platform 100 should be understood to more generally support users in an e-commerce environment, and all references to merchants and customers throughout this disclosure should also be understood to be references to users, such as where a user is a merchant-user (e.g., a seller, retailer, wholesaler, or provider of products), a customer-user (e.g., a buyer, purchase agent, or user of products), a prospective user (e.g., a user browsing and not yet committed to a purchase, a user evaluating the e-commerce platform 100 for potential use in marketing and selling products, and the like), a service provider user (e.g., a shipping provider 112, a financial provider, and the like), a company or corporate user (e.g., a company representative for purchase, sales, or use of products; an enterprise user; a customer relations or customer management agent, and the like), an information technology user, a computing entity user (e.g., a computing bot for purchase, sales, or use of products), and the like.

The e-commerce platform 100 may provide a centralized system for providing merchants with online resources and facilities for managing their business. The facilities described herein may be deployed in part or in whole through a machine that executes computer software, modules, program codes, and/or instructions on one or more processors which may be part of or external to the platform 100. Merchants may utilize the e-commerce platform 100 for managing commerce with customers, such as by implementing an e-commerce experience with customers through an online store 138, through channels 110A-B, through POS devices 152 in physical locations (e.g., a physical storefront or other location such as through a kiosk, terminal, reader, printer, 3D printer, and the like), by managing their business through the e-commerce platform 100, and by interacting with customers through a communications facility 129 of the e-commerce platform 100, or any combination thereof. A merchant may utilize the e-commerce platform 100 as a sole commerce presence with customers, or in conjunction with other merchant commerce facilities, such as through a physical store (e.g., 'brick-and-mortar' retail stores), a merchant off-platform website 104 (e.g., a commerce Internet website or other internet or web property or asset supported by or on behalf of the merchant separately from the e-commerce platform), and the like. However, even these 'other' merchant commerce facilities may be incorporated into the e-commerce platform, such as where POS devices 152 in a physical store of a merchant are linked into the e-commerce platform 100, where a merchant off-platform website 104 is tied into the e-commerce platform 100, such as through 'buy buttons' that link content from the merchant off platform website 104 to the online store 138, and the like.

The online store 138 may represent a multitenant facility comprising a plurality of virtual storefronts. In embodiments, merchants may manage one or more storefronts in the online store 138, such as through a merchant device 102

(e.g., computer, laptop computer, mobile computing device, and the like), and offer products to customers through a number of different channels 110A-B (e.g., an online store 138; a physical storefront through a POS device 152; electronic marketplace, through an electronic buy button integrated into a website or social media channel such as on a social network, social media page, social media messaging system; and the like). A merchant may sell across channels 110A-B and then manage their sales through the e-commerce platform 100, where channels 110A may be provided internal to the e-commerce platform 100 or from outside the e-commerce channel 110B. A merchant may sell in their physical retail store, at pop ups, through wholesale, over the phone, and the like, and then manage their sales through the e-commerce platform 100. A merchant may employ all or any combination of these, such as maintaining a business through a physical storefront utilizing POS devices 152, maintaining a virtual storefront through the online store 138, and utilizing a communication facility 129 to leverage customer interactions and analytics 132 to improve the probability of sales. Throughout this disclosure the terms online store 138 and storefront may be used synonymously to refer to a merchant's online e-commerce offering presence through the e-commerce platform 100, where an online store 138 may refer to the multitenant collection of storefronts supported by the e-commerce platform 100 (e.g., for a plurality of merchants) or to an individual merchant's storefront (e.g., a merchant's online store).

In some embodiments, a customer may interact through a customer device 150 (e.g., computer, laptop computer, mobile computing device, and the like), a POS device 152 (e.g., retail device, a kiosk, an automated checkout system, and the like), or any other commerce interface device known in the art. The e-commerce platform 100 may enable merchants to reach customers through the online store 138, through POS devices 152 in physical locations (e.g., a merchant's storefront or elsewhere), to promote commerce with customers through dialog via electronic communication facility 129, and the like, providing a system for reaching customers and facilitating merchant services for the real or virtual pathways available for reaching and interacting with customers.

In some embodiments, and as described further herein, the e-commerce platform 100 may be implemented through a processing facility including a processor and a memory, the processing facility storing a set of instructions that, when executed, cause the e-commerce platform 100 to perform the e-commerce and support functions as described herein. The processing facility may be part of a server, client, network infrastructure, mobile computing platform, cloud computing platform, stationary computing platform, or other computing platform, and provide electronic connectivity and communications between and amongst the electronic components of the e-commerce platform 100, merchant devices 102, payment gateways 106, application developers, channels 110A-B, shipping providers 112, customer devices 150, point of sale devices 152, and the like. The e-commerce platform 100 may be implemented as a cloud computing service, a software as a service (SaaS), infrastructure as a service (IaaS), platform as a service (PaaS), desktop as a Service (DaaS), managed software as a service (MSaaS), mobile backend as a service (MBaaS), information technology management as a service (ITMaaS), and the like, such as in a software and delivery model in which software is licensed on a subscription basis and centrally hosted (e.g., accessed by users using a client (for example, a thin client) via a web browser or other application, accessed through by POS devices, and the like). In some embodiments, elements of the e-commerce platform 100 may be implemented to operate on various platforms and operating systems, such as iOS, Android, on the web, and the like (e.g., the administrator 114 being implemented in multiple instances for a given online store for iOS, Android, and for the web, each with similar functionality).

In some embodiments, the online store 138 may be served to a customer device 150 through a webpage provided by a server of the e-commerce platform 100. The server may receive a request for the webpage from a browser or other application installed on the customer device 150, where the browser (or other application) connects to the server through an IP Address, the IP address obtained by translating a domain name. In return, the server sends back the requested webpage. Webpages may be written in or include Hypertext Markup Language (HTML), template language, JavaScript, and the like, or any combination thereof. For instance, HTML is a computer language that describes static information for the webpage, such as the layout, format, and content of the webpage. Website designers and developers may use the template language to build webpages that combine static content, which is the same on multiple pages, and dynamic content, which changes from one page to the next. A template language may make it possible to re-use the static elements that define the layout of a webpage, while dynamically populating the page with data from an online store. The static elements may be written in HTML, and the dynamic elements written in the template language. The template language elements in a file may act as placeholders, such that the code in the file is compiled and sent to the customer device 150 and then the template language is replaced by data from the online store 138, such as when a theme is installed. The template and themes may consider tags, objects, and filters. The client device web browser (or other application) then renders the page accordingly.

In some embodiments, online stores 138 may be served by the e-commerce platform 100 to customers, where customers can browse and purchase the various products available (e.g., add them to a cart, purchase immediately through a buy-button, and the like). Online stores 138 may be served to customers in a transparent fashion without customers necessarily being aware that it is being provided through the e-commerce platform 100 (rather than directly from the merchant). Merchants may use a merchant configurable domain name, a customizable HTML theme, and the like, to customize their online store 138. Merchants may customize the look and feel of their website through a theme system, such as where merchants can select and change the look and feel of their online store 138 by changing their theme while having the same underlying product and business data shown within the online store's product hierarchy. Themes may be further customized through a theme editor, a design interface that enables users to customize their website's design with flexibility. Themes may also be customized using theme-specific settings that change aspects, such as specific colors, fonts, and pre-built layout schemes. The online store may implement a content management system for website content. Merchants may author blog posts or static pages and publish them to their online store 138, such as through blogs, articles, and the like, as well as configure navigation menus. Merchants may upload images (e.g., for products), video, content, data, and the like to the e-commerce platform 100, such as for storage by the system (e.g. as data 134). In some embodiments, the e-commerce platform 100 may provide functions for resizing images, associating an image with a product, adding and associating text with an image, adding an image for a new product variant, protecting images, and the like.

As described herein, the e-commerce platform 100 may provide merchants with transactional facilities for products through a number of different channels 110A-B, including the online store 138, over the telephone, as well as through physical POS devices 152 as described herein. The e-commerce platform 100 may include business support services 116, an administrator 114, and the like associated with running an on-line business, such as providing a domain service 118 associated with their online store, payment services 120 for facilitating transactions with a customer, shipping services 122 for providing customer shipping options for purchased products, risk and insurance services 124 associated with product protection and liability, merchant billing, and the like. Services 116 may be provided via the e-commerce platform 100 or in association with external facilities, such as through a payment gateway 106 for payment processing, shipping providers 112 for expediting the shipment of products, and the like.

In some embodiments, the e-commerce platform 100 may provide for integrated shipping services 122 (e.g., through an e-commerce platform shipping facility or through a third-party shipping carrier), such as providing merchants with real-time updates, tracking, automatic rate calculation, bulk order preparation, label printing, and the like.

Figure 2:
FIG. 2 is an example of a home page of an administrator, according to an embodiment.

FIG. 2 depicts a non-limiting embodiment for a home page of an administrator 114, which may show information about daily tasks, a store's recent activity, and the next steps a merchant can take to build their business. In some embodiments, a merchant may log in to administrator 114 via a merchant device 102 such as from a desktop computer or mobile device, and manage aspects of their online store 138, such as viewing the online store's 138 recent activity, updating the online store's 138 catalog, managing orders, recent visits activity, total orders activity, and the like. In some embodiments, the merchant may be able to access the different sections of administrator 114 by using the sidebar, such as shown on FIG. 2. Sections of the administrator 114 may include various interfaces for accessing and managing core aspects of a merchant's business, including orders, products, customers, available reports and discounts. The administrator 114 may also include interfaces for managing sales channels for a store including the online store, mobile application(s) made available to customers for accessing the store (Mobile App), POS devices, and/or a buy button. The administrator 114 may also include interfaces for managing applications (Apps) installed on the merchant's account; settings applied to a merchant's online store 138 and account. A merchant may use a search bar to find products, pages, or other information. Depending on the device 102 or software application the merchant is using, they may be enabled for different functionality through the administrator 114. For instance, if a merchant logs in to the administrator 114 from a browser, they may be able to manage all aspects of their online store 138. If the merchant logs in from their mobile device (e.g. via a mobile application), they may be able to view all or a subset of the aspects of their online store 138, such as viewing the online store's 138 recent activity, updating the online store's 138 catalog, managing orders, and the like.

More detailed information about commerce and visitors to a merchant's online store 138 may be viewed through acquisition reports or metrics, such as displaying a sales summary for the merchant's overall business, specific sales and engagement data for active sales channels, and the like. Reports may include, acquisition reports, behavior reports, customer reports, finance reports, marketing reports, sales reports, custom reports, and the like. The merchant may be able to view sales data for different channels 110A-B from different periods of time (e.g., days, weeks, months, and the like), such as by using drop-down menus. An overview dashboard may be provided for a merchant that wants a more detailed view of the store's sales and engagement data. An activity feed in the home metrics section may be provided to illustrate an overview of the activity on the merchant's account. For example, by clicking on a 'view all recent activity' dashboard button, the merchant may be able to see a longer feed of recent activity on their account. A home page may show notifications about the merchant's online store 138, such as based on account status, growth, recent customer activity, and the like. Notifications may be provided to assist a merchant with navigating through a process, such as capturing a payment, marking an order as fulfilled, archiving an order that is complete, and the like.

The e-commerce platform 100 may provide for a communications facility 129 and associated merchant interface for providing electronic communications and marketing, such as utilizing an electronic messaging aggregation facility for collecting and analyzing communication interactions between merchants, customers, merchant devices 102, customer devices 150, POS devices 152, and the like, to aggregate and analyze the communications, such as for increasing the potential for providing a sale of a product, and the like. For instance, a customer may have a question related to a product, which may produce a dialog between the customer and the merchant (or automated processor-based agent representing the merchant), where the communications facility 129 analyzes the interaction and provides analysis to the merchant on how to improve the probability for a sale.

The e-commerce platform 100 may provide a financial facility 120 for secure financial transactions with customers, such as through a secure card server environment. The e-commerce platform 100 may store credit card information, such as in payment card industry data (PCI) environments (e.g., a card server), to reconcile financials, bill merchants, perform automated clearing house (ACH) transfers between an e-commerce platform 100 financial institution account and a merchant's back account (e.g., when using capital), and the like. These systems may have Sarbanes-Oxley Act (SOX) compliance and a high level of diligence required in their development and operation. The financial facility 120 may also provide merchants with financial support, such as through the lending of capital (e.g., lending funds, cash advances, and the like) and provision of insurance. In addition, the e-commerce platform 100 may provide for a set of marketing and partner services and control the relationship between the e-commerce platform 100 and partners. They also may connect and onboard new merchants with the e-commerce platform 100. These services may enable merchant growth by making it easier for merchants to work across the e-commerce platform 100. Through these services, merchants may be provided help facilities via the e-commerce platform 100.

In some embodiments, online store 138 may support a great number of independently administered storefronts and process a large volume of transactional data on a daily basis for a variety of products. Transactional data may include customer contact information, billing information, shipping information, information on products purchased, information on services rendered, and any other information associated with business through the e-commerce platform 100. In some embodiments, the e-commerce platform 100 may store this data in a data facility 134. The transactional data may be processed to produce analytics 132, which in turn may be provided to merchants or third-party commerce entities, such as providing consumer trends, marketing and sales insights, recommendations for improving sales, evaluation of customer behaviors, marketing and sales modeling, trends in fraud, and the like, related to online commerce, and provided through dashboard interfaces, through reports, and the like. The e-commerce platform 100 may store information about business and merchant transactions, and the data facility 134 may have many ways of enhancing, contributing, refining, and extracting data, where over time the collected data may enable improvements to aspects of the e-commerce platform 100.

Referring again to FIG. 1, in some embodiments the e-commerce platform 100 may be configured with a commerce management engine 136 for content management, task automation and data management to enable support and services to the plurality of online stores 138 (e.g., related to products, inventory, customers, orders, collaboration, suppliers, reports, financials, risk and fraud, and the like), but be extensible through applications 142A-B that enable greater flexibility and custom processes required for accommodating an ever-growing variety of merchant online stores, POS devices, products, and services, where applications 142A may be provided internal to the e-commerce platform 100 or applications 142B from outside the e-commerce platform 100. In some embodiments, an application 142A may be provided by the same party providing the platform 100 or by a different party. In some embodiments, an application 142B may be provided by the same party providing the platform 100 or by a different party. The commerce management engine 136 may be configured for flexibility and scalability through portioning (e.g., sharding) of functions and data, such as by customer identifier, order identifier, online store identifier, and the like. The commerce management engine 136 may accommodate store-specific business logic and in some embodiments, may incorporate the administrator 114 and/or the online store 138.

The commerce management engine 136 includes base or "core" functions of the e-commerce platform 100, and as such, as described herein, not all functions supporting online stores 138 may be appropriate for inclusion. For instance, functions for inclusion into the commerce management engine 136 may need to exceed a core functionality threshold through which it may be determined that the function is core to a commerce experience (e.g., common to a majority of online store activity, such as across channels, administrator interfaces, merchant locations, industries, product types, and the like), is re-usable across online stores 138 (e.g., functions that can be re-used/modified across core functions), limited to the context of a single online store 138 at a time (e.g., implementing an online store 'isolation principle', where code should not be able to interact with multiple online stores 138 at a time, ensuring that online stores 138 cannot access each other's data), provide a transactional workload, and the like. Maintaining control of what functions are implemented may enable the commerce management engine 136 to remain responsive, as many required features are either served directly by the commerce management engine 136 or enabled through an interface 140A-B, such as by its extension through an application programming interface (API) connection to applications 142A-B and channels 110A-B, where interfaces 140A may be provided to applications 142A and/or channels 110A inside the e-commerce platform 100 or through interfaces 140B provided to applications 142B and/or channels 110B outside the e-commerce platform 100. Generally, the platform 100 may include interfaces 140A-B (which may be extensions, connectors, APIs, and the like) which facilitate connections to and communications with other platforms, systems, software, data sources, code and the like. Such interfaces 140A-B may be an interface 140A of the commerce management engine 136 or an interface 140B of the platform 100 more generally. If care is not given to restricting functionality in the commerce management engine 136, responsiveness could be compromised, such as through infrastructure degradation through slow databases or non-critical backend failures, through catastrophic infrastructure failure such as with a data center going offline, through new code being deployed that takes longer to execute than expected, and the like. To prevent or mitigate these situations, the commerce management engine 136 may be configured to maintain responsiveness, such as through configuration that utilizes timeouts, queues, back-pressure to prevent degradation, and the like.

Although isolating online store data is important to maintaining data privacy between online stores 138 and merchants, there may be reasons for collecting and using cross-store data, such as for example, with an order risk assessment system or a platform payment facility, both of which require information from multiple online stores 138 to perform well. In some embodiments, rather than violating the isolation principle, it may be preferred to move these components out of the commerce management engine 136 and into their own infrastructure within the e-commerce platform 100.

In some embodiments, the e-commerce platform 100 may provide for a platform payment facility 120, which is another example of a component that utilizes data from the commerce management engine 136 but may be located outside so as to not violate the isolation principle. The platform payment facility 120 may allow customers interacting with online stores 138 to have their payment information stored safely by the commerce management engine 136 such that they only have to enter it once. When a customer visits a different online store 138, even if they've never been there before, the platform payment facility 120 may recall their information to enable a more rapid and correct check out. This may provide a cross-platform network effect, where the e-commerce platform 100 becomes more useful to its merchants as more merchants join, such as because there are more customers who checkout more often because of the ease of use with respect to customer purchases. To maximize the effect of this network, payment information for a given customer may be retrievable from an online store's checkout, allowing information to be made available globally across online stores 138. It would be difficult and error prone for each online store 138 to be able to connect to any other online store 138 to retrieve the payment information stored there. As a result, the platform payment facility may be implemented external to the commerce management engine 136.

For those functions that are not included within the commerce management engine 136, applications 142A-B provide a way to add features to the e-commerce platform 100. Applications 142A-B may be able to access and modify data on a merchant's online store 138, perform tasks through the administrator 114, create new flows for a merchant through a user interface (e.g., that is surfaced through extensions/API), and the like. Merchants may be enabled to discover and install applications 142A-B through application search, recommendations, and support 128. In some embodiments, core products, core extension points, applications, and the administrator 114 may be developed to work together. For instance, application extension points may be built inside the administrator 114 so that core features may be extended by way of applications, which may deliver functionality to a merchant through the extension.

In some embodiments, applications 142A-B may deliver functionality to a merchant through the interface 140A-B, such as where an application 142A-B is able to surface transaction data to a merchant (e.g., App: "Engine, surface my app data in mobile and web admin using the embedded app SDK"), and/or where the commerce management engine 136 is able to ask the application to perform work on demand (Engine: "App, give me a local tax calculation for this checkout").

Applications 142A-B may support online stores 138 and channels 110A-B, provide for merchant support, integrate with other services, and the like. Where the commerce management engine 136 may provide the foundation of services to the online store 138, the applications 142A-B may provide a way for merchants to satisfy specific and sometimes unique needs. Different merchants will have different needs, and so may benefit from different applications 142A-B. Applications 142A-B may be better discovered through the e-commerce platform 100 through development of an application taxonomy (categories) that enable applications to be tagged according to a type of function it performs for a merchant; through application data services that support searching, ranking, and recommendation models; through application discovery interfaces such as an application store, home information cards, an application settings page; and the like.

Applications 142A-B may be connected to the commerce management engine 136 through an interface 140A-B, such as utilizing APIs to expose the functionality and data available through and within the commerce management engine 136 to the functionality of applications (e.g., through REST, GraphQL, and the like). For instance, the e-commerce platform 100 may provide API interfaces 140A-B to merchant and partner-facing products and services, such as including application extensions, process flow services, developer-facing resources, and the like. With customers more frequently using mobile devices for shopping, applications 142A-B related to mobile use may benefit from more extensive use of APIs to support the related growing commerce traffic. The flexibility offered through use of applications and APIs (e.g., as offered for application development) enable the e-commerce platform 100 to better accommodate new and unique needs of merchants (and internal developers through internal APIs) without requiring constant change to the commerce management engine 136, thus providing merchants what they need when they need it. For instance, shipping services 122 may be integrated with the commerce management engine 136 through a shipping or carrier service API, thus enabling the e-commerce platform 100 to provide shipping service functionality without directly impacting code running in the commerce management engine 136.

Many merchant problems may be solved by letting partners improve and extend merchant workflows through application development, such as problems associated with back-office operations (merchant-facing applications 142A-B) and in the online store 138 (customer-facing applications 142A-B). As a part of doing business, many merchants will use mobile and web related applications on a daily basis for back-office tasks (e.g., merchandising, inventory, discounts, fulfillment, and the like) and online store tasks (e.g., applications related to their online shop, for flash-sales, new product offerings, and the like), where applications 142A-B, through extension/API 140A-B, help make products easy to view and purchase in a fast growing marketplace. In some embodiments, partners, application developers, internal applications facilities, and the like, may be provided with a software development kit (SDK), such as through creating a frame within the administrator 114 that sandboxes an application interface. In some embodiments, the administrator 114 may not have control over nor be aware of what happens within the frame. The SDK may be used in conjunction with a user interface kit to produce interfaces that mimic the look and feel of the e-commerce platform 100, such as acting as an extension of the commerce management engine 136.

Applications 142A-B that utilize APIs may pull data on demand, but often they also need to have data pushed when updates occur. Update events may be implemented in a subscription model, such as for example, customer creation, product changes, or order cancelation. Update events may provide merchants with needed updates with respect to a changed state of the commerce management engine 136, such as for synchronizing a local database, notifying an external integration partner, and the like. Update events may enable this functionality without having to poll the commerce management engine 136 all the time to check for updates, such as through an update event subscription. In some embodiments, when a change related to an update event subscription occurs, the commerce management engine 136 may post a request, such as to a predefined callback URL. The body of this request may contain a new state of the object and a description of the action or event. Update event subscriptions may be created manually, in the administrator facility 114, or automatically (e.g., via the API 140A-B). In some embodiments, update events may be queued and processed asynchronously from a state change that triggered them, which may produce an update event notification that is not distributed in real-time.

In some embodiments, the e-commerce platform 100 may provide application search, recommendation and support 128. Application search, recommendation and support 128 may include developer products and tools to aid in the development of applications, an application dashboard (e.g., to provide developers with a development interface, to administrators for management of applications, to merchants for customization of applications, and the like), facilities for installing and providing permissions with respect to providing access to an application 142A-B (e.g., for public access, such as where criteria must be met before being installed, or for private use by a merchant), application searching to make it easy for a merchant to search for applications 142A-B that satisfy a need for their online store 138, application recommendations to provide merchants with suggestions on how they can improve the user experience through their online store 138, a description of core application capabilities within the commerce management engine 136, and the like. These support facilities may be utilized by application development performed by any entity, including the merchant developing their own application 142A-B, a third-party developer developing an application 142A-B (e.g., contracted by a merchant, developed on their own to offer to the public, contracted for use in association with the e-commerce platform 100, and the like), or an application 142A or 142B being developed by internal personal resources associated with the e-commerce platform 100. In some embodiments, applications 142A-B may be assigned an application identifier (ID), such as for linking to an application (e.g., through an API), searching for an application, making application recommendations, and the like.

The commerce management engine 136 may include base functions of the e-commerce platform 100 and expose these functions through APIs 140A-B to applications 142A-B. The APIs 140A-B may enable different types of applications built through application development. Applications 142A-B may be capable of satisfying a great variety of needs for merchants but may be grouped roughly into three categories: customer-facing applications, merchant-facing applications, integration applications, and the like. Customer-facing applications 142A-B may include online store 138 or channels 110A-B that are places where merchants can list products and have them purchased (e.g., the online store, applications for flash sales (e.g., merchant products or from opportunistic sales opportunities from third-party sources), a mobile store application, a social media channel, an application for providing wholesale purchasing, and the like). Merchant-facing applications 142A-B may include applications that allow the merchant to administer their online store 138 (e.g., through applications related to the web or website or to mobile devices), run their business (e.g., through applications related to POS devices), to grow their business (e.g., through applications related to shipping (e.g., drop shipping), use of automated agents, use of process flow development and improvements), and the like. Integration applications may include applications that provide useful integrations that participate in the running of a business, such as shipping providers 112 and payment gateways.

In some embodiments, an application developer may use an application proxy to fetch data from an outside location and display it on the page of an online store 138. Content on these proxy pages may be dynamic, capable of being updated, and the like. Application proxies may be useful for displaying image galleries, statistics, custom forms, and other kinds of dynamic content. The core-application structure of the e-commerce platform 100 may allow for an increasing number of merchant experiences to be built in applications 142A-B so that the commerce management engine 136 can remain focused on the more commonly utilized business logic of commerce.

The e-commerce platform 100 provides an online shopping experience through a curated system architecture that enables merchants to connect with customers in a flexible and transparent manner. A typical customer experience may be better understood through an embodiment example purchase workflow, where the customer browses the merchant's products on a channel 110A-B, adds what they intend to buy to their cart, proceeds to checkout, and pays for the content of their cart resulting in the creation of an order for the merchant. The merchant may then review and fulfill (or cancel) the order. The product is then delivered to the customer. If the customer is not satisfied, they might return the products to the merchant.

In an example embodiment, a customer may browse a merchant's products on a channel 110A-B. A channel 110A-B is a place where customers can view and buy products. In some embodiments, channels 110A-B may be modeled as applications 142A-B (a possible exception being the online store 138, which is integrated within the commerce management engine 136). A merchandising component may allow merchants to describe what they want to sell and where they sell it. The association between a product and a channel may be modeled as a product publication and accessed by channel applications, such as via a product listing API. A product may have many options, like size and color, and many variants that expand the available options into specific combinations of all the options, like the variant that is extra-small and green, or the variant that is size large and blue. Products may have at least one variant (e.g., a "default variant" is created for a product without any options). To facilitate browsing and management, products may be grouped into collections, provided product identifiers (e.g., stock keeping unit (SKU)) and the like. Collections of products may be built by either manually categorizing products into one (e.g., a custom collection), by building rulesets for automatic classification (e.g., a smart collection), and the like. Products may be viewed as 2D images, 3D images, rotating view images, through a virtual or augmented reality interface, and the like.

In some embodiments, the customer may add what they intend to buy to their cart (in an alternate embodiment, a product may be purchased directly, such as through a buy button as described herein). Customers may add product variants to their shopping cart. The shopping cart model may be channel specific. The online store 138 cart may be composed of multiple cart line items, where each cart line item tracks the quantity for a product variant. Merchants may use cart scripts to offer special promotions to customers based on the content of their cart. Since adding a product to a cart does not imply any commitment from the customer or the merchant, and the expected lifespan of a cart may be in the order of minutes (not days), carts may be persisted to an ephemeral data store.

The customer then proceeds to checkout. A checkout component may implement a web checkout as a customer-facing order creation process. A checkout API may be provided as a computer-facing order creation process used by some channel applications to create orders on behalf of customers (e.g., for point of sale). Checkouts may be created from a cart and record a customer's information such as email address, billing, and shipping details. On checkout, the merchant commits to pricing. If the customer inputs their contact information but does not proceed to payment, the e-commerce platform 100 may provide an opportunity to re-engage the customer (e.g., in an abandoned checkout feature). For those reasons, checkouts can have much longer lifespans than carts (hours or even days) and are therefore persisted. Checkouts may calculate taxes and shipping costs based on the customer's shipping address. Checkout may delegate the calculation of taxes to a tax component and the calculation of shipping costs to a delivery component. A pricing component may enable merchants to create discount codes (e.g., 'secret' strings that when entered on the checkout apply new prices to the items in the checkout). Discounts may be used by merchants to attract customers and assess the performance of marketing campaigns. Discounts and other custom price systems may be implemented on top of the same platform piece, such as through price rules (e.g., a set of prerequisites that when met imply a set of entitlements). For instance, prerequisites may be items such as "the order subtotal is greater than $100" or "the shipping cost is under $10", and entitlements may be items such as "a 20% discount on the whole order" or "$10 off products X, Y, and Z".

Customers then pay for the content of their cart resulting in the creation of an order for the merchant. Channels 110A-B may use the commerce management engine 136 to move money, currency or a store of value (such as dollars or a cryptocurrency) to and from customers and merchants. Communication with the various payment providers (e.g., online payment systems, mobile payment systems, digital wallet, credit card gateways, and the like) may be implemented within a payment processing component. The actual interactions with the payment gateways 106 may be provided through a card server environment. In some embodiments, the payment gateway 106 may accept international payment, such as integrating with leading international credit card processors. The card server environment may include a card server application, card sink, hosted fields, and the like. This environment may act as the secure gatekeeper of the sensitive credit card information. In some embodiments, most of the process may be orchestrated by a payment processing job. The commerce management engine 136 may support many other payment methods, such as through an offsite payment gateway 106 (e.g., where the customer is redirected to another website), manually (e.g., cash), online payment methods (e.g., online payment systems, mobile payment systems, digital wallet, credit card gateways, and the like), gift cards, and the like. At the end of the checkout process, an order is created. An order is a contract of sale between the merchant and the customer where the merchant agrees to provide the goods and services listed on the orders (e.g., order line items, shipping line items, and the like) and the customer agrees to provide payment (including taxes). This process may be modeled in a sales component. Channels 110A-B that do not rely on commerce management engine 136 checkouts may use an order API to create orders. Once an order is created, an order confirmation notification may be sent to the customer and an order placed notification sent to the merchant via a notification component. Inventory may be reserved when a payment processing job starts to avoid over-selling (e.g., merchants may control this behavior from the inventory policy of each variant). Inventory reservation may have a short time span (minutes) and may need to be very fast and scalable to support flash sales (e.g., a discount or promotion offered for a short time, such as targeting impulse buying). The reservation is released if the payment fails. When the payment succeeds, and an order is created, the reservation is converted into a long-term inventory commitment allocated to a specific location. An inventory component may record where variants are stocked, and tracks quantities for variants that have inventory tracking enabled. It may decouple product variants (a customer facing concept representing the template of a product listing) from inventory items (a merchant facing concept that represent an item whose quantity and location is managed). An inventory level component may keep track of quantities that are available for sale, committed to an order or incoming from an inventory transfer component (e.g., from a vendor).

The merchant may then review and fulfill (or cancel) the order. A review component may implement a business process merchant's use to ensure orders are suitable for fulfillment before actually fulfilling them. Orders may be fraudulent, require verification (e.g., ID checking), have a payment method which requires the merchant to wait to make sure they will receive their funds, and the like. Risks and recommendations may be persisted in an order risk model. Order risks may be generated from a fraud detection tool, submitted by a third-party through an order risk API, and the like. Before proceeding to fulfillment, the merchant may need to capture the payment information (e.g., credit card information) or wait to receive it (e.g., via a bank transfer, check, and the like) and mark the order as paid. The merchant may now prepare the products for delivery. In some embodiments, this business process may be implemented by a fulfillment component. The fulfillment component may group the line items of the order into a logical fulfillment unit of work based on an inventory location and fulfillment service. The merchant may review, adjust the unit of work, and trigger the relevant fulfillment services, such as through a manual fulfillment service (e.g., at merchant managed locations) used when the merchant picks and packs the products in a box, purchase a shipping label and input its tracking number, or just mark the item as fulfilled. A custom fulfillment service may send an email (e.g., a location that doesn't provide an API connection). An API fulfillment service may trigger a third party, where the third-party application creates a fulfillment record. A legacy fulfillment service may trigger a custom API call from the commerce management engine 136 to a third party (e.g., fulfillment by Amazon). A gift card fulfillment service may provision (e.g., generating a number) and activate a gift card. Merchants may use an order printer application to print packing slips. The fulfillment process may be executed when the items are packed in the box and ready for shipping, shipped, tracked, delivered, verified as received by the customer, and the like.

If the customer is not satisfied, they may be able to return the product(s) to the merchant. The business process merchants may go through to "un-sell" an item may be implemented by a return component. Returns may consist of a variety of different actions, such as a restock, where the product that was sold actually comes back into the business and is sellable again; a refund, where the money that was collected from the customer is partially or fully returned; an accounting adjustment noting how much money was refunded (e.g., including if there was any restocking fees, or goods that weren't returned and remain in the customer's hands); and the like. A return may represent a change to the contract of sale (e.g., the order), and where the e-commerce platform 100 may make the merchant aware of compliance issues with respect to legal obligations (e.g., with respect to taxes). In some embodiments, the e-commerce platform 100 may enable merchants to keep track of changes to the contract of sales over time, such as implemented through a sales model component (e.g., an append-only date-based ledger that records sale-related events that happened to an item).

Implementation of Virtual Content by an e-Commerce Platform

In some cases, augmented reality (AR) may be implemented by an e-commerce platform to provide virtual content for improved customer experiences. For example, AR may allow a customer to view a 3D virtual product within a real-world space that is relevant to them, such as in a room of their home. This can allow the customer to better appreciate the size and look of the product within their home before purchasing the product.

However, conventional AR experiences have some limitations. One such limitation is that a user must be physically present in a real-world space to view 3D models within that real-world space. This is not always practical. For example, a customer may want to shop online for furniture during their commute on a train. In this situation, the customer would be unable to view the furniture in their house using an AR experience.

Another limitation of conventional AR experiences is that a user is often only able to view a virtual 3D model from one perspective at a time. Many AR compatible devices (such as smart phones and headsets, for example) typically provide only one perspective of an AR scene. While a user may be able to move an AR device to modify the perspective, it might not be possible to view two different perspectives simultaneously. However, there may be value in enabling an AR scene to be viewed from multiple perspectives simultaneously. For example, when a customer is trying to determine where a couch might look best in a room of their house, it may be beneficial for the customer to view a 3D model of the couch from multiple perspectives simultaneously. This can allow the user to better appreciate how the couch looks from various different locations in the room without having to physically move within the room. Although some AR systems may implement multiple cameras to provide multiple simultaneous perspectives of an AR scene, the cost and complexity of these systems may prohibit their use in some applications, including e-commerce.

A further limitation of conventional AR experiences is that each time a user begins an AR experience, the user is typically required to initialize the AR experience. Initializing an AR experience may include, inter alia, obtaining a 3D scan of the real-world space as part of a simultaneous localization and mapping (SLAM) process, for example. Initializing an AR experience multiple times might be onerous for the user.

According to an aspect of a present disclosure, spatially aware media is provided to help overcome the deficiencies of AR outlined above. Spatially aware media is stored media that includes, or is otherwise associated with, 3D spatial information pertaining to a real-world space. As discussed in further detail elsewhere herein, spatially aware media may allow users to more flexibly and efficiently interact with virtual content in real-world spaces that are relevant to them. For example, in commerce applications, spatially aware media may be augmented to allow a customer to view a 3D model of a product in a real-world space that is relevant to them at any time and from any location.

Figure 3:
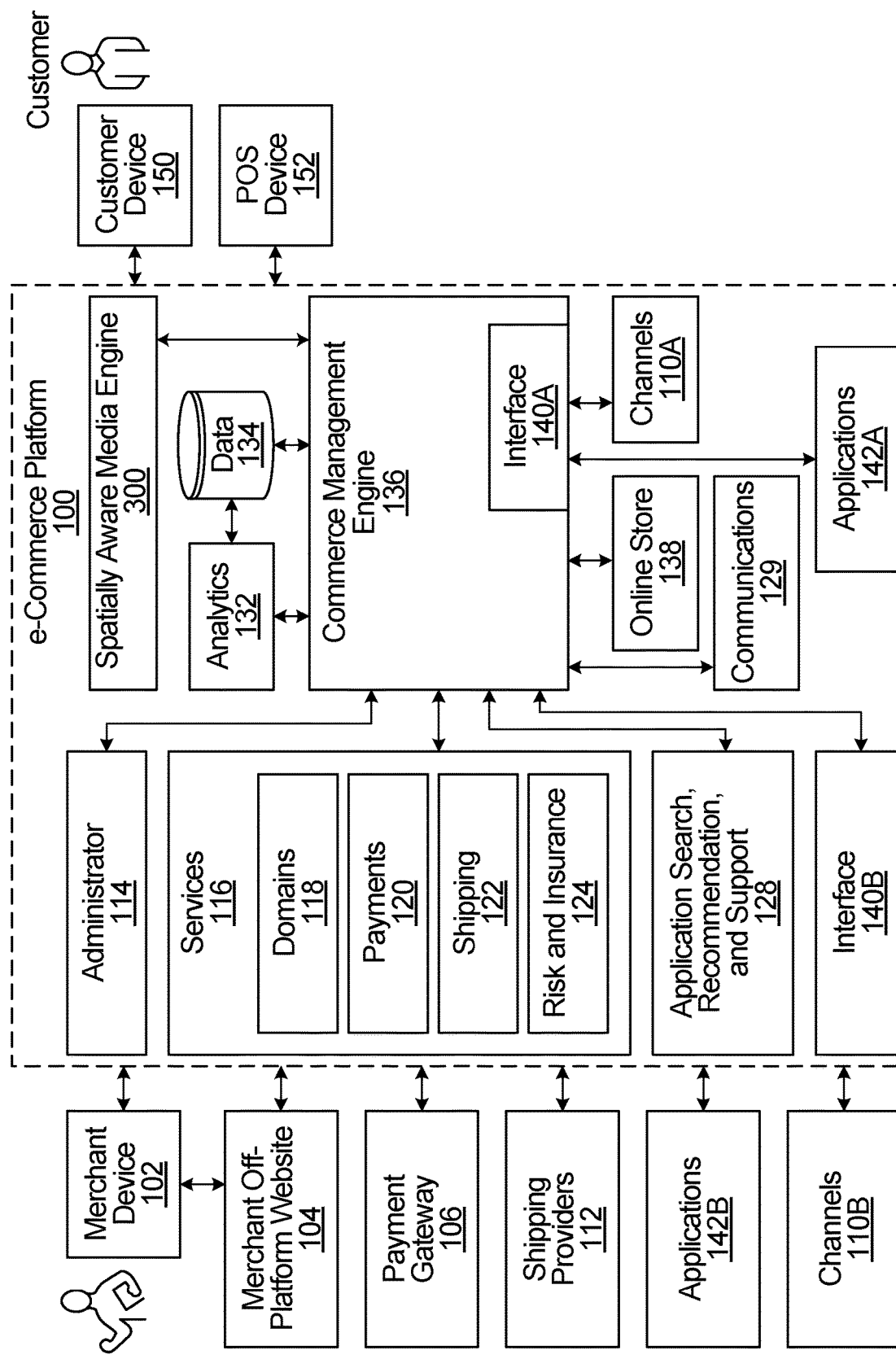
FIG. 3 illustrates the e-commerce platform of FIG. 1, but including a spatially aware media engine.

FIG. 3 illustrates the e-commerce platform 100 of FIG. 1, but including a spatially aware media engine 300. The spatially aware media engine 300 is an example of a computer-implemented system that generates, stores and/or augments spatially aware media for use by the e-commerce platform 100, the customer device 150 and/or the merchant device 102.

Although the spatially aware media engine 300 is illustrated as a distinct component of the e-commerce platform 100 in FIG. 3, this is only an example. A spatially aware media engine could also or instead be provided by another component residing within or external to the e-commerce platform 100. In some embodiments, either or both of the applications 142A-B provide a spatially aware media engine that is available to customers and/or to merchants. Furthermore, in some embodiments, the commerce management engine 136 provides a spatially aware media engine. The e-commerce platform 100 may include multiple spatially aware media engines that are provided by one or more parties. The multiple spatially aware media engines may be implemented in the same way, in similar ways and/or in distinct ways. In addition, at least a portion of a spatially aware media engine may be implemented in the merchant device 102 and/or in the customer device 150. For example, the customer device 150 may store and run a spatially aware media engine locally as a software application.

The spatially aware media engine 300 may implement at least some of the functionality described herein. Although the embodiments described below may be implemented in association with an e-commerce platform, such as (but not limited to) the e-commerce platform 100, the embodiments described below are not limited to the specific e-commerce platform 100 of FIGS. 1 to 3. Further, the embodiments described herein do not necessarily need to be implemented in association with or involve an e-commerce platform at all. In general, any applications of spatially aware media could implement the systems and methods disclosed herein.

Spatially Aware Media

As noted above, spatially aware media is media that includes, or is otherwise associated with, 3D spatial information pertaining to a real-world space. This 3D spatial information may identify the 3D spatial features of the real-world space, such as the surfaces, edges, corners and/or lighting in the real-world space, for example. Non-limiting examples of lighting in a real-world space (which may also be referred to as lighting information for a real-world space) includes the position, directionality, color and brightness of light sources in the real-world space. In some embodiments, spatially aware media includes visual, audio and/or haptic content that is defined relative to the 3D spatial features of a real-world space. Non-limiting examples of spatially aware media include:

One or more images of a real-world space and corresponding information identifying the 3D spatial features in the real-world space. For example, the shape, dimensions, orientation, location and/or reflectivity of each of the surfaces captured in the images could be characterized in 3D by this information.

A video of a real-world space and corresponding information identifying the 3D spatial features in the real-world space.

An audio recording captured within a real-world space and corresponding information identifying the 3D spatial features in the real-world space. This could enable the generation of spatial audio content based on the audio recording, for example.

Haptic textures for a real-world space and corresponding information identifying the 3D spatial features in the real-world space. For example, the haptic textures could be mapped to these 3D spatial features, allowing a user to feel the different surfaces of the real-world space.

It should be noted that spatially aware media may include combinations of the examples provided above.

Figure 4:
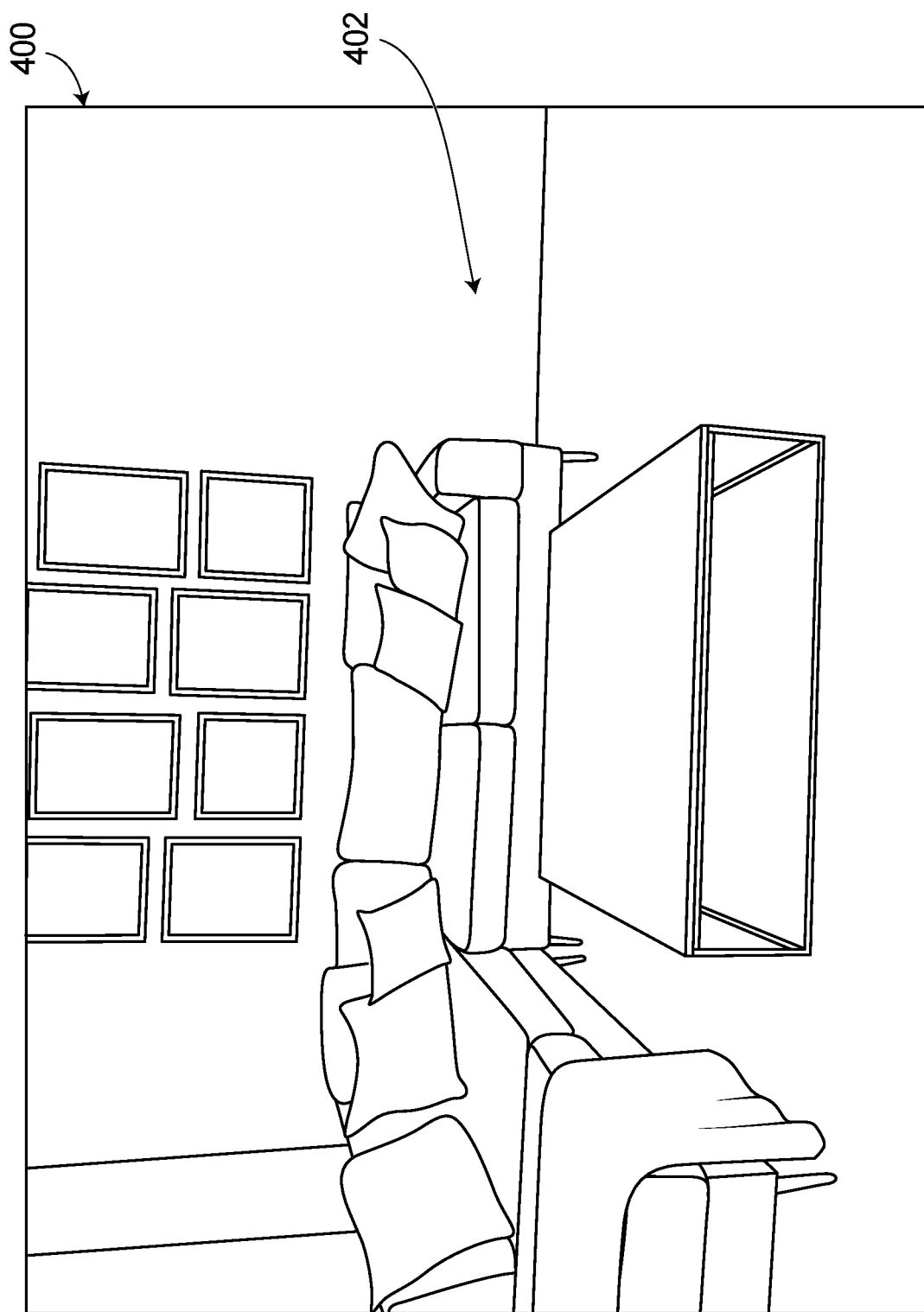
FIG. 4 illustrates an image of a living room that forms a portion of spatially aware media associated with the living room, according to an embodiment.
Figure 5:
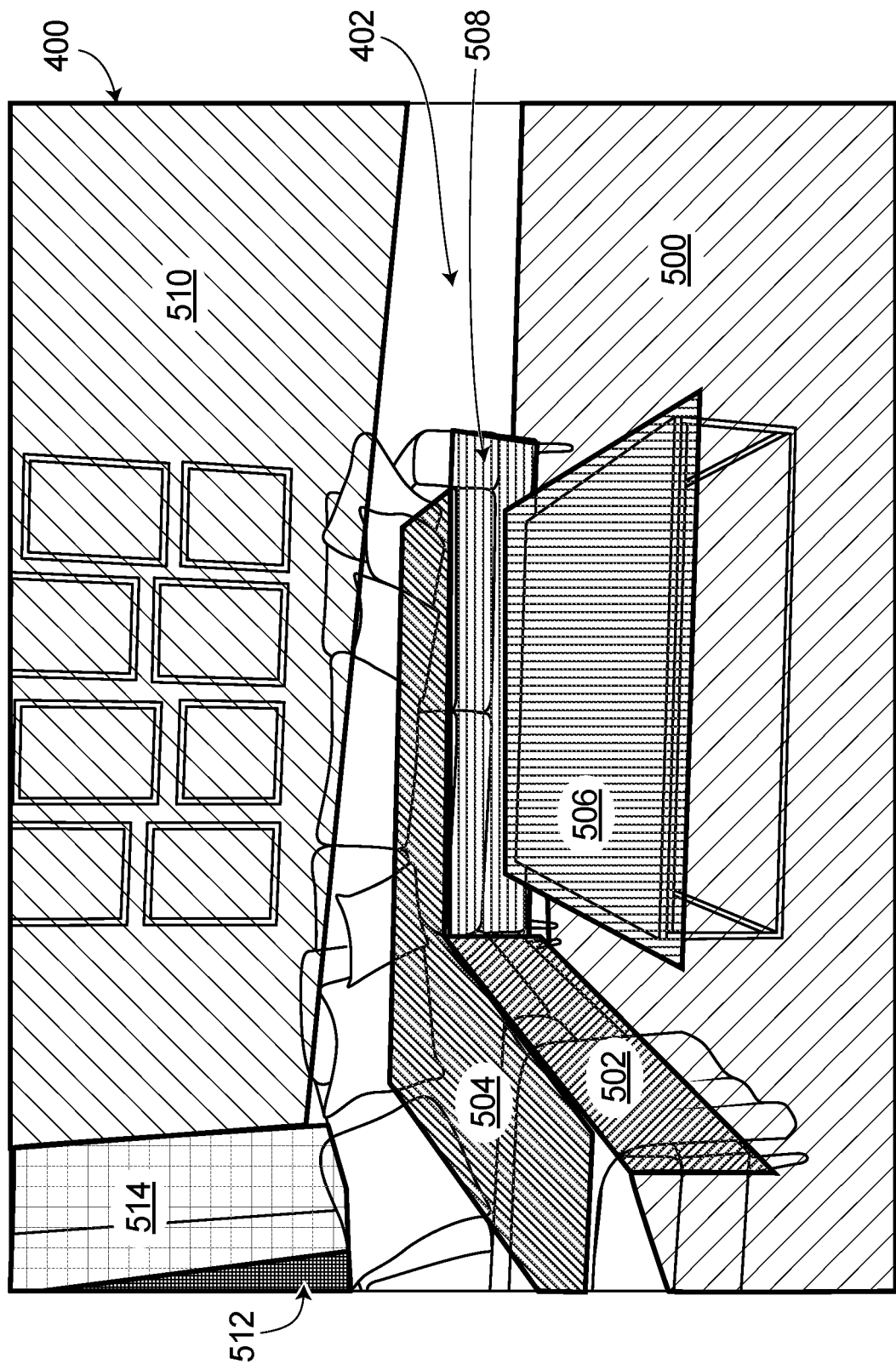
FIG. 5 illustrates the image of FIG. 4, but with different 3D surfaces of the living room identified using hatching.

FIGS. 4 and 5 illustrate spatially aware media associated with a living room 402 of a real-world house, according to an embodiment. In some cases, the living room 402 is a user's personal living room, and therefore the spatially aware media may be associated with, and even be specific to, that user.

FIG. 4 illustrates an image 400 of the living room 402, which forms a portion of the spatially aware media associated with the living room 402. The spatially aware media further includes 3D spatial information identifying the position, size and shape of 3D surfaces in the living room 402, for example. It should be noted that, as used herein, a position may include both a location and an orientation.

FIG. 5 illustrates the image 400, but with different 3D surfaces 500, 502, 504, 506, 508, 510, 512, 514 of the living room 402 identified using hatching. Any, one, some or all of these surfaces 500, 502, 504, 506, 508, 510, 512, 514 may be stored as 3D spatial information by the spatially aware media associated with the living room 402. As shown in FIG. 5, the surfaces 500, 502, 504, 506, 508, 510, 512, 514 are mapped to the image 400 such that the image 400 is superimposed with 3D spatial information. In this way, the image 400 is made "spatially aware" by the 3D spatial information identifying the surfaces 500, 502, 504, 506, 508, 510, 512, 514.

The spatially aware media illustrated in FIGS. 4 and 5 may further include audio content and/or haptic content that is mapped to the 3D spatial features of the living room 402. For example, haptic content may enable a user to feel the textures of the surfaces 500, 502, 504, 506, 508, 510, 512, 514.

Spatially aware media may be augmented to include virtual content. In some embodiments, augmenting spatially aware media includes overlaying a render of a 3D model onto an image of a real-world space that is provided by the spatially aware media. The 3D model may be defined relative to the 3D spatial features of the real-world space that are identified by the spatially aware media. For example, the 3D model may be assigned a position within a coordinate system that has been mapped to the real-world space. A render of the 3D model can then be generated based on the position of the 3D model and on the perspective or viewpoint of the image. In some cases, the 3D model may be virtually positioned on a surface of the real-world space. The size and orientation of a render of the 3D model may realistically portray the 3D model resting on that surface. The 3D model may also be virtually movable by a user relative to the 3D spatial features of the real-world space. This can result in the generation of further instances of augmented spatially aware media, which include renders of the 3D model at the new positions. The terms "augmented media" and "augmented spatially aware media" are generally used interchangeably herein.

In commerce applications, augmenting spatially aware media can allow a customer to view and interact with a virtual product when the customer is not able to interact with a physical product. For example, spatially aware media may be augmented to superimpose a virtual representation of a product onto a real-world environment that is captured in an image, which could make the product appear to be present in the real-world environment. The image may be of the customer's home or another location that is relevant to the customer, allowing the customer to view the product in an environment that is of interest to them.

Figure 6:
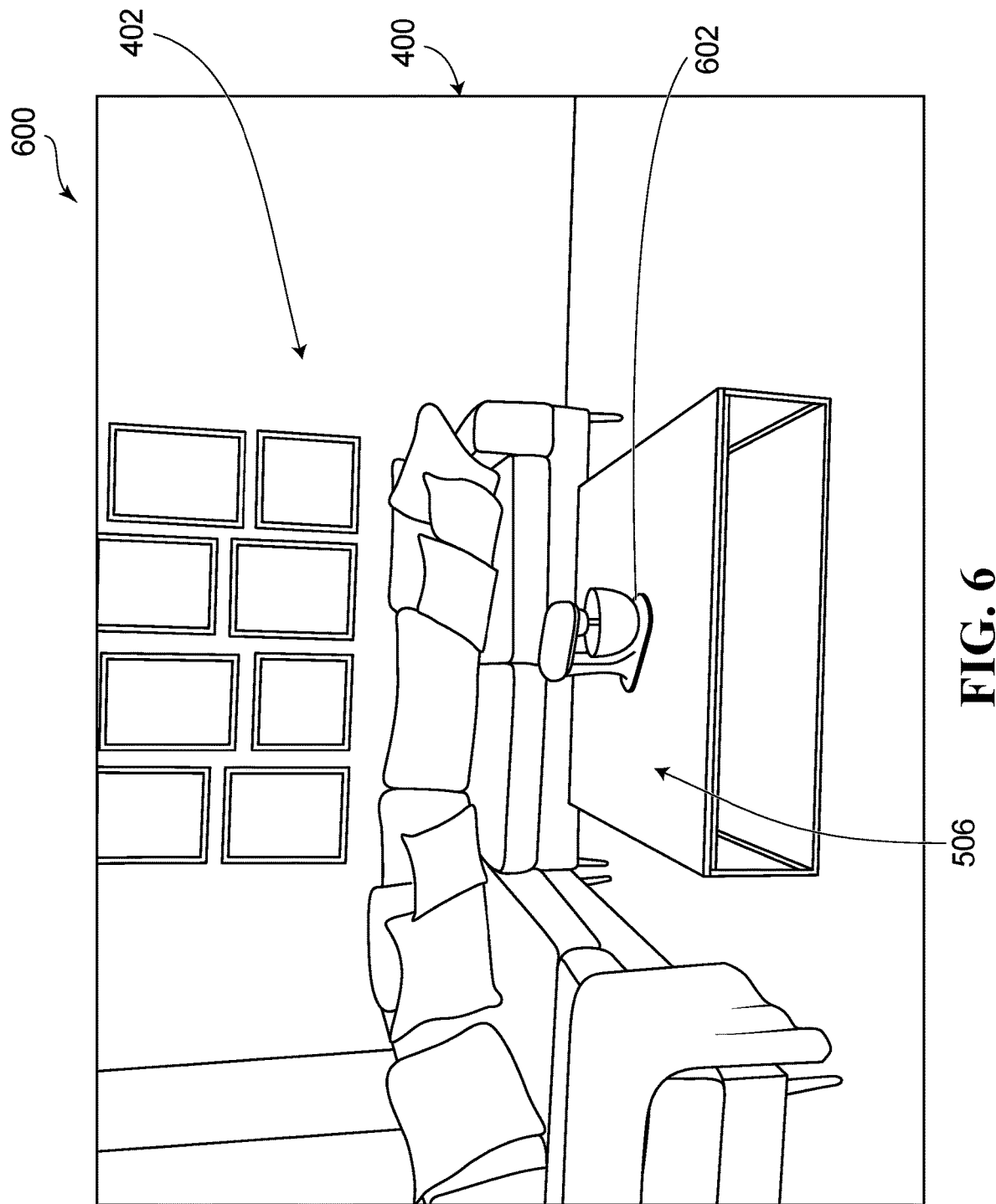
FIGS. 6 to 8 illustrate example instances of augmented spatially aware media associated with the living room of FIG. 4.
Figure 7:
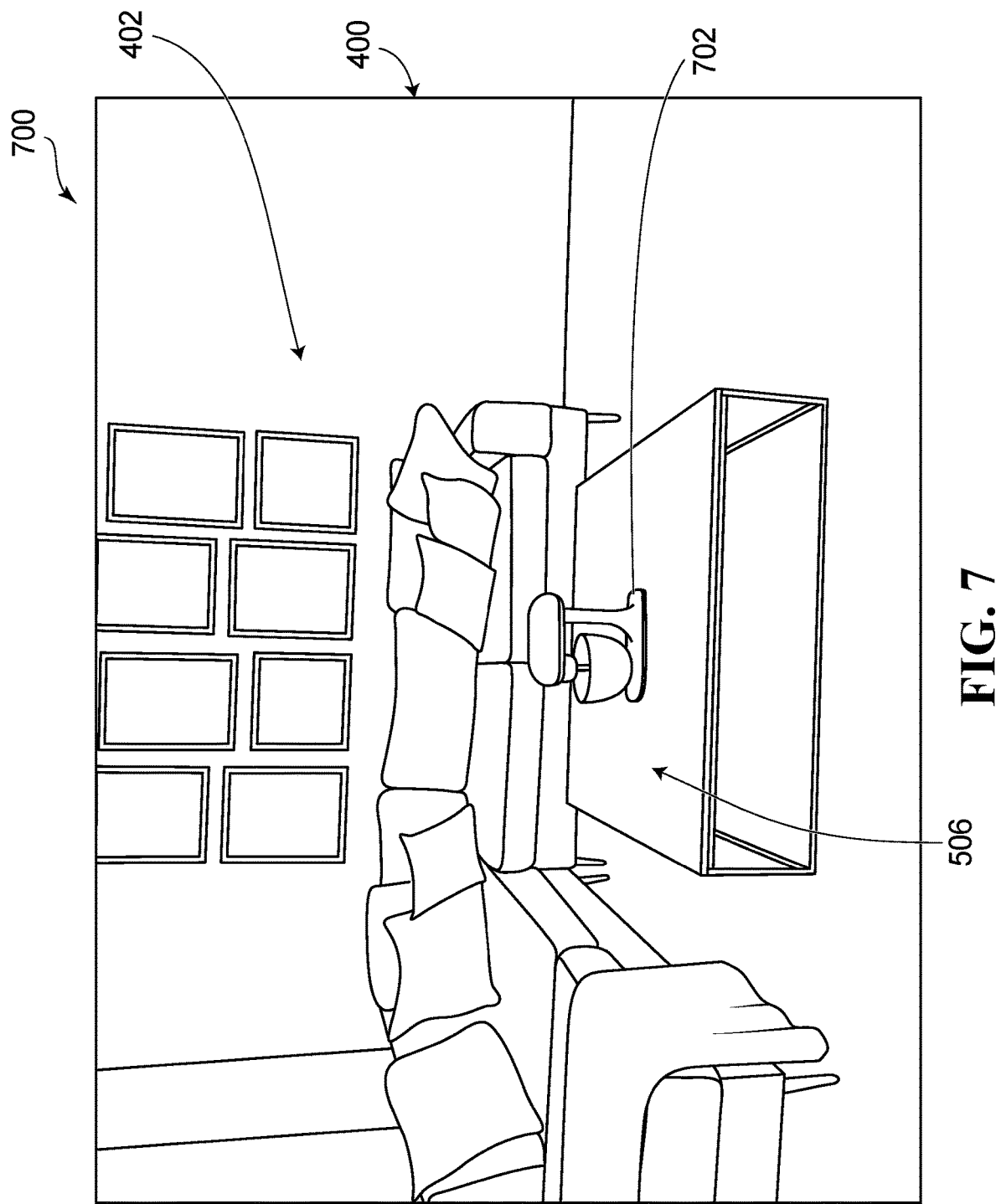

FIGS. 6 and 7 illustrate example instances 600, 700 of augmented spatially aware media associated with the living room 402. The instance 600 of augmented spatially aware media includes the image 400 overlaid with a representation 602 of a stand-up kitchen mixer. The representation 602 realistically depicts the mixer resting on the surface 506 of the living room 402, which corresponds to a table of the living room 402. In some implementations, the representation 602 is a render of a 3D model of the mixer. This 3D model may have been virtually positioned on the surface 506 of the living room 402 using the 3D spatial information included in the spatially aware media for the living room 402. The render of the 3D model (forming the representation 602) may have been generated based on the position of the 3D model relative to the viewpoint of the image 400.

The instance 700 of augmented spatially aware media includes the image 400 overlaid with a different representation 702 of the stand-up kitchen mixer. The representation 702 still depicts the mixer resting on the surface 506, but at a new position compared to the representation 602. More specifically, the mixer is shown at different orientations in the representations 602, 702. In some implementations, the representation 702 is a render of the 3D model of the mixer after the 3D model has been virtually repositioned in response to user input. For example, a user may have generated an instruction to move the 3D model of the mixer relative to the 3D spatial features of the living room 402 to the position depicted by the representation 702. In this way, the instance 700 of augmented spatially aware media may be considered an updated version of the instance 600.

An advantage of spatially aware media is that, after being generated and stored, a user can later access the spatially aware media to interact with virtual content in the associated real-world space at any time. Further, the user does not have to be physically within the real-world space. The user may access and augment the spatially aware media from other locations. For example, the instances 600, 700 of augmented spatially aware media may have been generated by a user and/or a user device that is/are remote from the living room 402. In contrast, using AR, a user may have to be physically in the living room 402 to view the 3D models of the mixer.

In some embodiments, after being generated and stored, the same spatially aware media may be augmented multiple different times by a user. For example, using the spatially aware media associated with the living room 402, a customer may view the 3D model of the stand-up kitchen mixer within the image 400 one day, and then view a 3D model of another product within the image 400 on another day. This may allow the customer to more efficiently browse different products and view those products within the living room 402. In contrast, using AR, the user may need to reinitialize their device (for example, reperform a 3D scan of the room to detect features) when initiating the AR session on the second day.

Spatially aware media is not limited to a single image. In some embodiments, spatially aware media includes multiple different images of a real-world space, each captured from a different perspective or viewpoint in the real-world space. The 3D spatial information provided by the spatially aware media may pertain to all of the images. For example, multiple images of a real-world space may each be mapped to a single 3D scan of the real-world space. The multiple images may share the same 3D spatial information for the real-world space.

Spatially aware media that includes multiple images of a real-world space could enable a user to view a 3D model within that real-world space from multiple different perspectives. The 3D model may be virtually positioned within real-world space based on the 3D spatial information provided by the spatially aware media. Each of the images may then be augmented with a render of the 3D model that is generated based on the perspective of the image and the relative position of the 3D model. Because the multiple images share the same 3D spatial information for the real-world space, the 3D model may appear to be at the same position relative to the 3D spatial features of the real-world space in each augmented image.

Figure 8:
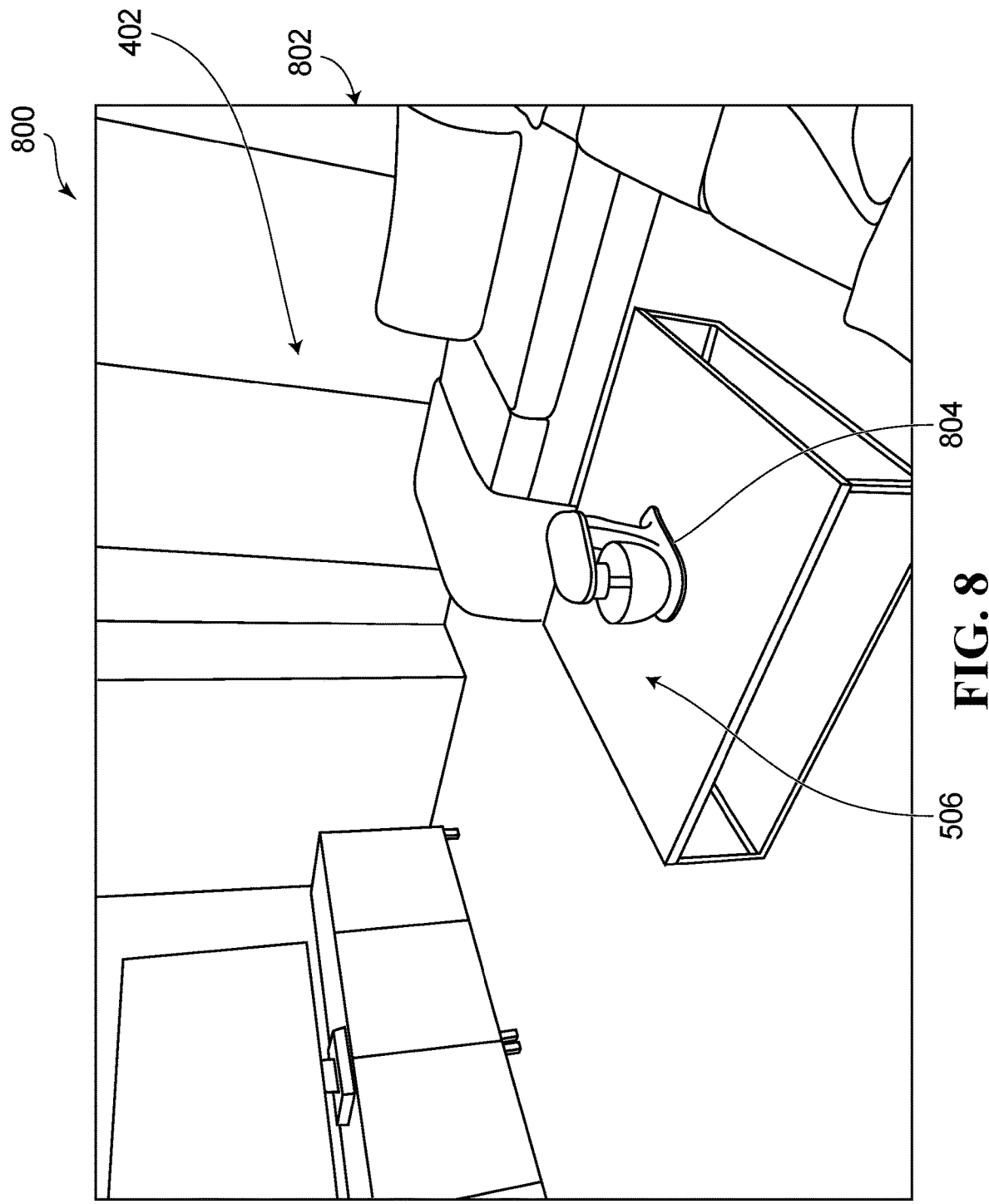

FIG. 8 illustrates another example instance 800 of augmented spatially aware media associated with the living room 402. The instance 800 of augmented spatially aware media includes an image 802 of the living room 402, but from a different viewpoint of the living room 402 than the image 400. The image 802 also forms a portion of the spatially aware media associated with the living room 402. The 3D spatial features of the living room 402 identified by the spatially aware media, which may include but are not limited to the surfaces 500, 502, 504, 506, 508, 510, 512, 514 shown in FIG. 5, may be mapped to the image 802 to provide 3D spatial information for the image 802.

In some implementations, each of the images 400, 802 have a corresponding position defined within a coordinate system that is mapped to the living room 402 and stored by the spatially aware media for the living room 402. These positions may include a coordinate, an orientation and an angle of view within the coordinate system, allowing the field of view of each image 400, 802 to be determined.

As shown in FIG. 8, the image 802 is overlaid with a representation 804 of the stand-up kitchen mixer resting on the surface 506. The representation 804 generally depicts the mixer at the same position within the living room 402 as the representation 602 of FIG. 6. However, the representation 804 captures the mixer from the viewpoint of the image 802. In this way, the instances 600, 800 of augmented spatially aware media depict the mixer at the same position within the living room 402, but from different perspectives. In some implementations, the representations 602, 804 are each different renders of the same 3D model of the mixer defined at a position relative to the 3D spatial features of the living room 402. Each render may be generated based on the respective viewpoints of the images 400, 802, thereby providing the different perspectives of the mixer within the living room 402.

Movement of a 3D model may be tracked across multiple images provided by spatially aware media. For example, in the case that user input generates an instruction to move the 3D model of the mixer from the position shown by the representation 602 of FIG. 6 to the position shown by the representation 702 of FIG. 7, both of the images 400, 802 may be augmented to depict the new position of the 3D model.

In some implementations, multiple augmented images corresponding to the same spatially aware media may be presented to a user simultaneously. For example, the instances 600, 800 of augmented spatially aware media may be presented to a user at the same time. Advantageously, this may allow a user to simultaneously view the 3D model from multiple perspectives without having to physically move within the living room 402, which would typically be required in an AR experience, for example.

In some implementations, multiple images provided by spatially aware media correspond to different frames of a video capturing a real-world space. By way of example, the images 400, 802 might be different frames of a video of the living room 402. After augmenting the different frames to include respective renders of a 3D model, the 3D model would appear to be in the same position within the real-world space in the augmented video. Virtually moving the 3D model within one frame of the video may also be reflected in all of the other frames.

Example Systems and Methods for Implementing Spatially Aware Media

Systems and methods for generating, storing and augmenting spatially aware media will now be discussed in further detail. While some implementations of these systems and methods are described in the context of commerce applications, it should be noted that the present disclosure is in no way limited to commerce. The systems and methods disclosed herein may also be implemented in any other application of spatially aware media.

Figure 9:
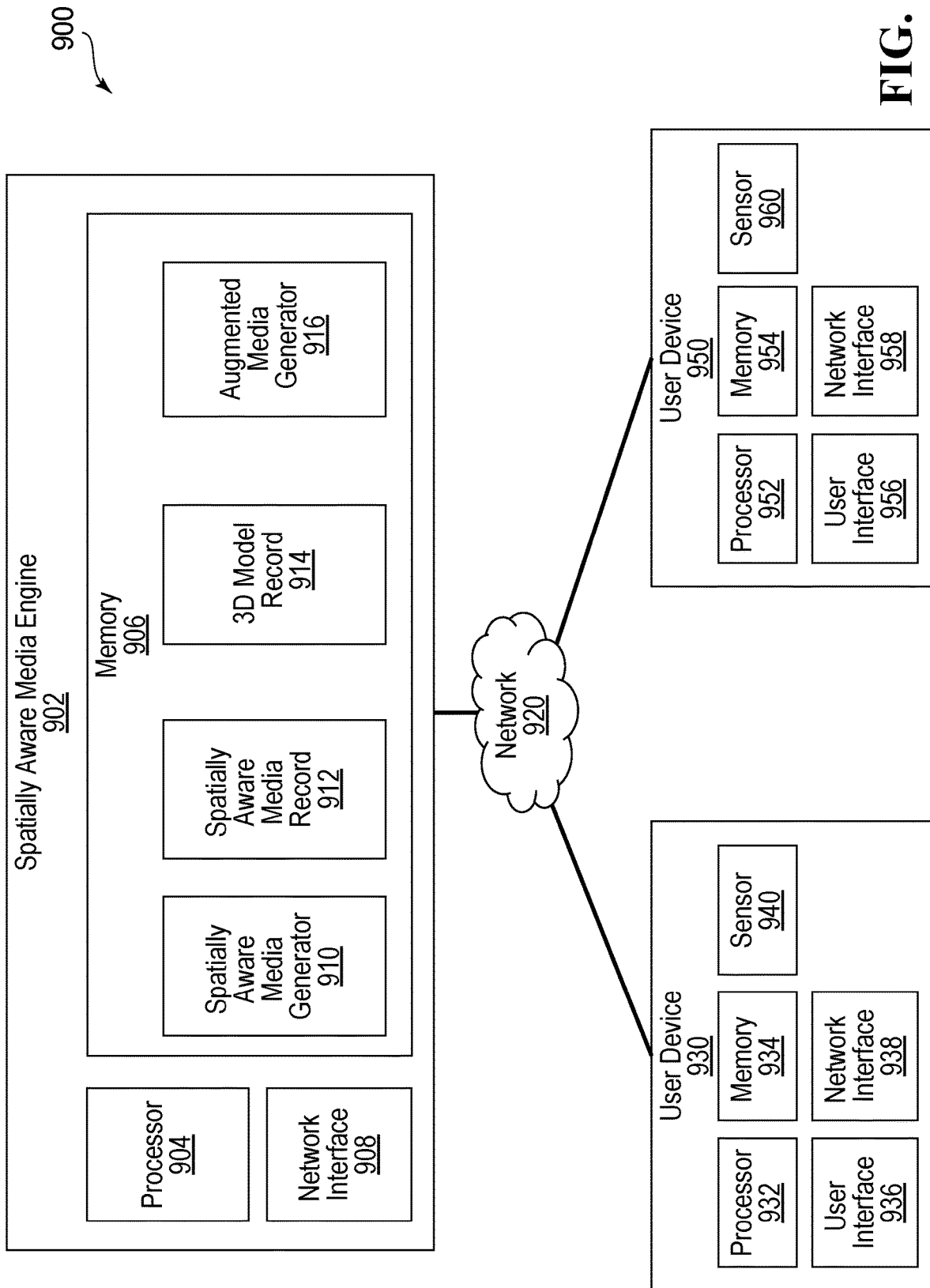
FIG. 9 is a block diagram illustrating a system for implementing spatially aware media, according to an embodiment.

FIG. 9 is a block diagram illustrating a system 900 for implementing spatially aware media, according to an embodiment. The system 900 includes a spatially aware media engine 902, a network 920, and multiple user devices 930, 950.

The user devices 930, 950 may enable respective users to engage with spatially aware media. Non-limiting examples of a user device include a mobile phone, tablet, laptop, projector, headset and computer. A user device may be a customer device that is owned and/or operated by a customer or be a merchant device that is owned and/or operated by a merchant, for example. In some implementations, either or both of the user devices 930, 950 include implanted devices or wearable devices, such as a device embedded in clothing material or a device that is worn by a user such as glasses.

The user device 930 includes a processor 932, memory 934, user interface 936, network interface 938 and sensor 940. Similarly, the user device 950 includes a processor 952, memory 954, user interface 956, network interface 958 and sensor 960. The user device 930 will be described by way of example below. However, it should be noted the description of the user device 930 can also apply to the user device 950.

The user interface 936 may include, for example, a display screen (which may be a touch screen), a gesture recognition system, a speaker, headphones, a microphone, a haptic device, a keyboard, and/or a mouse. The user interface 936 may be at least partially implemented by wearable devices embedded in clothing and/or accessories, for example. The user interface 936 can present content to a user, including visual, haptic and audio content.

The network interface 938 is provided for communicating over the network 920. The structure of the network interface 938 will depend on how the user device 930 interfaces with the network 920. For example, if the user device 930 is a mobile phone, headset or tablet, then the network interface 938 may include a transmitter/receiver with an antenna to send and receive wireless transmissions to/from the network 920. If the user device is a personal computer connected to the network with a network cable, then the network interface 938 may include, for example, a network interface card (NIC), a computer port (e.g., a physical outlet to which a plug or cable connects), and/or a network socket.

The processor 932 directly performs or instructs all of the operations performed by the user device 930. Examples of these operations include processing user inputs received from the user interface 936, preparing information for transmission over the network 920, processing data received over the network 920, and instructing a display screen to display information. The processor 932 may be implemented by one or more processors that execute instructions stored in the memory 934. Alternatively, some or all of the processor 932 may be implemented using dedicated circuitry, such as an application specific integrated circuit (ASIC), a graphics processing unit (GPU) or a programmed field programmable gate array (FPGA).

The sensor 940 may be provided to obtain measurements of a real-world space. As discussed elsewhere herein, these measurements may be used to detect, characterize and/or otherwise identify 3D spatial features of the real-world space. The sensor 940 may include one or more cameras, microphones, haptic sensors (e.g., vibration and/or pressure sensors), radar sensors, lidar sensors and sonar sensors, for example. Although the sensor 940 is shown as a component of the user device 930, the sensor 940 may also or instead be implemented separately from the user device 930 and may communicate with the user device 930 and/or the spatially aware media engine 902 via wired and/or wireless connections, for example.

One or both of the sensors 940, 960 might not be implemented in the user devices 930, 950. For example, the user device 950 may be a desktop computer, without a sensor, that enables a corresponding user to view and interact with pre-generated spatially aware media. In this way, the sensors 940, 960 may be considered optional.

In FIG. 9, two user devices are shown by way of example. More than two user devices may be in communication with the spatially aware media engine 902.

The network 920 may be a computer network implementing wired and/or wireless connections between different devices, including the spatially aware media engine 902 and the user devices 930, 950. The network 920 may implement any communication protocol known in the art. Non-limiting examples of communication protocols include a local area network (LAN), a wireless LAN, an internet protocol (IP) network, and a cellular network.

The spatially aware media engine 902 supports the generation, storage and/or augmentation of spatially aware media. This spatially aware media could be output from the spatially aware media engine 902 for presentation on either or both of the user devices 930, 950.

The spatially aware media engine 902 is provided by way of example. Other implementations of a spatially aware media engine are also contemplated. In some implementations, a spatially aware media engine is implemented on one or both of the user devices 930, 950. For example, a software application or instance may be installed on the user device 930 that generates, stores and/or augments spatially aware media locally (i.e., on the user device 930). In some implementations, a spatially aware media engine is provided at least in part by a platform such as, for example, an e-commerce platform. For example, a spatially aware media engine could be provided as a core function of the e-commerce platform or as an application or service supported by or communicating with the e-commerce platform. In some implementations, a spatially aware media engine is implemented at least in part by a user device, such as a customer device or a merchant device. In some implementations, a spatially aware media engine is implemented as a stand-alone service to generate, store and/or augment spatially aware media. While the spatially aware media engine 902 is shown as a single component, a spatially aware media engine could instead be provided by multiple different components that are in communication via a network.

As illustrated, the spatially aware media engine 902 includes a processor 904, memory 906 and a network interface 908. The processor 904 may be implemented by one or more hardware processors that execute instructions stored in the memory 906 or in another non-transitory computer readable medium. Alternatively, some or all of the processor 904 may be implemented using dedicated circuitry, such as an ASIC, a GPU, or a programmed FPGA.

The network interface 908 is provided for communication over the network 920. The structure of the network interface 908 is implementation specific. For example, the network interface 908 may include a NIC, a computer port, and/or a network socket.

The memory 906 stores a spatially aware media generator 910, a spatially aware media record 912, a 3D model record 914, and an augmented media generator 916.

The spatially aware media generator 910 includes, employs and/or implements one or more algorithms (possibly in the form of software instructions executable by the processor 904) that are capable of generating spatially aware media. The spatially aware media associated with the living room 402 of FIGS. 4 and 5 is an example of spatially aware media that may be generated using the spatially aware media generator 910. In general, spatially aware media can be generated in any of a number of different ways.

Figure 10:
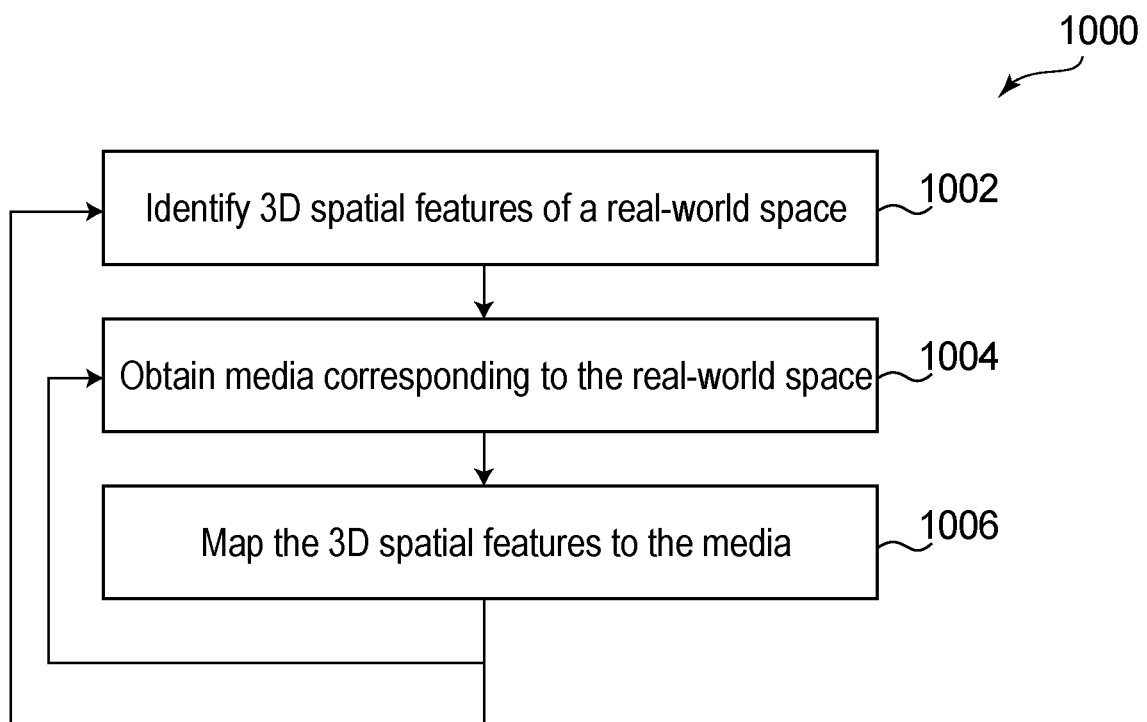
FIG. 10 is a flow diagram illustrating a method for generating spatially aware media, according to an embodiment.

FIG. 10 is a flow diagram illustrating an example method 1000 for generating spatially aware media, which will be described as being performed by the spatially aware media engine 902. For example, the spatially aware media generator 910 may include instructions which, when executed by the processor 904, cause the processor 904 to perform the method 1000. However, at least a portion of the method 1000 may also or instead be performed elsewhere, such as at one or both of the user devices 930, 950.

Step 1002 includes detecting, characterising and/or otherwise identifying 3D spatial features of a real-world space. These 3D spatial features may include the surfaces, edges, corners and/or light sources of the real-world space, for example. Once identified, the 3D spatial features may provide a representation, map, layout and/or model of the real-world space in 3D. Optionally, the 3D spatial features may be defined within a coordinate system that is mapped to the real-world space.

In some implementations of step 1002, the spatially aware media engine 902 obtains measurements of the real-world space. The spatially aware media engine 902 then analyses the measurements to identify the 3D spatial features of the real-world space. For example, the shape, dimensions, orientation, location, texture and/or reflectivity of the 3D spatial features may be determined based on analysis of the measurements.

In some implementations, the measurements obtained and analysed in step 1002 include one or more images of a real-world space. Image analysis may be performed on the images to identify the 3D spatial features of the real-world space from the images. For example, the spatially aware media generator 910 could include, employ and/or implement one or more image analysis algorithms to analyse images received and/or stored by the spatially aware media engine 902. Non-limiting examples of such algorithms include:

Surface, corner and/or edge detection algorithms;
Object recognition algorithms;
Motion detection algorithms; and
Image segmentation algorithms.

Further details regarding image analysis algorithms can be found in *Computer Vision: Algorithms and Applications* by Richard Szeliski, ISBN: 978-1-84882-935-0 (Springer, 2010), the contents of which are herein incorporated by reference in their entirety.

In some implementations, the measurements obtained and analysed in step 1002 may include or otherwise provide one or more 3D scans of a real-world space. Obtaining a 3D scan may include moving or rotating a sensor with a real-world space to capture multiple angles of the real-world space. Lidar, radar and photogrammetry (creating a 3D model from a series of 2D images) are example methods for generating a 3D scan of a real-world space.

In some implementations, multiple scans are captured from different positions within a real-world space in step 1002. These positions may be referred to as "probe points". Each scan may be a panoramic image, for example. In addition to, or instead of, obtaining 3D spatial information from the scans, the scans may be stored to implement realistic reflections in virtual content that is added to the real-world space using spatially aware media. For example, if a virtual reflective surface is added to the real-world space, then the surface could be augmented based on the scan captured at the nearest probe point to depict an image of the real-world space being reflected on the surface.

Measurements may be obtained from any of a number of different sources in step 1002. In some implementations, the measurements are obtained from one or both of the user devices 930, 950. For example, the sensor 940 may capture measurements of a real-world space and the user device 930 may transmit those measurements to the spatially aware media engine 902 to generate spatially aware media for the real-world space. In some cases, the real-world space could be a space that is specific to the user of the user device 930, such as a room of the user's house, for example.

In some implementations, any, one, some or all of the identified 3D spatial features of a real-world space may be "tagged" to provide additional information or context for the features. These tags may be considered metadata for the 3D spatial features of the real-world space. By way of example, surfaces corresponding to floors, tables, walls and/or windows may be indicated using a tag. Further, objects such as lights and furniture may be indicated using a tag. User input obtained via one or both of the user interfaces 936, 956 may provide one or more tags for 3D spatial features of a real-world space. Alternatively, or additionally, image analysis may automatically detect and tag 3D spatial features of a real-world space. The tags for 3D spatial features of a real-world space may be stored with 3D spatial information that identifies the 3D spatial features. Referring to the spatially aware media for the living room 402 shown in FIG. 5, for example, the surface 500 may be tagged as a "floor", the surfaces 502, 504, 508 may be tagged as a "couch", the surface 506 may be tagged as a "coffee table", the surface 510 may be tagged as a "wall" and the surfaces 512, 514 may be tagged as a "curtain" by the spatially aware media.

Step 1004 includes obtaining media corresponding to the real-world space. This media may include visual, audio and/or haptic content from the real-world space. In some implementations, the media is obtained from the same source as the measurements obtained in step 1002. For example, the user device 930 could transmit measurements of a real-world space and an image of the real-world space to the spatially aware media engine 902.

In some implementations, the media obtained in step 1004 is used to help identify 3D spatial features in step 1002. As such, step 1004 may occur before step 1002. By way of example, at least some of the media obtained in step 1004 could include measurements that are analysed in step 1002 to help identify the 3D spatial features of the real-world space. If an image of the real-world space is obtained in step 1004, then the image could be analysed in step 1002 to identify the 3D spatial features in the real-world space.

In some implementations, the media obtained in step 1004 may include user-defined information or metadata. For example, using the user interface 936, a user may tag an image of a living room with the phrases "living room", "bright" and "yellow" to help the spatially aware media engine 902 associate this media with certain characteristics. These tags may be stored with the media.

Step 1006 includes mapping the 3D spatial features identified in step 1002 to the media obtained in step 1004. This mapping may be performed such that the 3D spatial features are correlated with the media to provide spatial information for the media. In other words, the media may be linked to the identified 3D spatial features. For example, the size, shape, orientation, position, texture and/or reflectivity of a surface represented in the media may be obtained from the 3D spatial features. FIG. 5 illustrates an example of 3D spatial features (i.e., the surfaces 500, 502, 504, 506, 508, 510, 512, 514) that are mapped to obtained media (i.e., the image 400). Following step 1006, spatially aware media for the real-world space may be obtained.

In some implementations, step 1006 includes determining or otherwise obtaining a position at which the media obtained in step 1004 was captured in the real-world space. Consider, for example, a case in which an image of the real-world space is obtained in step 1004. Step 1006 may include determining the position (including the location and orientation) of the camera capturing the image within the real-world space. This position may include a coordinate within a coordinate system that is mapped to the real-world space, for example. The position of the camera, as well as the parameters of the camera, may then be used to determine the image's field of view in the real-world space. These parameters of the camera may include focal length, angle of view and magnification, for example. The 3D spatial features of the real-world space identified in step 1002 could be mapped to the image based on the field of view of the image, optionally without the need for image analysis to be performed on the image. In this way, the position and parameters of a camera that captures an image of a real-world space can provide a means to map the image to the 3D spatial features of the real-world space.

In some implementations, any, one, some or all of steps 1002, 1004, 1006 is/are performed at least in part using a simultaneous localization and mapping (SLAM) process.

As illustrated by the arrow from step 1006 to step 1004 in FIG. 10, these steps may be performed multiple times. Different visual content, audio content and/or haptic content may be added to spatially aware media in different instances of steps 1004, 1006. Consider, for example, a user that generates spatially aware media by identifying the 3D spatial features based on or using a 3D scan of the real-world space in step 1002, capturing an image of the real-world space in step 1004, and mapping the image to the 3D spatial features in step 1006. At a later time, the user may want to supplement the spatially aware media with an additional image of the real-world space from a different perspective. The user may capture this additional image in a further instance of step 1004 and map the additional image to the 3D scan in a further instance of step 1006.

In some cases, a user and/or user device might physically leave the real-world space associated with the spatially aware media between different instances of step 1004. For example, the user might want to add images or other media to spatially aware media in multiple different sessions. When the user and/or the user device re-enters the real-world space to capture an additional image of the real-world space, the spatially aware media engine 902 might not know the location of the user and/or the user device within the real-world space. As a result, the spatially aware media engine 902 might not have enough information to map an additional image obtained in a further instance of step 1004 to the 3D spatial features originally identified in step 1002. In these cases, a further instance of step 1002 may be performed to reidentify the 3D spatial features of the real-world space and help map the additional image to the 3D spatial features. This is shown by the arrow from step 1006 to step 1002 in FIG. 10. Performing further instances of step 1002 may be referred to as "reinitialization".

In some implementations, a further instance of step 1002 includes reinitializing a user and/or user device within a 3D scan of the real-world space obtained in a first instance of step 1002. The reinitialization might include determining the position of the user and/or user device relative to the 3D spatial features identified by the 3D scan. For example, the further instance of step 1002 may include measuring at least a portion of the real-world space to localize the user device within the real-world space. These measurements may include one or more images of the real-world space. Image analysis could be performed to recognize objects and/or patterns within the images that correspond to the 3D spatial features identified in the 3D scan, potentially allowing the position of the user device to be determined based on the relative positions of the 3D spatial features in the images. It should be noted that further instances of step 1002 might not need to measure an entire real-world space, but only a portion of the real-world space to identify known 3D spatial features and localize the user and/or user device relative to those known 3D spatial features. As such, further instances of step 1002 might not include full 3D scans of the real-world space.

Following a further instance of step 1002, the position of a user and/or a user device relative to the 3D spatial features in a real-world space may be known by the spatially aware media engine 902. An additional image of the real-world space could then be obtained in a further instance of step 1004 and mapped to the 3D spatial features of the real-world space in a further instance of step 1006.

In some implementations, a further instance of step 1004 may occur before a further instance of step 1002. For example, a further instance of step 1002 may include performing image analysis on an additional image obtained in a further instance of step 1004, to recognise previously identified 3D spatial features in the additional image.

Referring again to FIG. 9, the spatially aware media record 912 stores one or more instances of spatially aware media. Spatially aware media may be added to the spatially aware media record 912 after being generated using the spatially aware media generator 910, for example. Spatially aware media stored in the spatially aware media record 912 may also or instead be obtained from other sources, such as from one or both of the user devices 930, 950. In some implementations, the spatially aware media record 912 may be updated as additional media is added to stored spatially aware media.

The way in which spatially aware media is stored in the spatially aware media record 912 is not limited herein, and may depend on how the spatially aware media is generated. In general, stored spatially aware media may include one or more instances of media pertaining to a real-world space, 3D spatial information identifying 3D spatial features in the real-world space, and/or any tags assigned to the media and/or to the 3D spatial features.

In some implementations, media and 3D spatial information included in spatially aware media are stored together in the spatially aware media record 912. For example, if the spatially aware media includes an image of a real-world space, then the image and the 3D spatial features captured in that image may be stored in the form of a 3D image or a 3D model. For example, at least some of the pixels in the image could be an assigned XYZ coordinate.

In other implementations, the media and the 3D spatial information included in spatially aware media are stored separately. For example, a 3D scan of a real-world space and an image of the real-world space may be stored separately in the spatially aware media record 912. A mapping between the 3D scan and the image may also be stored in the spatially aware media record 912, allowing the 3D spatial features captured in the image to be identified based on this mapping. For example, the mapping may include a position (including a location and an orientation) of the camera that captured the image relative to the 3D spatial features and the field of view of the camera.

The 3D model record 914 may include virtual 3D models of objects, items, buildings, locations, scenery, people, anatomical features, animals and/or any other type of entity. A 3D model is a mathematical representation of an entity that is defined with a length, width and height. A 3D model may be positioned or otherwise defined within a 3D coordinate system, which could be a cartesian coordinate system, a cylindrical coordinate system or a polar coordinate system, for example. A 3D model may be entirely computer-generated or may be generated based on measurements of a real-world entity. Possible methods for generating 3D models from a real-world entity include photogrammetry and 3D scanning.

As illustrated in FIGS. 6 to 8, for example, a 3D model may be implemented in spatially aware media. This may allow a virtual object to be viewed at various different angles within a representation of a real-world space. Further, when a user is interacting with spatially aware media using a user device with 3D capabilities (such as a headset, for example), the 3D model may allow for 3D representations of the virtual object to be generated. For example, 3D representations of the virtual object might be achieved by displaying slightly different perspectives of the virtual object in each eye of a user, giving the object a 3D effect.

A 3D model stored in the 3D model record 914 may also have associated audio content and/or haptic content. For example, the 3D model record 914 could store sounds made by or otherwise associated with a model and/or haptic feedback that can provide a feel for a model.

In some implementations, one or more 3D models stored in the 3D model record 914 provide virtual representations of products sold online by merchants. As discussed in further detail elsewhere herein, spatially aware media may be augmented using these 3D models to present the products to a customer.

The 3D models in the 3D model record 914 could be obtained in any of a number of different ways. In some implementations, at least some of the 3D models are obtained from a user of the spatially aware media engine 902, such as from a customer or a merchant, for example. A merchant could generate one or more 3D models for any, one, some or all of the products sold in their stores. These 3D models may be provided directly to the spatially aware media engine 902 by the merchant, and/or the spatially aware media engine 902 may obtain the 3D models from a merchant's account on an e-commerce platform and/or from the merchant's online store. 3D models may also be obtained from other platforms, such as social media platforms, for example. In addition, some 3D models may be generated locally at the spatially aware media engine 902. For example, images or scans that are obtained by the spatially aware media engine 902 can be used to generate a 3D model.

The augmented media generator 916 includes, employs and/or implements one or more algorithms (possibly in the form of software instructions executable by the processor 904) that are capable of generating instances of augmented spatially aware media. FIGS. 6 to 8 provide examples of instances of augmented spatially aware media.

To generate an instance of augmented spatially aware media, possible inputs to the augmented media generator 916 include:
  Spatially aware media, optionally obtained from the spatially aware media record 912, for example.
  One or more 3D models, optionally obtained from the 3D model record 914, for example.
  A position or "anchor point" for a 3D model relative to the 3D spatial features identified by the spatially aware media. The virtual position may be obtained from user input at one or both of the user devices 930, 950, for example. Alternatively, as discussed elsewhere herein, the position may be automatically determined by the spatially aware media engine 902, for example.

Instances of augmented spatially aware media that are output by the augmented media generator 916 may include visual, haptic and/or audio content that is added to spatially aware media. This visual, haptic and/or audio content may be obtained from, or otherwise based on, a 3D model that is defined relative to the 3D spatial features of the corresponding real-world space. In this way, when added to the spatially aware media, the visual, haptic and/or audio content may match the 3D spatial features of the real-world space.

Visual content may allow a user to view a virtual object within an image provided by spatially aware media. This visual content may be generated and/or overlaid with an image based on a virtual position of the object relative to a viewpoint of the image in the corresponding real-world space.

Haptic content may allow a user to virtually touch and feel objects within augmented spatially aware media. In some cases, haptic content may alter the texture of 3D spatial features identified by spatially aware media. Haptic content might be implemented, at least in part, using clothing with built-in haptics, for example.

Audio content may allow a user to hear sounds within augmented spatially aware media. Audio content may implement spatial audio having a directionality corresponding to the virtual position of a source of the audio content within the augmented spatially aware media. In some implementations, spatial audio is produced by independently controlling the sounds played into each ear of a user.

Instances of augmented spatially aware media can be continuously or intermittently updated by the augmented media generator 916 in response to user input. For example, if a 3D model is moved to a new virtual position relative to the 3D spatial features of spatially aware media, then a new instance of augmented spatially aware media including updated virtual content can be generated to reflect the new position of the 3D model.

Figure 11:
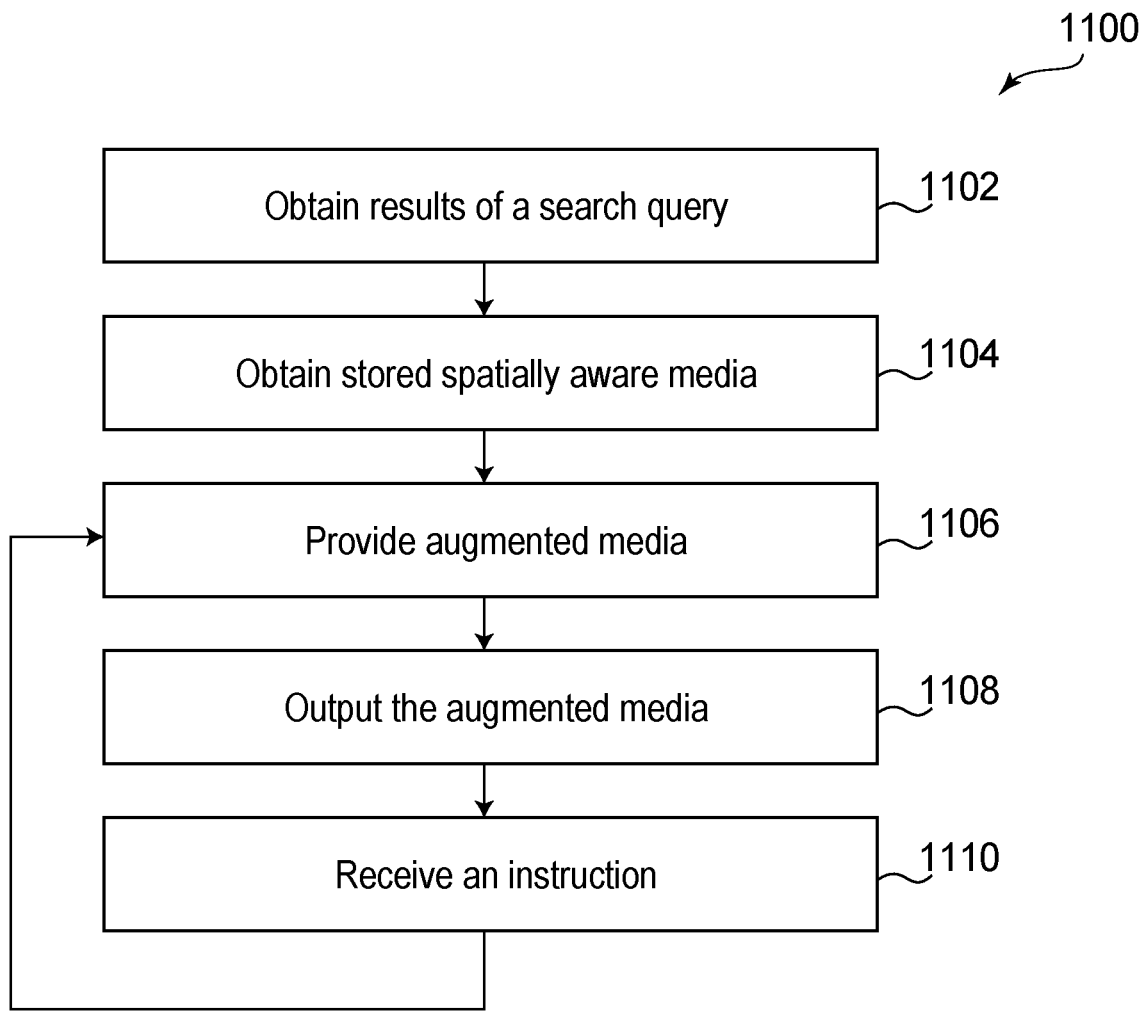
FIG. 11 is a flow diagram illustrating a method for providing augmented spatially aware media, according to an embodiment.

Referring now to FIG. 11, shown is a flow diagram illustrating a method 1100 for providing augmented media, according to an embodiment. The method 1100 will be described as being performed by the spatially aware media engine 902 of FIG. 9. For example, the augmented media generator 916 may include instructions which, when executed by the processor 904, cause the processor 904 to perform the method 1100. However, at least a portion of the method 1100 could instead be performed elsewhere, such as at the user device 930 and/or the user device 950, for example.

Step 1102 is an optional step that includes obtaining the results of a search query. The search query may have originated from user input at a device, such as one of the user devices 930, 950, for example. The results may include a plurality of 3D models that match the search query. These 3D models may be obtained from the 3D model record 914, or from elsewhere.

In some implementations, the search query is used to obtain 3D models with which to augment spatially aware media. For example, if a user wishes to augment spatially aware media with a virtual rubber duck, then the search query may include the search string "rubber duck" and the results of the search query may include multiple 3D models of rubber ducks.

In some implementations, the search query is generated to search for products in an online store. For example, the user of the user device 930 may have entered the search query into a search bar of the online store to search for a type of product. The results of the search query obtained in step 1102 may include a set of 3D models corresponding to different products sold by the online store that match the search query. The online store may provide these 3D models to the spatially aware media engine 902. Alternatively, or additionally, the online store may provide a list of products that match the search query, or even the search query itself, and the spatially aware media engine 902 may obtain the 3D models for the products from the 3D model record 914, for example.

In some implementations, step 1102 includes obtaining the results of multiple search queries originating from user input at the user device 930. The results of each of these search queries may include one or more 3D models. Referring again to the online store example described above, the user of the user device 930 may have entered multiple search queries into the online store to search for various different types of products. The combined results of each of the search queries may be obtained in step 1102.

It should be noted that step 1102 might not always be performed in every implementation of the method 1100. In some implementations, 3D models might be directly provided to or otherwise obtained by the spatially aware media engine 902, independent of a search query.

Step 1104 includes obtaining stored spatially aware media from the memory 906 or from another computer readable medium. For example, the spatially aware media may be obtained from the spatially aware media record 912. The spatially aware media may include an image of a real-world space and information identifying 3D spatial features of the real-world space. However, in general, the spatially aware media obtained in step 1104 could be any spatially aware media described herein. For example, the spatially aware media may also or instead include multiple images of the real-world space, a video of the real-world space, an audio recording of the real-world space and/or haptic textures of the real-world space.

In some implementations, the spatially aware media obtained in step 1104 is selected via/based on user input at the user device 930 or is even directly provided by the user device 930. For example, the user may wish to view the 3D models obtained in step 1102 in a particular real-world space and select the spatially aware media accordingly. This real-world space may be a real-world space that is associated with the user, such as a room of the user's house. The spatially aware media may instead correspond to a non-personal or generic space that is selected by the user.

In some implementations, the spatially aware media obtained in step 1104 may be automatically selected or suggested by the spatially aware media engine 902. For example, the spatially aware media engine 902 may select the spatially aware media from the spatially aware media record 912 based on the search query and/or the results of the search query of step 1102. Tags assigned to spatially aware media may be used to match search strings and/or search results to spatially aware media. Optionally, lookup tables and/or machine learning models may be implemented by the spatially aware media engine 902 to match search strings and/or search results to spatially aware media.

Consider, once again, the example in which the search query is generated to search for products in an online store. In addition to obtaining 3D models for products that match the search query, the spatially aware media engine 902 may also select spatially aware media pertaining to a real-world space that provides a suitable setting to display the products. For example, the spatially aware media may include tags that explicitly or implicitly match the search query. The selected spatially aware media may be associated with the user or be non-personal.

Step 1106 includes providing augmented media that is based on the spatially aware media obtained in step 1104 and on the results on the search query obtained in step 1102. For example, the augmented media may be based on at least some of the 3D models that are included in the results of the search query. Providing the augmented media may include the spatially aware media engine 902 generating the augmented media and/or receiving the augmented media from another device. As outlined elsewhere herein, augmented media may include visual, auditory and/or haptic content that is added to spatially aware media.

In some implementations, the augmented media provided at step 1106 includes multiple different instances of augmented media. The multiple different instances of augmented media could each include at least a portion of an image of the real-world space overlaid with a render of a respective one of at least some of the 3D models obtained in step 1102. This image of the real-world space may be provided by the spatially aware media obtained in step 1104 and may be defined relative to the 3D spatial features of the real-world space identified by the spatially aware media. The 3D models may also be defined relative to the 3D spatial features of the real-world space using user-defined and/or automatically generated positions for the 3D model. Therefore, in each instance of augmented media, a render of a respective 3D model may be overlaid with the image to realistically depict the 3D model within the real-world space.

The multiple different instances of augmented media might be provided at the same time, but this might not always be the case. The multiple instances of the augmented media might instead be provided at different times. For example, the multiple different instances might be provided individually or in groups. In this way, step 1106 might occur in multiple different stages.

In some implementations, the 3D spatial features of the real-world space identified by the spatially aware media may include a surface within the real-world space. One or more 3D models may be defined relative to the surface such that the 3D models are adjacent to the surface. A render of each 3D model might then depict a corresponding product or other object resting on the surface.

In some implementations, the spatially aware media includes lighting information that identifies and characterizes the lighting in the real-world space. This lighting information could be used to generate a render of the 3D model that more accurately depicts a product or object within the real-world space. For example, shadows, glare and/or reflections from the light sources in the real-world space may be incorporated into the render to illustrate the actual lighting in the real-world space.

In some implementations, the spatially aware media obtained in step 1104 includes multiple images of a real-world space, where a first image is from a first perspective in the real-world space and a second image is from a second perspective in the real-world space. In these implementations, the augmented media provided in step 1106 may include different instances of augmented media each including at least a portion of the first image overlaid with a render of a respective one of at least some the 3D models defined relative to the 3D spatial features of the real-world space, and include further different instances of augmented media, each including at least a portion of the second image overlaid with a render of a respective one of at least some of the 3D models. To obtain the renders included in these instances of augmented media, step 1106 may include rendering one or more 3D models based on the first perspective of the first image. Step 1106 may also or instead include rendering one or more 3D models based on the second perspective of the second image. Thus, the renders of the 3D models may reflect the viewpoint of the first and the second images in the spatially aware media.

According to an example, if a first 3D model and a second 3D model are included in the results of the search query obtained in step 1102, then the augmented media provided in step 1106 may include:

- a first instance including at least a portion of the first image overlaid with a render of the first 3D model based on the first perspective;
- a second instance including at least a portion of the first image overlaid with a render of the second 3D model based on the first perspective;
- a third instance including at least a portion of the second image overlaid with a render of the first 3D model based on the second perspective; and
- a fourth instance including at least a portion of the second image overlaid with a render of the second 3D model based on the second perspective.

The multiple 3D models that are used to generate the augmented media in step 1106 may be defined at different positions relative to the 3D spatial features of the real-world space. For example, the first 3D model may be defined at a first position relative to the 3D spatial features of the real-world space and the second 3D model may be defined at a second position relative to the 3D spatial features of the real-world space. The first instance of augmented media and the third instance of augmented media could both depict the first 3D model at this first location relative to the 3D spatial features of the real-world space. Similarly, the second instance of augmented media and the fourth instance of augmented media could both depict the second 3D model at the second location relative to the 3D spatial features of the real-world space.

In commerce applications, the multiple instances of augmented media provided in step 1106 may allow a user to quickly and easily compare different products in a particular real-world space. For example, the first 3D model and the second 3D model might correspond to two different products. The user may use the first and second instances of augmented media to compare these two products from the first perspective. The user may further use the third and fourth instances of augmented media to compare the two products from the second perspective. Because the spatially aware media is stored, the user can view the different products in the exact same first and second images of the real-world space at different times. Optionally, the real-world space might be specific to or otherwise associated with the user, and therefore the user is able to view the two products within a space that is relevant to them.

Step 1108 is an optional step that includes outputting the augmented media provided in step 1106 to a device, such as one or both of the user devices 930, 950, for example. If the augmented media includes visual content such as an augmented image, for example, then step 1108 may include outputting the visual content for display on the device. Audio and/or haptic content may also or instead be output for presentation on the device.

In some implementations, the device that the augmented media is output to in step 1108 might be the same device that was used to generate the search query of step 1102. For example, a user might generate the search query using the user device 930 and the 3D models that match the search query may be used to provide augmented media, which is then output for presentation on the user device 930.

In some implementations, the device that the augmented media is output to in step 1108 is associated with the user that first generated the spatially aware media. Further, the device that the augmented media is output to in step 1108 might be the same device that helped generate the spatially aware media. For example, a user may have generated spatially aware media by obtaining measurements and/or media in the real-world space using the user device 930. At a later time, when the user and/or the user device 930 are not present in the real-world space, the user might implement the method 1100 to augment that spatially aware media. The augmented media could be output for display on the user device 930. Alternatively, the spatially aware media may have been generated by the user device 930, and the augmented media may be output to another device, such as the user device 950, for example. In this case, the other device might not have 3D capabilities. For example, step 1108 may be performed through an internet browser running on a desktop computer, which may be generally unable to generate spatially aware media and/or an AR experience. However, the browser may still be able to display or otherwise output the augmented media in step 1108.

Step 1110 is an optional step that includes receiving an instruction. This instruction might originate from user input at one of the user devices 930, 950, for example. The type of instruction received in step 1110 is not limited herein. Non-limiting examples of instructions include:
- an instruction to output an instance of augmented media for display on a device;
- an instruction to add a 3D model to spatially aware media or to an instance of augmented media;
- an instruction to remove a 3D model from an instance of augmented media; and
- an instruction to move a 3D model in an instance of augmented media relative to the 3D spatial features of the corresponding real-world space.

In some implementations of step 1110, the instruction is received from the user device 930 while the user device 930 is displaying the first instance of augmented media defined above. The instruction may be to virtually reposition the first 3D model relative to the 3D spatial features of the real-world space. For example, the user of the user device 930 may want to view the first 3D model at a new position in the real-world space and generate the instruction to move the 3D model to this position.

Responsive to receiving the instruction, step 1106 may be performed a second time to provide updated augmented media based on the instruction. This is illustrated using an arrow from step 1110 to step 1106 in FIG. 11. The second occurrence of step 1106 may include redefining the first 3D model relative to the 3D spatial features of the real-world space based on the instruction. This redefining may result in the 3D model being moved to the new position, indicated by the instruction, relative to the 3D spatial features of the real-world space. The second occurrence of step 1106 may further include providing an updated first instance of augmented media based on the redefined 3D model, where the updated first instance of augmented media includes at least a portion of the first image overlaid with an updated render of the first 3D model redefined relative to the 3D spatial features of the real-world space. The updated render of the first 3D model depicts the first 3D model in the new position within the real-world space.

FIGS. 6 and 7 illustrate one example of the first instance of augmented media and the updated first instance of augmented media, respectively. The representation 602 of the stand-up kitchen mixer could correspond to a first position for the mixer relative to the 3D spatial features of the living room 402 and the representation 702 of the mixer may have been generated in response to an instruction to move the kitchen mixer to a new position.

It should be noted that the instruction to virtually reposition the first 3D model relative to the 3D spatial features of the real-world space might affect multiple different instances of augmented media. By way of example, a second occurrence of step 1110 might include receiving, from the user device 930, an instruction to display the third instance of augmented media defined above, but updated to reflect the new position of the first 3D model. The updated third instance of augmented media could include at least a portion of the second image and the first 3D model redefined at the new position relative to the 3D spatial features of the real-world space. A third occurrence of step 1106 might then be performed, which includes providing the updated third instance of augmented media.

In some implementations, multiple users may simultaneously interact with the same augmented media provided in step 1106. For example, the augmented media might be output to both of the user devices 930, 950 in step 1108. Further, both of the user devices 930, 950 might be used to generate instructions received in step 1110. The different users associated with the user devices 930, 950 may each view one or more of the different instances of the augmented media, add 3D models to the augmented media and/or virtually move the 3D models relative to the 3D spatial features of the real-world space. This is an example of a shared augmented media session.

In further implementations, multiple users might independently augment and interact with spatially aware media in different sessions. For example, the method 1100 might provide separate augmented media for the user devices 930, 950. Consider, for example, two users that reside in the same house. One user might be viewing a virtual representation of a couch in the house using an instance of augmented media, and the other user may be viewing a virtual representation of a lamp in the house using a different instance of augmented media. These instances of augmented media may be generated from the same spatially aware media. By virtue of the spatially aware media being stored by the spatially aware media engine 902, the two users may be interacting with the different instances of augmented media simultaneously, without each interfering with the other.

It should be noted that the order of steps 1102, 1104, 1106, 1108, 1110 in FIG. 11 is shown by way of example only. Different orders of steps 1102, 1104, 1106, 1108, 1110 are also contemplated. For example, step 1104 could be performed before step 1102. Additionally, or alternatively, two or more of steps 1102, 1104, 1106, 1108, 1110 could be performed in conjunction.

Further Examples of Augmented Media

Figure 12:
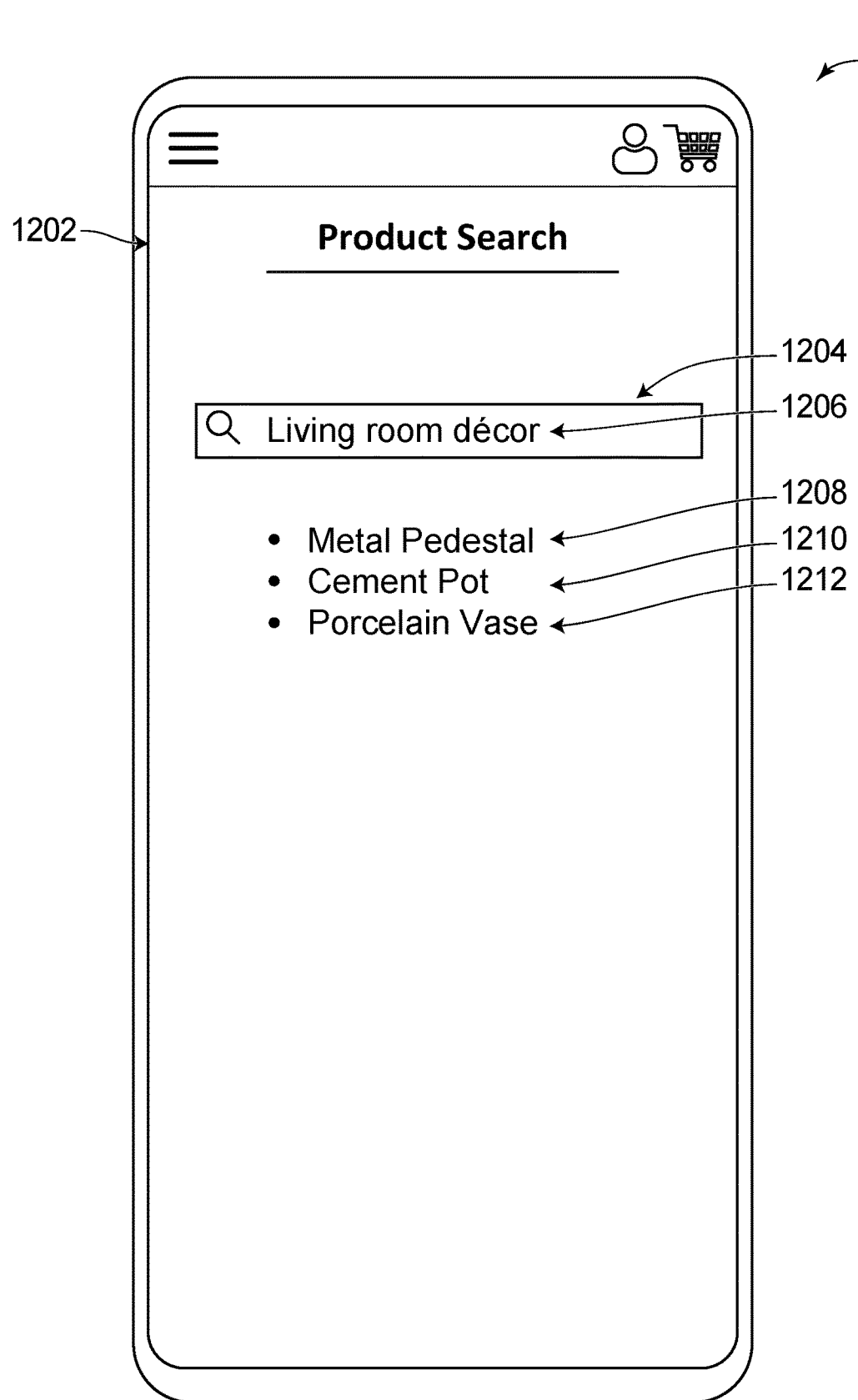
FIGS. 12 to 14 illustrate an example of using augmented spatially aware media to present products to a customer through an online store, according to an embodiment.
Figure 13:
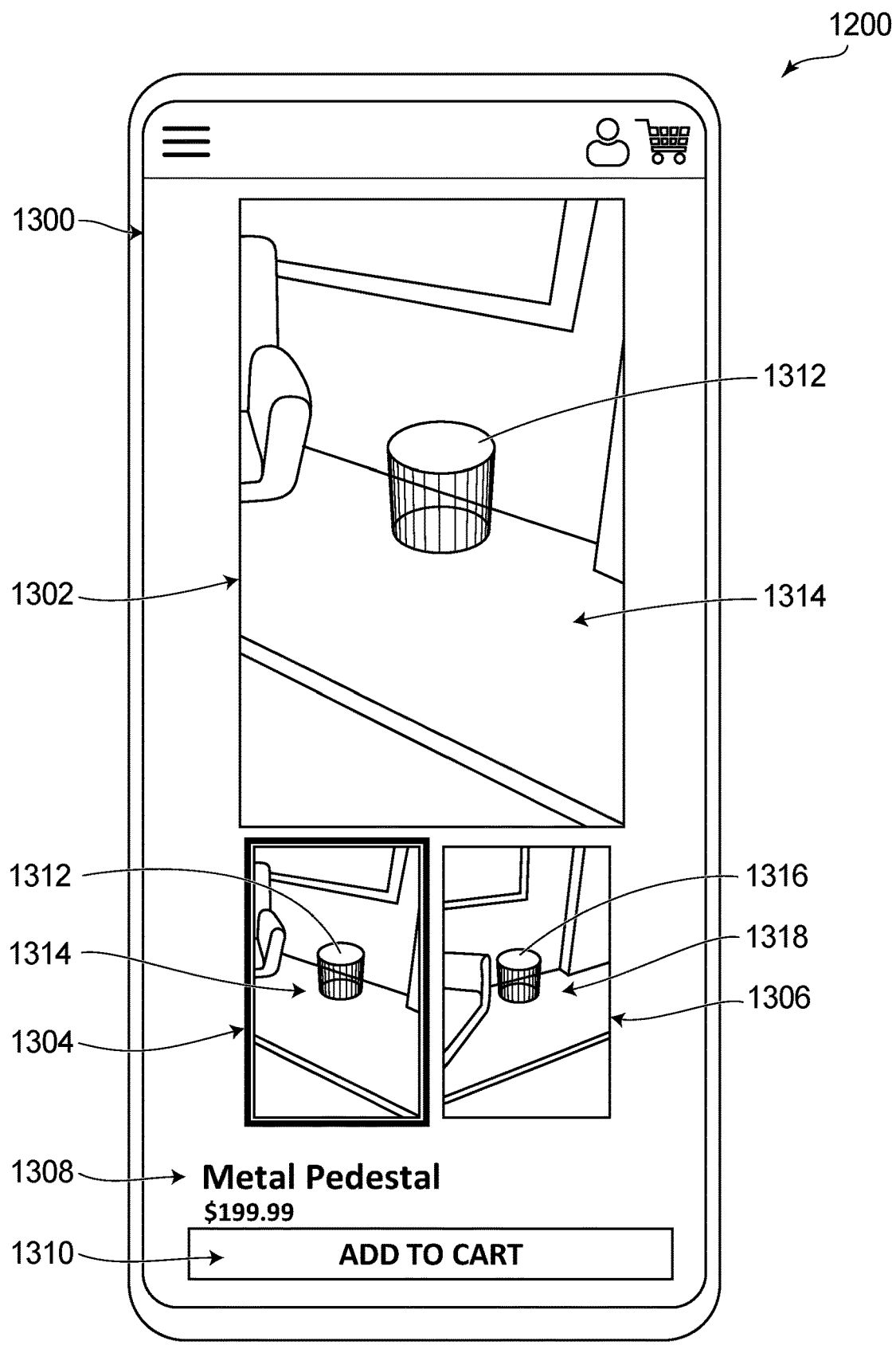
Figure 14:
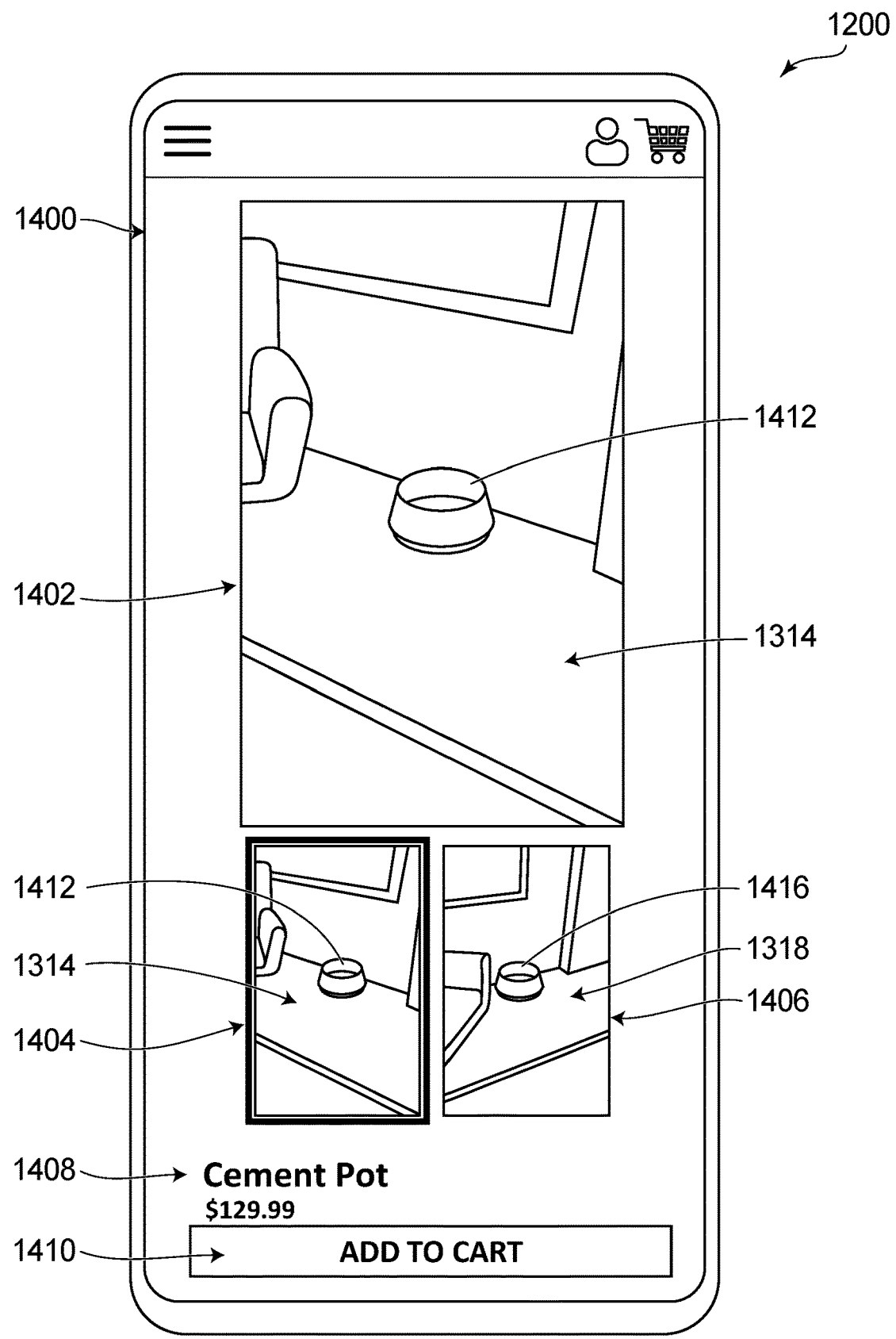

FIGS. 12 to 14 illustrate examples of using augmented spatially aware media to present products to a customer. These examples may be implemented at least in part using the spatially aware media engine 902 of FIG. 9 and/or the method 1100 of FIG. 11, for example.

FIG. 12 illustrates a user device 1200 displaying a screen page 1202 of an online store, according to an embodiment. The screen page 1202 enables a user to perform a search of products sold in the online store. The screen page 1202 includes a search bar 1204 containing a search query 1206. In the illustrated example, the search query 1206 includes the search string "living room décor". The screen page 1202 further includes a list of multiple products 1208, 1210, 1212 that match the search query 1206.

In some implementations, when the search query 1206 is received by the online store from the user device 1200, the online store might compile the list of products 1208, 1210, 1212 and output the list for display on the user device 1200. Further, the online store might obtain one or more 3D models that correspond to the products 1208, 1210, 1212. These 3D models may be provided to a spatially aware media engine in order to generate augmented spatially aware media with which to present the products 1208, 1210, 1212 to the user. In this way, the list of the products 1208, 1210, 1212 and/or the corresponding 3D models are an example of results of the search query 1206 that may be obtained by a spatially aware media engine in step 1102 of the method 1100. The spatially aware media engine may be implemented by the online store, but this might not always be the case. The spatially aware media engine might instead be implemented as a separate service or application.

FIG. 13 illustrates the user device 1200 displaying another screen page 1300 of the online store. The screen page 1300 may have been generated and output for display on the user device 1200 in response to selection of the product 1208 in the screen page 1202. For example, the screen page 1300 might be a product page for the product 1208. The screen page 1300 includes a description 1308 of the product 1208 and an option 1310 to purchase the product 1208.

The screen page 1300 further includes two options 1304, 1306 that illustrate different instances of augmented spatially aware media displaying the product 1208. Either of the options 1304, 1306 may be selected via user input at the user device 1200 to display the corresponding instance of augmented spatially aware media on the user device 1200. In the illustrated example, the option 1304 is selected in the screen page 1300, and therefore an instance 1302 of augmented spatially aware media corresponding to the option 1304 is shown in the screen page 1300. Selection of the option 1306 via user input at the user device 1200 could result in a further screen page being generated and output for display on the user device 1200, which displays an instance of augmented spatially aware media corresponding to the option 1306 in place of the instance 1302. In this way, the user can switch between the different instances of augmented spatially aware media associated with the options 1304, 1306.

The option 1304 and the instance 1302 each include a render 1312 of a 3D model of the product 1208 overlaid with an image 1314 of a real-world living room. The option 1306 includes a different render 1316 of the same 3D model of the product 1208 overlaid with a different image 1318 of the living room. The images 1314, 1318 may be provided by spatially aware media pertaining to the living room. As shown in the options 1304, 1306 and in the instance 1302, the product 1208 is depicted resting on the floor of the living room. The 3D model of the product 1208 may have been defined at this position relative to the 3D spatial features of the living room defined by the spatially aware media. The images 1314, 1318 each show a different perspective of the living room, and the renders 1312, 1316 reflect the position of the 3D model of the product 1208 from the different perspectives of the images 1314, 1318. In this way, the options 1304, 1306 correspond to instances of augmented spatially aware media that provide different viewpoints of the product 1208 in the living room.

In some implementations, the instances of augmented spatially aware media associated with the options 1304, 1306 are generated in step 1106 of the method 1100. The screen page 1300 may enable the user to move the 3D model of the product 1208 relative to the 3D spatial features of the living room, which could result in updated instances of augmented spatially aware media being generated.

The original spatially aware media that was augmented to provide the options 1304, 1306 may be obtained in step 1104 of the method 1100. This spatially aware media might be specific to or otherwise associated with the user of the user device 1200. For example, the living room may be a room of the user's house and the user may have previously generated the spatially aware media to personalize their online shopping experiences. The user device 1200 may have been used to capture the images 1314, 1318 and/or measure the 3D spatial features of the living room. In some implementations, the user may have provided an explicit instruction to display the product 1208 using the spatially aware media pertaining to the living room. Alternatively, the spatially aware media may have been automatically selected. For example, the spatially aware media may have been tagged as corresponding to a living room and may have been selected based on the phrase "living room" included in the search query 1206.

In some implementations, the spatially aware media that is augmented to provide the options 1304, 1306 is not associated with the customer. For example, the living room may be a generic room of a house that is used to display living room products in the online store. Non-personal spatially aware media may be preferred for user privacy in some cases. For example, the use of non-personal spatially aware media may avoid images of a user's home being shared. Alternatively, the user of the user device 1200 might simply not have any stored spatially aware media associated with their living room, and therefore spatially aware media pertaining to a non-personal/generic living room may be implemented instead.

FIG. 14 illustrates the user device 1200 displaying yet another screen page 1400 of the online store. The screen page 1400 includes two options 1404, 1406 to view different instances of augmented spatially aware media, an instance 1402 of augmented spatially aware media corresponding to the option 1404, a description 1408 of the product 1210 and an option 1410 to purchase the product 1210. Selection of the option 1406 via user input at the user device 1200 could result in a further screen page being generated and output for display on the user device 1200, where the further screen page displays an instance of augmented spatially aware media corresponding to the option 1406 in place of the instance 1402. In some implementations, the screen page 1400 is generated and output to the user device 1200 in response to selection of the product 1210 in the screen page 1202.

The options 1404, 1406 may correspond to the same spatially aware media as the options 1304, 1306 of FIG. 13, but depict the product 1210 instead of the product 1208. The option 1404 and the instance 1402 each include a render 1412 of a 3D model of the product 1210 overlaid with the image 1314 of the living room. The option 1406 includes a different render 1416 of the 3D model of the product 1210 overlaid with the image 1318. The position of the 3D model of the product 1210 relative to the 3D spatial features of the living room may be substantially the same as the position of the 3D model of the product 1208. In some implementations, all of the instances of augmented spatially aware media corresponding to the options 1304, 1306, 1404, 1406 are generated in step 1106 of the method 1100.

The options 1304, 1306, 1404, 1406 provided by the screen pages 1300, 1400 may enable the user to browse the products 1208, 1210 of the online store and view those products within a real-world space that is relevant to the user. Because the spatially aware media is pre-generated and stored, the user and/or the user device 1200 do not need to be physically within the living room to virtually add the products 1208, 1210 to the living room. Also, the user is able to view each of the products 1208, 1210 within the exact same images 1314, 1318 of the living room, even if products 1208, 1210 are viewed at different times and/or from different locations. This may allow the user to compare the products 1208, 1210 in the same setting. Further, the user is able to view the products 1208, 1210 from multiple different perspectives simultaneously. This may help enable an efficient, flexible and personalized online shopping experience for the user.

Although not shown in FIGS. 13 and 14, the instances of augmented spatially aware media corresponding to the options 1304, 1306, 1404, 1406 may depict shadows produced by the products 1208, 1210. For example, the spatially aware media for the living room may include lighting information. Using this lighting information, the properties of the 3D models for the products 1208, 1210 and the positions of the 3D models, the shadows that would be cast by the products 1208, 1210 in the living room may be predicted. These shadows may then be depicted in the instances of augmented spatially aware media. Reflections and glare on the products 1208, 1210 may also or instead be depicted in the renders 1312, 1316, 1412, 1416 of the 3D models.

Determining Product Placements in Spatially Aware Media

As outlined above, spatially aware media may allow virtual products and/or other objects to be presented to customers in a personalized context. In some implementations, augmenting spatially aware media is done automatically when a user is viewing online content, without the customer having to specifically request that the spatially aware media be augmented. Consider an advertising use case, for example. When presenting digital advertisements to a user, the advertisements might be more interesting and compelling for the user if they depict a product in a real-world space that is personal to the customer. Therefore, an advertisement for a product may implement augmented spatially aware media that depicts the product within a real-world space that is personal to the user. In other words, the advertisement may be personalized for the user.

In some cases, augmented spatially aware media may be automatically generated to advertise a product to a user when/while the user is browsing an online store. However, advertisements based on augmented spatially aware media are in no way limited to online stores, and can more generally be implemented in any medium.

A challenge associated with automatically generating augmented spatially aware media using 3D models is that the virtual position of a 3D model relative to the 3D spatial features of a corresponding real-world space may need to be automatically determined. In contrast, when a user initiates the augmentation of spatially aware media using a 3D model, then the user may provide a desired or suitable position for the 3D model relative to the 3D spatial features of the real-world space. Having a user select a position for a 3D model might not be convenient for the user or even possible when spatially aware media is automatically augmented.

Without a suitable position for a 3D model relative to the 3D spatial features of a real-world space defined by spatially aware media, it may be difficult to augment the spatially aware media using the 3D model in a contextually relevant manner. Consider the advertising use case. A suitable position for a 3D model of a product in a real-world space might be required to effectively augment spatially aware media to create a compelling advertisement. If the product is depicted in a distasteful or absurd position within the real-world space, then the advertisement might have no effect or even a counter-productive effect on a user. For example, augmenting an image of a user's living room to display a television behind the user's couch or on top of the user's couch would not allow the user to appreciate a practical look of the television in their living room and might not increase the user's interest in purchasing the television. On the other hand, if the television is displayed at a suitable position in front of the user's couch, then the user might better appreciate a practical look of the television in their living room and be more compelled to purchase the television.

Accordingly, a need exists for systems and methods to automatically determine suitable positions for 3D models relative to the 3D spatial features of a real-world space defined by spatially aware media. Some embodiments of the present disclosure implement look-up tables, machine learning (ML) models, heuristic functions and/or other computer-implemented functions to meet this need. For example, before spatially aware media is augmented using a 3D model of a product, an ML model may be implemented to determine a suitable position or placement for the 3D model relative to the 3D spatial features of real-world space defined by the spatially aware media. This may allow the augmented spatially aware media to depict the product in a contextually relevant position within the real-world space, without any user input.

In some embodiments, look-up tables, ML models, heuristic functions and/or other computer-implemented functions are also or instead implemented to automate other aspects of augmenting spatially aware media. For example, an ML model may be trained to recommend spatially aware media with which to present a 3D model of a product.

Figure 15:
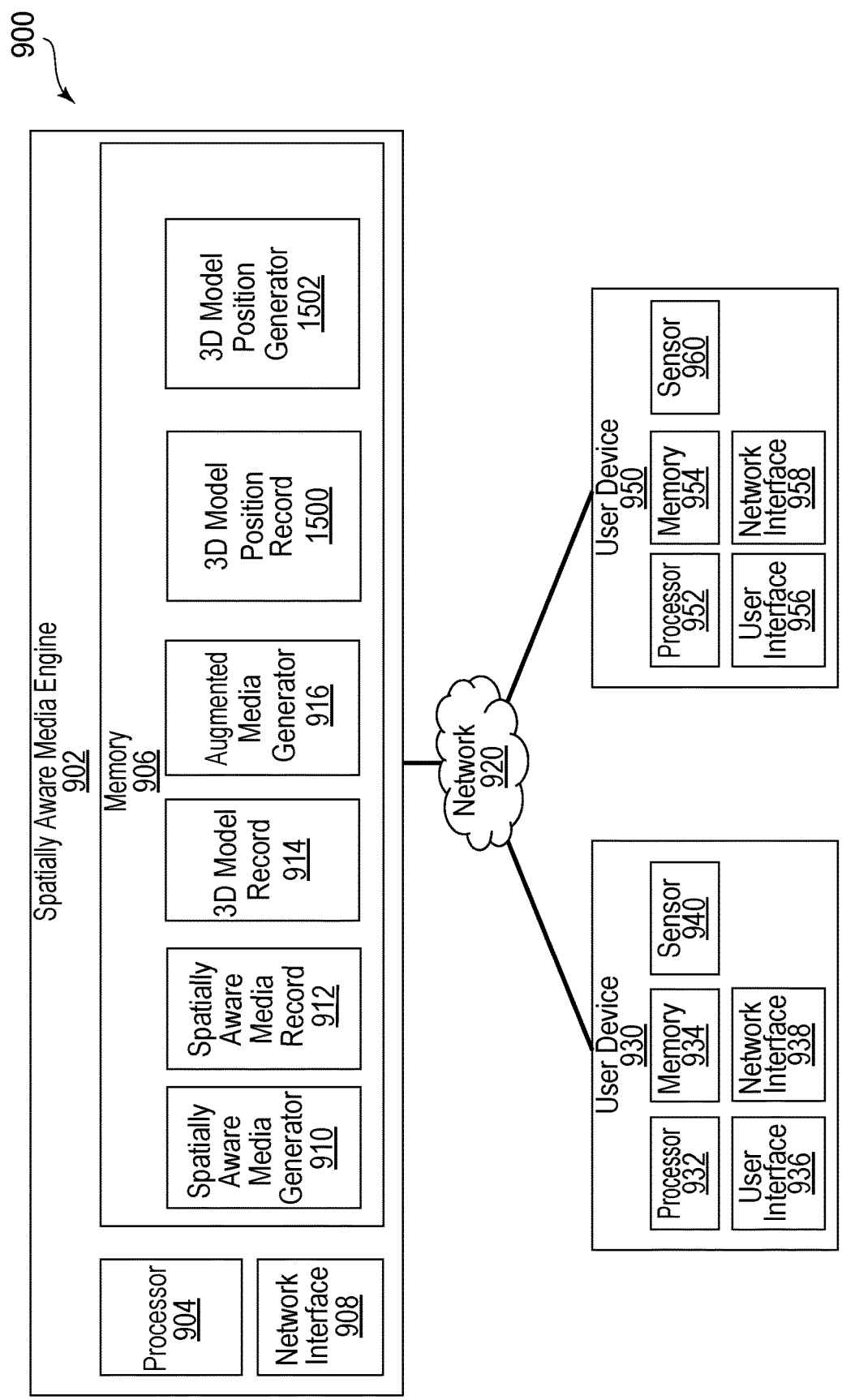
FIG. 15 illustrates the system of FIG. 9, but including a 3D model position record and a 3D model position generator.

Example Systems and Methods for Virtually Positioning 3D Models in Real-World Spaces FIG. 15 illustrates the system 900 of FIG. 9, but with a 3D model position record 1500 and a 3D model position generator 1502 stored in the memory 906. In general, the 3D model position record 1500 stores information regarding previous placements of 3D models relative to the 3D spatial features of spatially aware media. Based at least in part on the 3D model position record 1500, the 3D model position generator 1502 may recommend, suggest or otherwise provide positions for 3D models when augmenting spatially aware media. A position for a 3D model relative to the 3D spatial features of spatially aware media may also be referred to as an "anchor point" for the 3D model.

In some cases, a recommended position for a 3D model that is output by the 3D model position generator 1502 may be input into the augmented media generator 916. This recommended position could define where the 3D model is virtually positioned within one or more instances of augmented spatially aware media.

The 3D model position record 1500 may store information or data collected from user input. For example, when user input at the user device 930 selects a position for a particular 3D model relative to the 3D spatial features of a real-world space defined by spatially aware media, then this position may be obtained by the spatially aware media engine 902 and stored in the 3D model position record 1500. The user input may include tapping, clicking and/or drag-and-drop operations performed on the user interface 936. A position for the 3D model may be selected when the user initiates the generation of augmented spatially aware media. A position for the 3D model may also or instead be selected after the generation of augmented media when the user creates an instruction to move the 3D model to a different position. In some cases, the user input may be obtained by the spatially aware media engine 902 in step 1110 of the method 1100. Because the position of the 3D model is user-defined, the position may be considered a realistic, suitable and/or contextually relevant position for the object represented by the 3D model in the real-world space.

The way in which positions for 3D models are defined in the 3D model position record 1500 is not limited herein. In some implementations, a position for a 3D model is defined as a coordinate and/or an orientation within a coordinate system that is mapped to a real-world space. In some implementations, a position of a 3D model is defined relative to the identified 3D spatial features of a real-world space. For example, a position for a 3D model of a painting could be defined as being 1.5 meters from the lowest surface in a real-world space (which may correspond to the floor of the real-world space) on a vertical wall of the real-world space. The exact coordinate of the 3D model on the vertical wall may also be stored.

In some cases, the 3D spatial information provided by spatially aware media may extend beyond identifying the surfaces of a real-world space. More specific features such as the furniture, walls, floors, lights and/or windows in a real-world space, to name but a few, may be identified or tagged in spatially aware media. The position of a 3D model may be defined relative to these tagged 3D spatial features. For example, the position of a 3D model of a painting may be defined as being 0.5 meters from a light source that is directed towards the painting.

User-defined positions of 3D models may be arranged or organized in any of a variety of different ways in the 3D model position record 1500. In some implementations, position data is organized in terms of 3D models and/or in terms of the objects represented by 3D models. When a user augments spatially aware media using a particular 3D model, then a data entry for the user-defined position of the 3D model may be created and added to a data set for the 3D model and/or to a data set for the object that is represented by the 3D model. This data entry could include, inter alia, an identifier (ID) of the spatially aware media, information about the spatially aware media (obtained from the spatially aware media record 912, for example), and the user-defined position of the 3D model relative to the 3D spatial features of the spatially aware media. Information about the spatially aware media may include information identifying the 3D spatial features of the spatially aware media and any tags assigned to the spatially aware media, for example. In this way, the data set may provide an indication as to where the 3D model and/or the object represented by the 3D model fits into different real-world spaces.

Table 1 below provides an example of storing multiple user-defined positions for a particular 3D model in different instances of spatially aware media. The columns in Table 1 could be considered different data entries corresponding to user-defined positions for the 3D model relative to 3D spatial features of respective real-world spaces.

TABLE 1

Multiple user-defined positions for a particular 3D model in different spatially aware media

| | | | |
|---|---|---|---|
| Spatially aware media ID | SAM-135 | SAM-722 | SAM-906 |
| Spatially aware media tags | "kitchen"; "bright" | "living room"; "basement" | "dining room"; "spacious"; "yellow" |
| User ID that provided the position | U-109360 | U-668574 | U-234791 |
| Distance from the position to the lowest surface of the corresponding real-world space | 1.00 m | 1.10 m | 1.5 m |
| Distance from the position to the nearest vertical wall of the corresponding real-world space | 0.2 m | 0.1 m | 0.2 m |

TABLE 1-continued

Multiple user-defined positions for a particular 3D model in different spatially aware media

| | | | |
|---|---|---|---|
| Distance from the position to a table surface in the corresponding real-world space | 0 m | 0 m | 0 m |
| Distance from the position to a couch in the corresponding real-world space | N/A | 2.2 m | N/A |

In some implementations, the 3D model position record 1500 defines different types of objects and may organize user-defined positions of 3D models based on the type of object they represent. Objects that are the same type may be in some way similar to each other, such that a suitable position for one of these objects may also be a suitable position for the other objects. Non-limiting examples of objects that may be the same type include objects that are the same product (for example, the objects might be different variants of the same product), objects that are the same product type or category, objects that are the same color and/or objects that have a same tag. User-defined positions for 3D models corresponding to the same type of object may be combined in a data set stored by the 3D model position record 1500. By way of example, the 3D model position record 1500 may combine data entries for any object corresponding to a white office chair.

In some implementations, position data is organized in the 3D model position record 1500 in terms of spatially aware media and/or in terms of the real-world spaces corresponding to spatially aware media. For example, when a user augments spatially aware media using a 3D model, then a data entry for the user-defined position of the 3D model may be created and added to a data set for that spatially aware media and/or for the real-world space corresponding to the spatially aware media. This data entry could include, inter alia, an ID of the 3D model, information about the 3D model (obtained from the 3D model record 914, for example), and the user-defined position for the 3D model relative to the 3D spatial features of the real-world space. In this way, the data set may provide an indication as to where different 3D models fit in the real-world space defined by the spatially aware media.

Information about 3D models may be stored and/or used by the 3D model position record 1500 to help correlate different 3D models with user-defined positions in a real-world space. When a 3D model corresponds to a product, the information about the 3D model may include product information such as product features, a product type or category (which could be hierarchical), dimensions, color(s), a product description, tags and/or metafields, for example. The product information may be obtained from the 3D model record 914 and/or from a merchant that sells the product. In some cases, product information may include placement information, such as tags that identify suitable rooms or positions for the product. Placement information may be provided by customers that have purchased the product and/or merchants that sell the product, for example.

Table 2 below provides an example of storing multiple user-defined positions for particular spatially aware media. The columns in Table 2 could be considered different data entries corresponding to user-defined positions for respective 3D models in the spatially aware media.

TABLE 2

Multiple user-defined positions for different 3D models in particular spatially aware media

| | | | |
|---|---|---|---|
| ID of the 3D model | M-4376 | M-9011 | M-8462 |
| User ID that provided the position | U-109340 | U-667574 | U-134791 |
| Product type for the 3D model | Television | Couch | Vase |
| Product tags for the 3D model | "wall mount"; "living room" | "dorm room"; "college life" | "antique"; "vintage" |
| Color of the 3D model | Black | Beige | Green |
| Dimensions of the object corresponding to the 3D model | 2.0 × 0.3 × 1.0 m | 3.1 × 0.8 × 0.6 m | 0.2 × 0.2 × 0.4 m |
| Coordinate for the location of the 3D model | x: 3.33 m<br>y: −3.18 m<br>z: 1.1 m | x: 3.95 m<br>y: 1.92 m<br>z: 0.10m | x: −2.82 m<br>y: −5.47 m<br>z: 1.5 m |
| Vector for the orientation of the 3D model | 1.3x − 3.6y + 3.2z | 2.8x + 0.3y − 0.2z | 0.2x − 0.4y − 2.1z |

In some implementations, the 3D model position record 1500 defines different types of real-world spaces and may organize 3D model position data based on these types of real-world spaces. Real-world spaces that are the same type may be physically separate from each other, but provide a similar scene, setting or environment. For example, different types of rooms, such as living rooms, bedrooms, kitchens, etc., may each be considered a different type of real-world space. In some cases, two different real-world spaces can have a similar appearance. For example, a neighbourhood or an apartment building might include multiple similar units with similar dimensions, layouts and/or other 3D spatial features. These units might be considered to belong to the same type of real-world space. A suitable position for a product in one of these units may also be a suitable position in the other units. User-defined positions for 3D models in spatially aware media pertaining to any, some or all of these units may be collected and combined in the 3D model position record 1500, in order to increase the size of the data set for the units.

In some implementations, user-defined positions are organized in the 3D model position record 1500 by user. For example, when a user augments spatially aware media using a 3D model, then a data entry for the user-defined position of the 3D model in the spatially aware media may be created and added to a data set that is specific to that user. The data entry may include information about both the 3D model and the spatially aware media.

It should be noted that Tables 1 and 2 are only some examples of data structures that may be implemented by the 3D model position record 1500. In general, the positions of 3D models may be stored in any form of list, array (of any dimension) and/or data tree, for example.

The 3D model position generator 1502 includes, implements and/or employs one or more algorithms (optionally in the form of software instructions executable by the processor 904) that can output, recommend or otherwise provide a position (including a location and orientation) for a 3D model relative to the 3D spatial features of a real-world space defined by spatially aware media. These algorithms may be trained or otherwise generated based on the information stored in the 3D model position record 1500. For example, the algorithms may be trained to predict or emulate user-defined positions for 3D models.

The accuracy and precision with which the 3D model position generator 1502 may recommend a position for a 3D model relative to 3D spatial features of a real-world space may depend on how the 3D spatial features are defined by spatially aware media. If the spatially aware media only identifies the surfaces of the real-world space, then a recommended position for the 3D model might be based on the sizes, orientations and relative locations of the surfaces. Consider, for example, a case in which the 3D model position generator 1502 is implemented to recommend a position for a 3D model of a television. Based on user-defined positions stored in the 3D model position record 1500, the 3D model position generator 1502 might determine that users typically place this 3D model and/or other 3D models of televisions on a horizontal surface approximately 0.7 m from the lowest surface in a real-world space. This may correspond to a table surface that is approximately 0.7 m from the ground of the real-world space. Accordingly, the 3D model position generator 1502 may recommend a similar surface of a real-world space for positioning the 3D model of the television.

In some implementations, the 3D spatial information provided by spatially aware media goes beyond identifying surfaces in a real-world space. For example, objects such as furniture, lights and windows in a real-world space may be identified or tagged in spatially aware media. The 3D model position generator 1502 may then be able to provide more detailed recommendations for 3D model positions based on the positions of tagged objects. Referring again to the case in which the 3D model position generator 1502 is implemented to recommend a position for the 3D model of the television, the 3D model position generator 1502 may determine that users typically place other 3D models of televisions about 3 m away from features tagged as couches in spatially aware media. Accordingly, the 3D model position generator 1502 may recommend a position for the 3D model of the television that is a similar distance from a feature that is tagged as a couch.

In some implementations, 3D spatial information in spatially aware media identifies or tags some 3D spatial features as being movable. A moveable 3D spatial feature is a feature, such as an object, that is not fixed in a real-world space. As such, the 3D spatial feature may be replaced with other objects. By way of example, the surfaces 502, 504, 506, 508 of FIG. 5 may be identified as movable 3D spatial features because they correspond to furniture in the living room 402, whereas the surfaces 500, 510 might be identified as fixed structures of the living room 402.

The spatially aware media generator 910 may permit a moveable 3D spatial feature to be replaced with a 3D model when augmenting the spatially aware media. This may be referred to as "diminished reality". To replace a feature of a real-world space in augmented media, the 3D model position generator 1502 may select a position for a 3D model within the real-world space such that a render of the 3D model will be superimposed over the feature. In one example, spatially aware media associated with a living room may include spatial information that identifies a couch as a moveable 3D spatial feature. The 3D model position generator 1502 might therefore recommend a position for a 3D model that overlaps with the couch in the real-world space. In such a case, the couch may be replaced with a render of the 3D model in an instance of augmented spatially aware media. In another example, a light fixture in a real-world space may be replaced by rendering a 3D model of a chandelier on top of the light fixture in augmented media.

The algorithms implemented in the 3D model position generator 1502 may include one or more look-up tables, ML models, heuristic functions and/or other computer-implemented functions.

A look-up table implemented by the 3D model position generator 1502 may be specific to a 3D model or to particular spatially aware media. For example, a look-up table that is specific to a 3D model could be implemented by determining the average and/or most common positions for the 3D model in different spatially aware media and/or in different types of real-world spaces using data sets stored in the 3D model position record 1500. Similarly, a look-up table that is specific to particular spatially aware media could be implemented by determining the average and/or most common positions for different 3D models, different objects and/or different types of objects in the spatially aware media using data sets stored in the 3D model position record 1500. A look-up table may also or instead be specific to a particular object, to a particular type of object and/or to a type of real-world space.

ML models could be implemented by the 3D model position generator 1502 using any form or structure known in the art. Example structures for ML models include but are not limited to:
- one or more artificial neural network(s);
- one or more decision tree(s);
- one or more support vector machine(s);
- one or more Bayesian network(s);
- one or more genetic algorithm(s); or combinations thereof.

An ML model implemented by the 3D model position generator 1502 may be trained using data stored in the 3D model position record 1500 or using any other source of data. The methods used to train ML models are implementation specific and are not limited herein. Non-limiting examples of training methods include:
- supervised learning;
- unsupervised learning;
- reinforcement learning;
- self-learning;
- feature learning; and
- sparse dictionary learning.

In supervised learning, training is performed by analyzing input data in a training data set, making quantitative comparisons, and cross-referencing conclusions with a known result in the training data set. Iterative refinement of these analyses and comparisons allows an ML model to achieve greater certainty between the result predicted by the ML model and the known result. This process is continued iteratively until the solution converges or reaches a desired accuracy.

In unsupervised learning, an ML model determines and draws its own connections from a training data set. This can be done by looking into naturally occurring data relationships or patterns in the training data set. One method for implementing unsupervised learning is cluster analysis, in which the goal is to discover groups or clusters within the training data set. A cluster is a set of variables that are treated similarly by an ML model. In cluster analysis, the ML model will subdivide the training data set to determine clusters that have high intra-group similarities and low inter-group similarities. The number of clusters used in a cluster analysis may be configurable in the ML model.

Similar to a look-up table, an ML model implemented by the 3D model position generator 1502 may be specific to a 3D model, to an object, to a type of object, to particular spatially aware media, and/or to a type of real-world space. The specificity of an ML model may be dictated by the training data set used to train the ML model. Non-limiting examples of ML model specificity include:
- An ML model that is trained using user-defined positions for one 3D model. The ML model might be considered specific to that 3D model and might not be used to determine positions for any other 3D models.
- An ML model that is trained using user-defined positions for one object or one type of object. The ML model might be considered specific to that object or type of object and might only be used to determine positions for 3D models that represent that object or type of object.
- An ML model that is trained using user-defined positions relative to the 3D spatial features of spatially aware media. The ML model might be considered specific to that spatially aware media and might only be used to determine positions for 3D models relative to the 3D spatial features of the spatially aware media.
- An ML model that is trained using user-defined positions relative to 3D spatial features of one type of real-world space. The ML model might be considered specific to that type of real-world space and might only be used to determine positions for 3D models relative to the 3D spatial features of spatially aware media that pertain to that type of real-world space.
- An ML model that is trained using user-defined positions provided by one user or by one set of users. The ML model might be considered specific to that user or set of users.

It should be noted that combinations of the different examples of ML model specificity provided above are contemplated. For example, an ML model might be trained using user-defined positions for one type of object relative to 3D spatial features of one type of real-world space.

In some cases, an ML model might not be trained with any specificity. For example, the ML might be used to determine positions for any 3D model in any spatially aware media.

Figure 16:
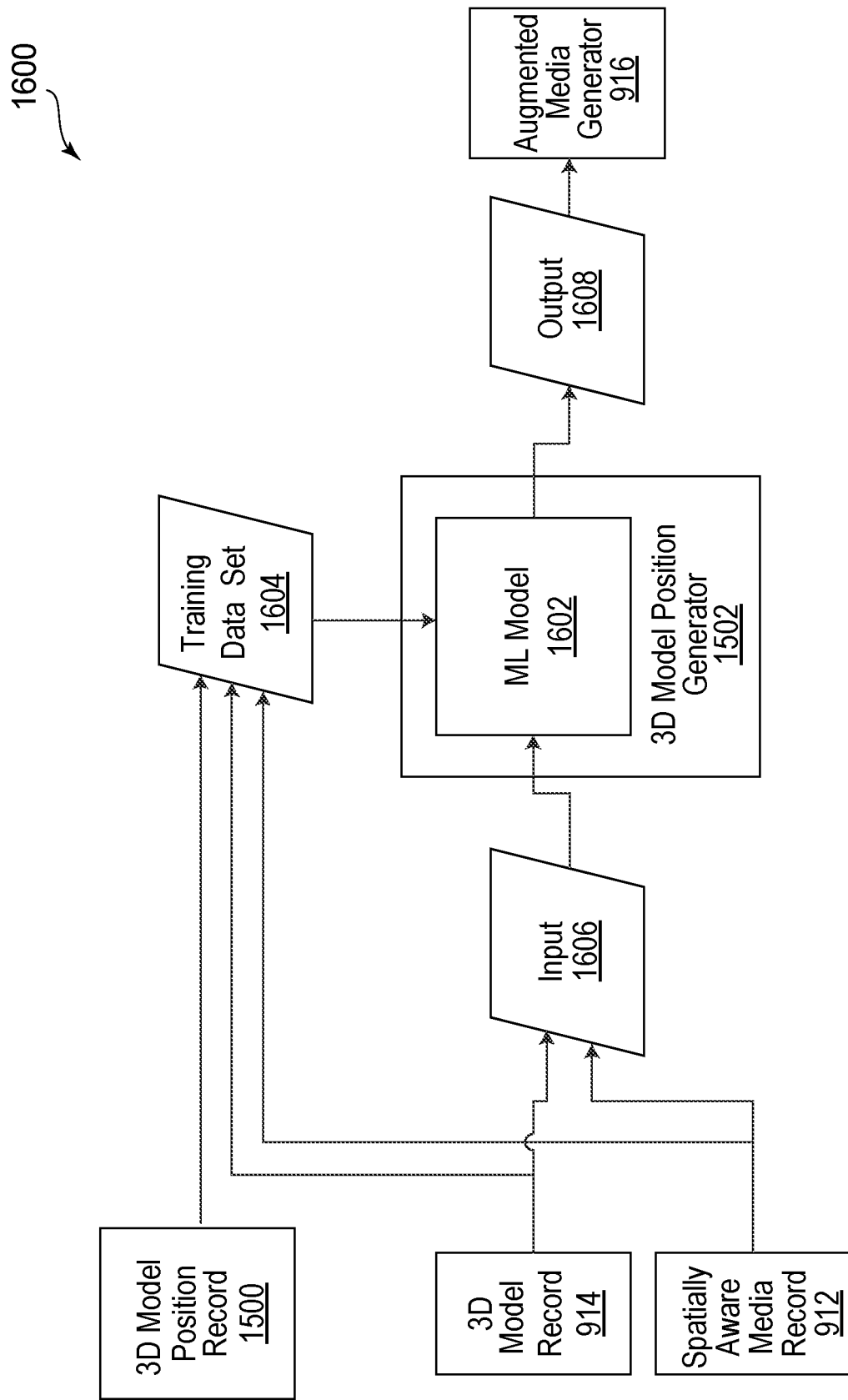
FIG. 16 is a flow diagram illustrating a process for training and implementing an ML model to determine a position for a 3D model relative to 3D spatial features of a real-world space, according to an embodiment.

FIG. 16 is a flow diagram illustrating a process 1600 for training and implementing a ML model 1602 to determine a position for a 3D model relative to 3D spatial features of a real-world space, according to an embodiment. As shown, the process 1600 implements the spatially aware media record 912, the 3D model record 914, the 3D model position record 1500, the 3D model position generator 1502, and the augmented media generator 916 of the spatially aware media engine 902. As such, the process 1600 may be performed by the spatially aware media engine 902.

In the process 1600, the ML model 1602 is implemented and/or employed by the 3D model position generator 1502. The spatially aware media record 912, the 3D model record 914 and/or the 3D model position record 1500 provide a training data set 1604 that is used to train the ML model 1602. The ML model 1602 is initially trained prior to the ML model 1602 being used to determine positions for 3D models. The ML model 1602 may also be continuously or intermittently trained using the training data set 1604, for example, as the training data set 1604 is updated when new information becomes available in the spatially aware media record 912, the 3D model record 914 and/or the 3D model position record 1500.

After training, the ML model 1602 may receive an input 1606 provided by at least one of the spatially aware media record 912 and the 3D model record 914, and provide an output 1608 that includes a position for a 3D model relative to the 3D spatial features of a real-world space. In some implementations, the output 1608 may include a coordinate and an orientation vector defined within a coordinate system that is mapped to the real-world space. For example, the output 1608 may include (x, y, z) coordinates defining the location of a 3D model and an [x, y, z] vector defining the orientation of the 3D model. In some implementations, the output may define a position for a 3D model relative to specific 3D spatial features of the real-world space. For example, the output may define a surface for the 3D model to be placed on and optionally a (x, y) coordinate for the 3D model on that surface. The output 1608 may be sent to the augmented media generator 916 to generate augmented media based, at least in part, on the position for the 3D model relative to the 3D spatial features of the real-world space.

In some implementations, the ML model 1602 is specific to one 3D model. For example, the ML model 1602 might be configured to provide positions for the 3D model relative to the 3D spatial features of different real-world spaces. Table 1 provides an example of a training data set that may be used to train the ML model 1602 to be specific to a 3D model. In these implementations, the input 1606 may include information identifying 3D spatial features of a real-world space defined by spatially aware media obtained from the spatially aware media record 912. Optionally, the input 1606 includes other information regarding the spatially aware media, such as any tags assigned to the spatially aware media, for example. The output 1608 may provide a suggested or recommended position for the 3D model relative to those 3D spatial features.

In some implementations, the ML model 1602 may be specific to an object or to a type of object. The ML model 1602 might be configured to provide positions for any 3D model representing that object or type of object relative to the 3D spatial features of different real-world spaces. In these implementations, the input 1606 may include information identifying 3D spatial features of a real-world space defined by spatially aware media obtained from the spatially aware media record 912. The input 1606 may also include information about the specific 3D model and/or object that is to be positioned, but this might not always be the case. The ML model 1602 may instead be configured to determine the position independent of the 3D model and/or object.

In some implementations, the ML model 1602 is specific to particular spatially aware media. The ML model 1602 may be configured to provide positions for different 3D models relative to the 3D spatial features defined by the spatially aware media. Table 2 (above) provides an example of a training data set that may be used to train the ML model 1602 to be specific to spatially aware media. In these implementations, the input 1606 may include information about a 3D model to be positioned in the spatially aware media and/or about the object represented by the 3D model. The information may be obtained from the 3D model record 914, for example. If the 3D model corresponds to a product, then the information may include product information. Using the information about the 3D model and/or the object, the ML model 1602 may produce the output 1608 that includes a suggested position for the 3D model relative to the 3D spatial features defined by the spatially aware media.

In some implementations, the ML model 1602 is specific to a particular type of real-world space, such as a type of room in a house, for example. The input 1606 for the ML model 1602 may include the information about a 3D model and/or about an object represented by the 3D model to be placed in spatially aware media pertaining to that type of real-world space. As noted above, a type of real-world space may correspond to similar units in an apartment building or a neighbourhood. If the ML model 1602 is specific to a unit in an apartment building and multiple users are consistently positioning 3D models of kitchen tables at a certain position within those units, then this may be reflected in the training data set 1604 and result in the output 1608 providing a similar position for a 3D model of a kitchen table to a resident of the units.

In some implementations, the ML model 1602 might be specific to both a type of object and to a type of real-world space. As such, the ML model 1602 may be used to recommend a position for 3D models corresponding to that type of object in different spatially aware media associated with that type of real-world space. Here, the input 1606 may include information about the spatially aware media and/or information about a 3D model to be positioned relative to the 3D spatial features defined by the spatially aware media.

The process 1600 could be used in any of a number of different applications. For example, automatically determining a position for a 3D model may be useful when generating augmented spatially aware media without any user input. In an advertising use case, spatially aware media associated with a user could be augmented with a 3D model based on a position obtained using the process 1600. The resulting augmented media may provide an appealing depiction of a product at a contextually relevant position within a real-world space that is specific to the user. Automatically determining a position for a 3D model relative to 3D spatial features of a real-world space may also be applied in AR applications, for example, to automatically position a 3D model within an AR experience.

Figure 17:
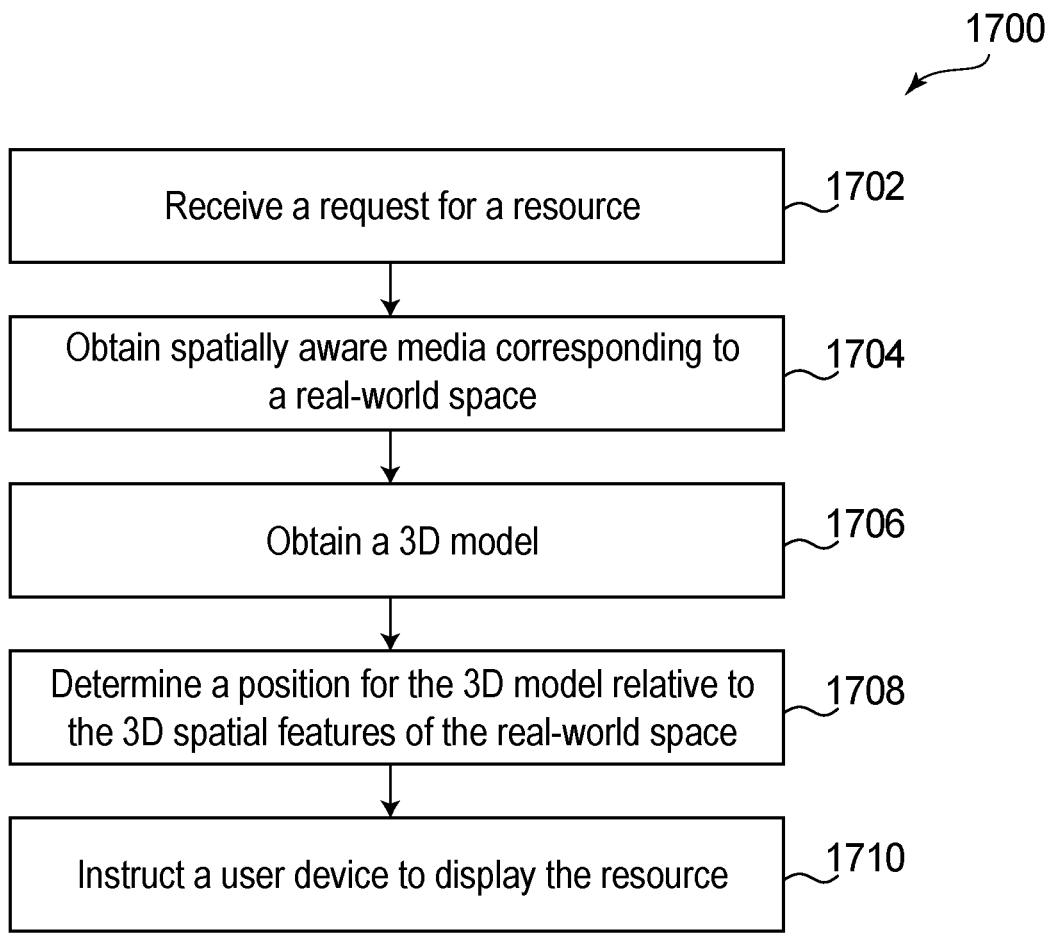
FIG. 17 is a flow diagram illustrating a method for providing augmented spatially aware media using an automatically determined position for a 3D model, according to an embodiment.

FIG. 17 is a flow diagram illustrating a method 1700 for providing augmented spatially aware media using an automatically determined position for a 3D model, according to an embodiment. The method 1700 will be described as being performed by the spatially aware media engine 902 of FIG. 15. For example, the memory 906 may store instructions which, when executed by the processor 904, cause the processor 904 to perform the method 1700. However, at least a portion of the method 1700 could instead be performed elsewhere, such as at the user device 930 and/or the user device 950, for example.

Step 1702 is an optional step that includes receiving a request for a resource, which may be or include a screen page (such as a webpage of a website or a page of a mobile application, for example), a computer file and/or another digital resource, for example. In some cases, the request may be received from one of the user devices 930, 950 via the network 920. User input at the user interface 936 may generate the request, which is then transmitted to the spatially aware media engine 902.

In some implementations, the resource requested in step 1702 relates to one or more products, or more generally to one or more objects. For example, the resource may be a screen page of an online store that displays products available in the online store. The resource may also or instead be a screen page that includes product advertisements. Augmented spatially aware media may be implemented in the resource requested in step 1702 to present products or objects to a user in a realistic and personalized manner.

Steps 1704, 1706, 1708, 1710 generally relate to replying or responding to the request received in step 1702. However, it should be noted that any, one, some or all of steps 1704, 1706, 1708, 1710 may be performed without a request for a resource being obtained in step 1702.

Step 1704 includes obtaining spatially aware media from the memory 906 or another computer readable medium. For example, the spatially aware media may be obtained from the spatially aware media record 912. The spatially aware media may include an image of a real-world space and information identifying 3D spatial features of the real-world space. However, in general, the spatially aware media obtained in step 1704 could be any spatially aware media described herein. For example, the spatially aware media may also or instead include multiple images of the real-world space, a video of the real-world space, an audio recording of the real-world space and/or haptic textures of the real-world space. The spatially aware media obtained in step 1704 may be associated with the user of the user device that generated the request received in step 1702. In some cases, step 1704 may be similar to step 1104 of FIG. 11.

In some implementations, the specific spatially aware media obtained in step 1704 is selected via user input at a user device. Alternatively, or additionally, the spatially aware media obtained may be automatically selected or recommended by the spatially aware media engine 902 based on the resource requested in step 1702. For example, if the resource is a product page for a couch, then the spatially aware media engine 902 may automatically select or suggest spatially aware media that is in some way associated with the couch. The spatially aware media may correspond to a living room and may be selected based on one or more tags assigned to the couch and/or to the spatially aware media, for example. Look-up tables, ML models and/or other functions may be implemented to match spatially aware media to the resource requested in step 1702.

Step 1706 includes obtaining a 3D model of an object from the memory 906 or from another computer readable medium. For example, the 3D model may be obtained from the 3D model record 914. The object represented by the 3D model may be a product sold in an online store, but this might not always be the case. The object may more generally be any real-world or virtual object.

The 3D model may be obtained in any of a number of different ways. In some cases, the 3D model may be selected based on a search query that forms part of the request for the resource received in step 1702. For example, while the user device 930 is browsing an online store, the user device 930 may generate a product search query. For each of the products that match the product search query, a corresponding 3D model may be obtained in step 1706.

In some cases, the 3D model obtained in step 1706 may correspond to a product that is advertised on a screen page. When the user device 930 requests the screen page in step 1702, the 3D model may be obtained in order to generate the advertisement for inclusion in the screen page.

Step 1708 includes determining a recommended position for the 3D model obtained in step 1706 relative to the 3D spatial features of the real-world space defined by the spatially aware media obtained in step 1704. The recommended position may provide a suitable, realistic, natural or contextually relevant position within the real-world space to present the object depicted by the 3D model. In some cases, the recommended position is based on previous user-defined positions in order to mimic the positions that users prefer.

Step 1708 may be performed based on at least one of the spatially aware media and the 3D model of the object. When step 1708 is performed based on the spatially aware media, the 3D spatial features defined by the spatially aware media and/or any tags assigned to the spatially aware media may be parsed by the spatially aware media engine 902 to determine the recommended position. When step 1708 is performed based on the 3D model of the object, product information for the object and/or any tags assigned to the 3D model may be parsed by the spatially aware media engine 902 to determine the recommended position.

In some implementations, step 1708 is performed using the 3D model position generator 1502 and/or the process 1600. For example, look-up tables, ML models, heuristic functions and/or other computer-implemented functions may be used by the 3D model position generator 1502 to generate or otherwise determine the recommended position for the 3D model.

When an ML model is implemented, step 1708 may include providing an input to the ML model and obtaining, based on an output of the ML model, the position for the 3D model relative to the 3D spatial features of the real-world space. This input to the ML model may be based on at least one of the spatially aware media and the 3D model. However, the exact inputs for the ML model are implementation specific and may depend on the specificity of the ML model.

In some cases, the input to an ML model implemented in step 1708 may include at least some of the information identifying the 3D spatial features of the real-world space defined by the spatially aware media obtained in step 1704. This is an example of step 1708 being performed based on the spatially aware media. The input to the ML model may also or instead include information about the object represented by the 3D model obtained in step 1706. If the object corresponds to a product, then this information may be or include product information for the object. This is an example of step 1708 being based on the 3D model obtained in step 1706.

The training data set that is used to train an ML model implemented in step 1708 is not limited herein. In some implementations, the training data set for the ML model includes information identifying 3D spatial features of multiple different real-world spaces and user-defined positions of one or more 3D models in those real-world spaces. These 3D models may include the 3D model that was obtained in step 1706. The 3D models may also or instead include other 3D models that are similar to the 3D model, such as 3D models corresponding to the same object and/or type of object, for example. However, in some cases, the ML model is specific to the 3D model obtained in step 1706, and therefore only user-defined positions of that 3D model might be used to train the ML model.

In some implementations, the training data set for the ML model includes information about multiple objects and user-defined positions of corresponding 3D models relative to the 3D spatial features of the real-world space defined by the spatially aware media obtained in step 1704. The ML model may be specific to this real-world space as a result of the training data set. Any, one, some or all of the multiple objects may correspond to products, and therefore the training data set may include product information for the objects.

In some implementations, the training data set for the ML model includes information identifying 3D spatial features of multiple real-world spaces, information about multiple objects, and user-defined positions of corresponding 3D models in those real-world spaces. The multiple real-world spaces may correspond to the same type of real-world space and/or the multiple objects might correspond to the same type of object. Alternatively, the training data set may apply to multiple types of objects and to multiple types of real-world spaces, and therefore the ML model might be broadly used to recommend positions for 3D models in real-world spaces.

In some implementations of step 1708, the recommended position for the 3D model overlaps with a 3D spatial feature of the real-world space. For example, this 3D spatial feature may be tagged or otherwise identified as moveable by the spatially aware media, and therefore the spatially aware media engine 902 may be permitted to select positions for the 3D model that overlap with the moveable 3D spatial feature. In contrast, if another 3D spatial feature is not identified as moveable, then the position for the 3D model might be selected so as to not overlap with this other 3D feature.

In some implementations, a moveable 3D spatial feature may include a tag corresponding to, or associated with, the object represented by the 3D model. For example, the moveable 3D spatial feature and the object may correspond to the same type of object. The position of the 3D model determined in step 1708 may then be based on the position of the moveable 3D spatial feature relative to the other 3D spatial features of the real-world space. By way of example, if the spatially aware media includes information that identifies a particular 3D spatial feature as being a moveable couch and the 3D model corresponds to a couch, then the spatially aware media engine 902 may provide a recommended position for the 3D model that corresponds to (i.e., overlaps with) the position of the real-world couch.

Step 1710 includes instructing a user device to display the resource requested in step 1702. As noted above, this resource may be a screen page, a computer file and/or another digital resource. The user device that is instructed to display the resource in step 1710 may be the same user device that provided the request for the resource in step 1702. For example, the user device 930 may have generated a request for a screen page of an online store in step 1702, and in step 1710 the screen page may be generated and transmitted to the user device 930 along with an instruction to display the screen page.

The resource may include augmented media based on the spatially aware media obtained in step 1704, the 3D model obtained in step 1706 and the position for the 3D model determined in step 1708. This augmented media may be generated using step 1106 of the method 1100, for example. The form of augmented media included in the resource is implementation specific. In general, any augmented media disclosed herein may be included in the resource. By way of example, if the spatially aware media includes an image of the real-world space, then the augmented media may include at least a portion of the image overlaid with a render of the 3D model defined at the determined position relative to the 3D spatial features of the real-world space. If the position of the 3D model overlaps with a moveable 3D spatial feature of the real-world space, then the moveable 3D spatial feature may be removed in the augmented media. The augmented media may also or instead include audio and/or haptic content that is based on the 3D model obtained in step 1706 and on the position for the 3D model determined in step 1708.

In some implementations, the 3D spatial features of the real-world space identified by the spatially aware media include a surface of the real-world space. The recommended position for the 3D model determined in step 1708 may include a coordinate on that surface. The 3D model may then be defined relative to the surface such that the augmented media depicts the object resting on the surface. As an example, the spatially aware media may correspond to a user's kitchen and a counter in the kitchen may be a 3D spatial feature characterized by the spatially aware media. A recommended position for a 3D model of a coffee maker in the kitchen may include a coordinate on the kitchen counter, which could be based on previous placements of that coffee maker or other coffee makers in kitchens. The augmented media might then include an image of the kitchen overlaid with a render of the 3D model such that the coffee maker appears to be resting on the counter of the kitchen. The recommended position for the 3D model of the coffee maker may also include an orientation for the coffee maker such that the coffee maker is facing away from a wall, for example.

Further Examples of Virtually Positioning 3D Models in Real-World Spaces

FIGS. 18 to 21 illustrate an example of a user experience provided in part by automatically positioning 3D models in a real-world space. This user experience will be described as being implemented by an online store, but this is only an example. Other computing systems may also implement such a user experience. The user experience of FIGS. 18 to 21 may be provided by the spatially aware media engine 902 and/or the method 1700, for example.

Figure 18:
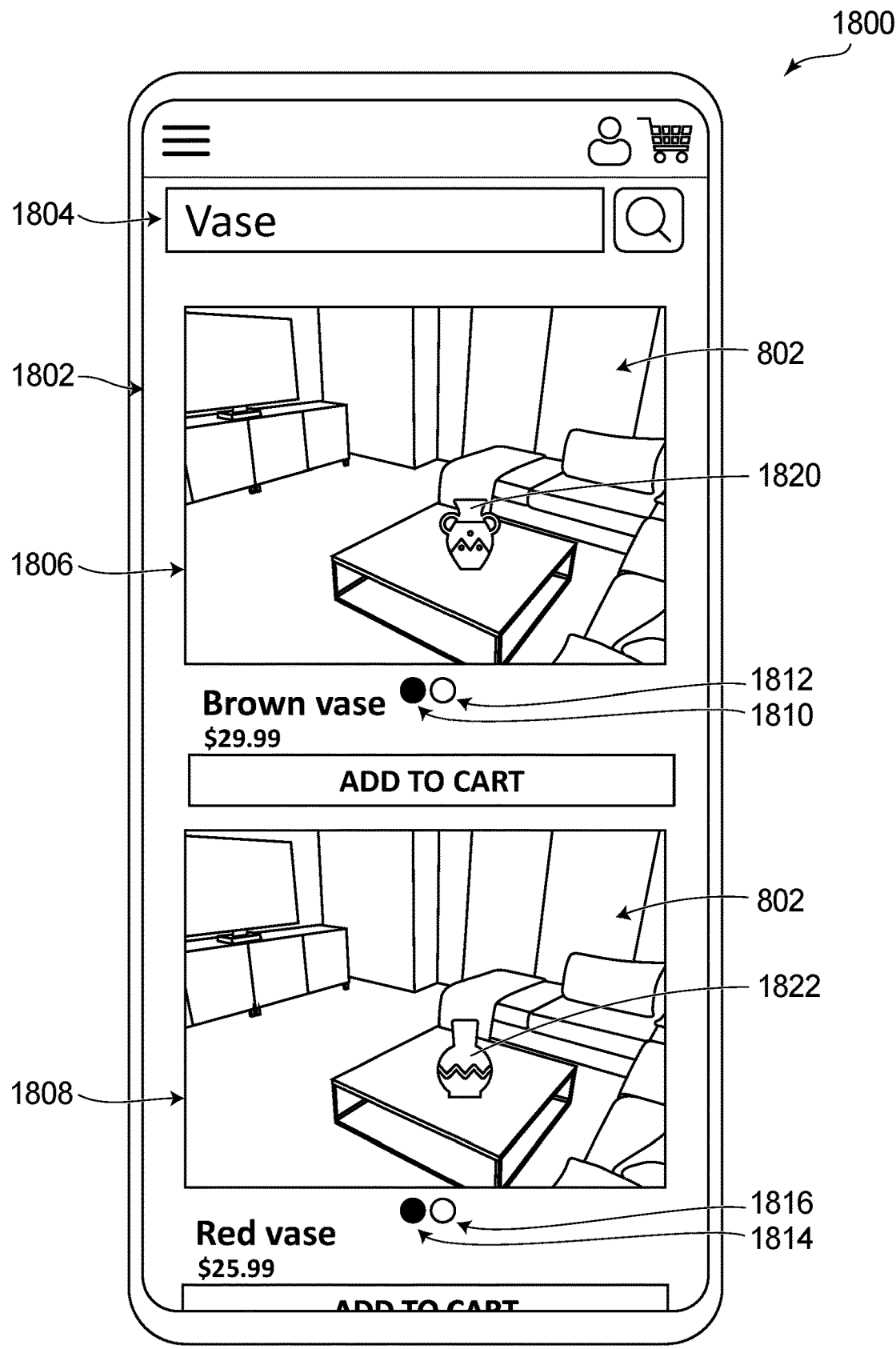
FIGS. 18 to 21 illustrate an example of a user experience in an online store provided in part by automatically positioning 3D models in a real-world space, according to an embodiment.

FIG. 18 illustrates a user device 1800 displaying a screen page 1802 of the online store. The screen page 1802 includes a search bar 1804 that includes a search query with the term "Vase". This search query may have been generated by user input at the user device 1800 and then transmitted to the online store, which generates the screen page 1802 in response to receiving the search query. In the illustrated example, the screen page 1802 presents a first product and a second product that match the search query (referred to as "Brown vase" and "Red vase", respectively). Additional products may also match the search query, which could be displayed on the user device 1800 when the user scrolls up or down on the screen page 1802, for example. The search query is an example of a request for a resource (i.e., the screen page 1802) that could be obtained in step 1702 of the method 1700.

The first product and the second product are each displayed in a respective instance 1806, 1808 of augmented spatially aware media in the screen page 1802. The instance 1806 includes a render 1820 of a 3D model of the first product and the instance 1808 includes a render 1822 of a 3D model of the second product. In the illustrated example, these renders are overlaid onto the same image 802 of the living room 402 of FIG. 8. The spatially aware media that is used to generate the instances 1806, 1808 includes the image 802 and may further include information identifying the 3D spatial features of the living room 402. These 3D spatial features may include, but are in no way limited to, the surfaces 500, 502, 504, 506, 508, 510, 512, 514 illustrated in FIG. 5. The spatially aware media could be obtained in step 1704 of the method 1700, and the 3D models of the first and second products could be obtained in step 1706, for example.

In some implementations, the living room 402 may be specific to the user of the user device 1800. As such, the instances 1806, 1808 of augmented spatially aware media may display the first and second products to the user in a personalized context. The user may also be able to more easily compare the first and second products as each is depicted in the same image 802 of the living room 402. As shown, the user can simultaneously view and compare the first and second products in the living room 402.

The screen page 1802 further includes multiple options 1810, 1812, 1814, 1816 that allow the user to view different instances of augmented spatially aware media. In FIG. 18, the options 1810, 1814 correspond to the instances 1806, 1808 of augmented spatially aware media, respectively, and are selected in the screen page 1802. Therefore, the instances 1806, 1808 are included in the screen page 1802. User input at the user device 1800 could select either of the other options 1812, 1816, which may result in different instances of augmented spatially aware media being displayed on the user device 1800.

Figure 19:
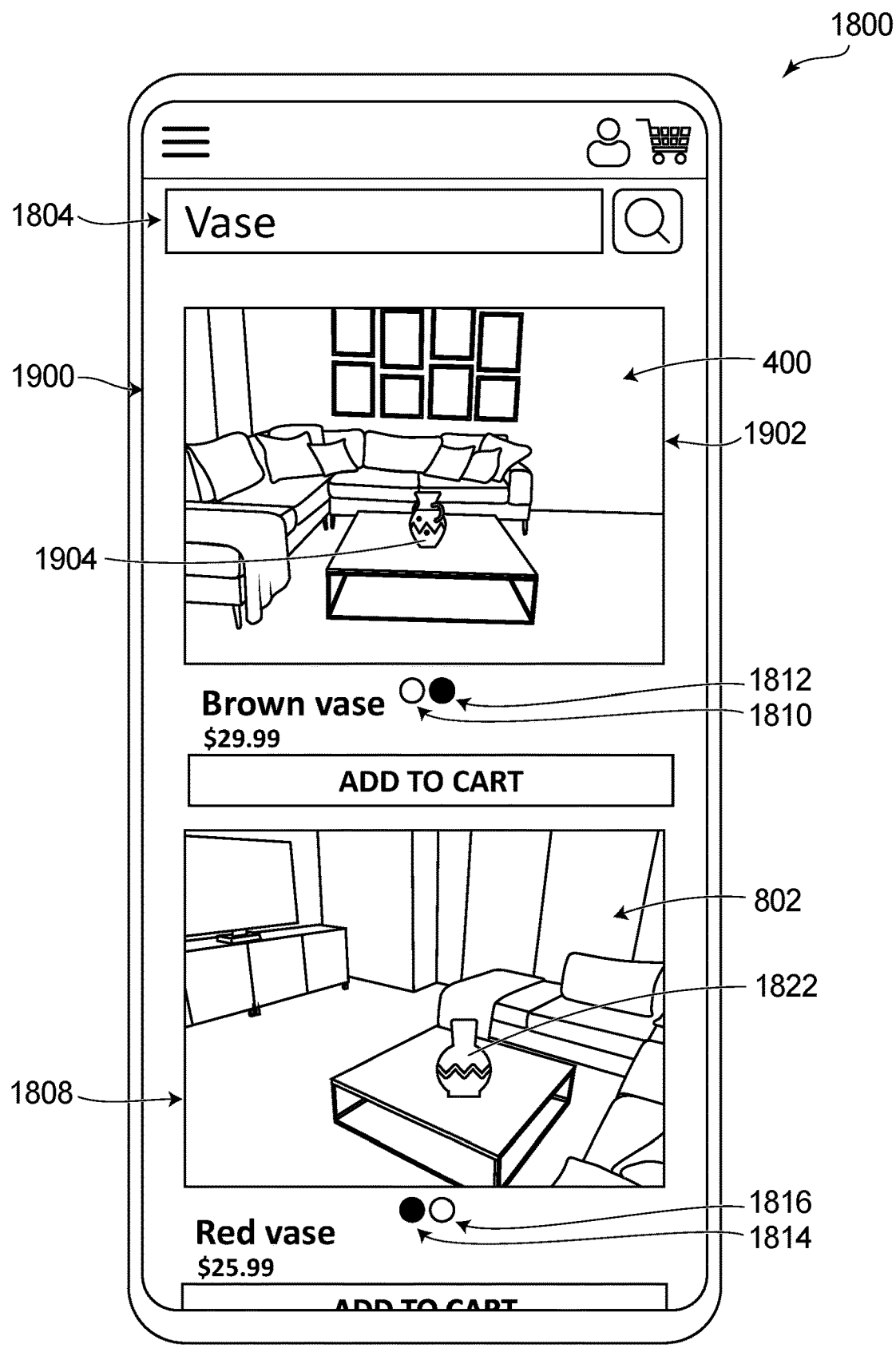

FIG. 19 illustrates the user device 1800 displaying another screen page 1900 of the online store. The screen page 1900 generally corresponds to the screen page 1802, but the option 1812 is selected instead of the option 1810. As a result, a different instance 1902 of augmented spatially aware media is displayed in place of the instance 1806. The instance 1902 corresponds to the same spatially aware media for the living room 402 as the instance 1806, and also includes a render 1904 of the 3D model of the first product. However, the render 1904 is overlaid onto the image 400 of the living room 402 of FIGS. 4 to 7, which shows a different perspective of the living room 402 than the image 802. The render 1904 of the 3D model in the instance 1902 shows a different angle of the first product to reflect this different perspective of the living room 402. In this way, the instances 1806, 1902 of augmented spatially aware media may allow the user to appreciate the look of the first product within the living room 402 from different viewpoints.

In the instances 1806, 1808, 1902 of augmented spatially aware media, the first and second products are generally depicted at the same position within the living room 402. This position includes a particular point on the surface 506 of the living room 402 shown in FIG. 5 and a particular orientation relative to the surface 506 and to the other 3D spatial features of the living room 402. In some implementations, the position for the 3D models of the first and second product in the living room 402 is automatically generated in step 1708 of the method 1700. The user of the user device 1800 might not provide any instruction that indicates a position for the 3D models. In other words, the instances 1806, 1808, 1902 of augmented spatially aware media may be provided without any user input beyond generating and transmitting the search query.

In some implementations, an ML model that is specific to a type of object matching the first and second products is used to determine the position of the 3D models in the living room 402. Such an ML model may be specific to vases, for example. Through training, the ML model may correlate user-defined positions for 3D models of vases to surfaces that are similar to the surface 506, resulting in the ML model recommending the surface 506 for the 3D models of the first and second product. The ML model may also or instead be specific to the spatially aware media for the living room 402 or to a type of real-world space that matches the living room 402.

Figure 20:
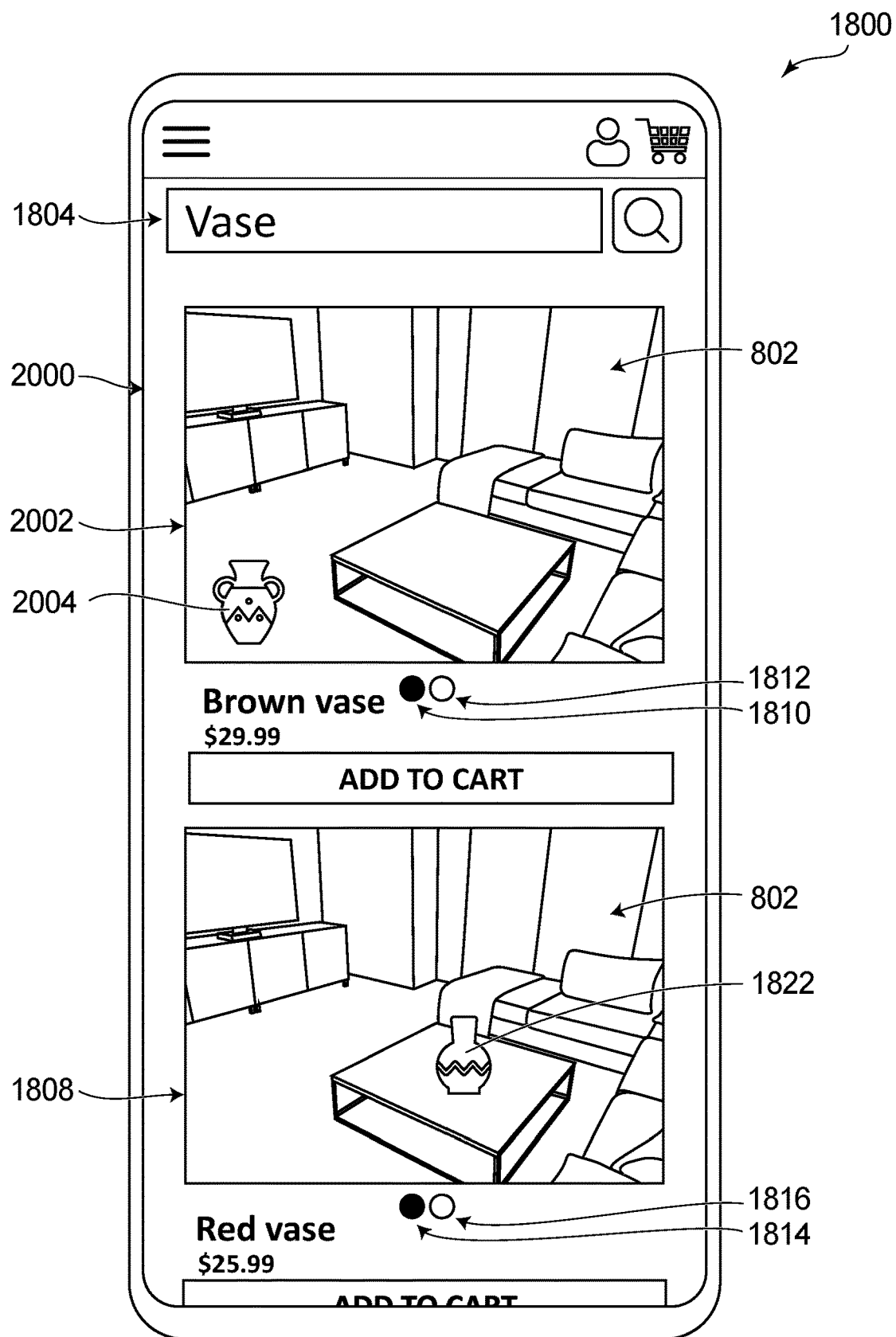

Although the first and second products might correspond to the same type of product in some cases, the first and second products could still be suited to different positions in the living room 402. FIG. 20 illustrates the user device 1800 displaying yet another screen page 2000 of the online store. The screen page 2000 generally corresponds to the screen page 1802, but with an instance 2002 of augmented spatially aware media included in place of the instance 1806. The instance 2002 includes the image 802 of the living room 402 and a render 2004 of the first product. The render 2004 depicts the first product at a position on the surface 500 of the living room 402 shown in FIG. 5, which generally corresponds to the floor of the living room 402. Notably, the position of the first product depicted by the render 2004 is different from the position of the second product depicted by the render 1822 in the instance 1808.

The different positions for the first and second products in the instances 1808, 2002 may have been obtained by independently determining each position. In one example, an ML model that is specific to the first product is used to generate the position shown in the instance 2002. This ML model may correlate user-defined positions for the first product to surfaces that are similar to the surface 500. For example, users may frequently place 3D models of the first product on a surface corresponding to the floor of a real-world space. A different ML model that is specific to the second product may be used to generate the position shown in the instance 1808.

In another example, a single ML model that is specific to the living room 402, or to living rooms in general, may be used to recommend the positions for both the first and second products. This ML model may receive information about the first and second products as inputs, which results in the ML model recommending different positions for the first and second products. For example, the size, weight, color and/or tags of the first and second products may differ, which when input into the ML model result in different recommended positions.

Figure 21:
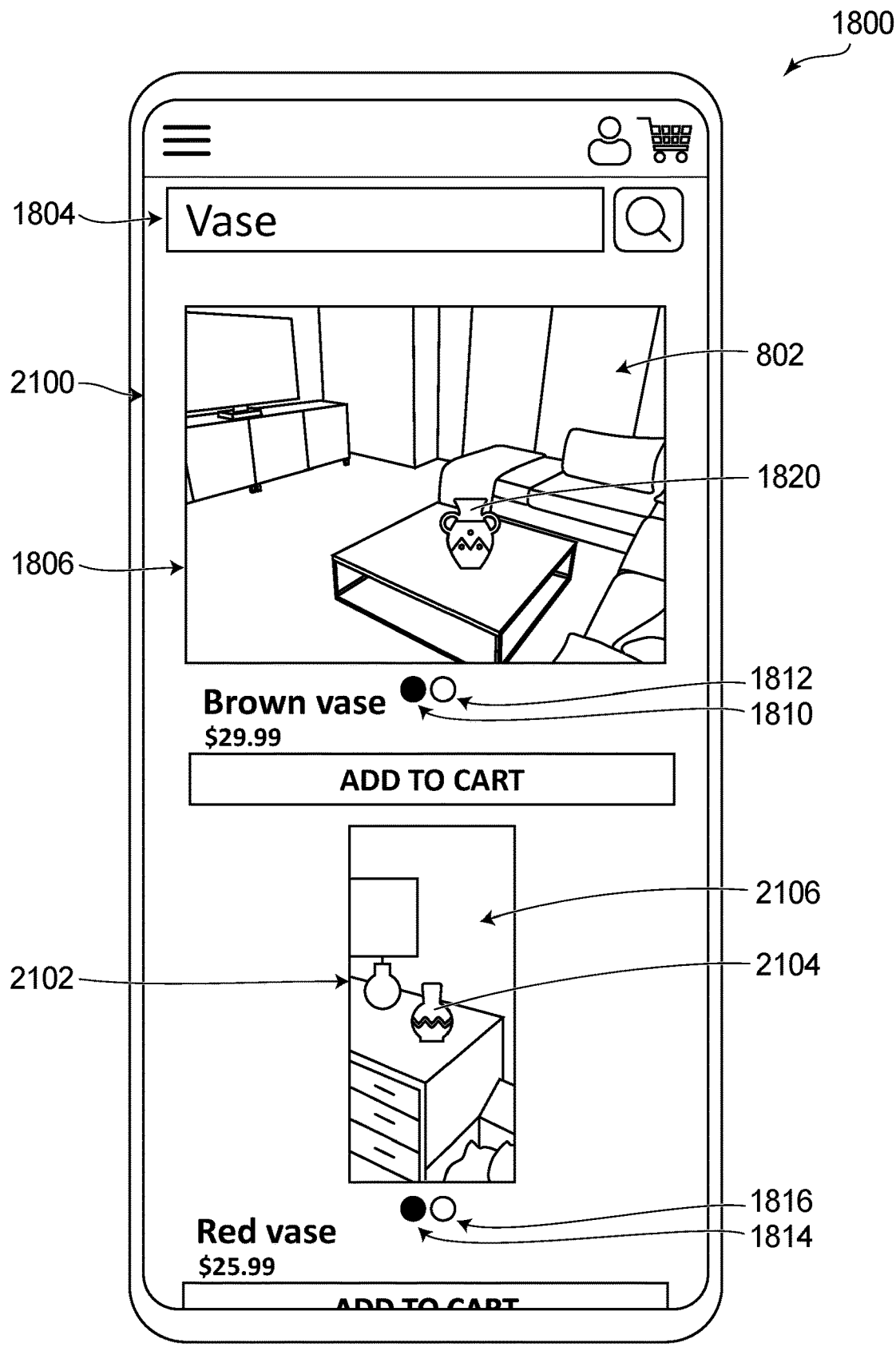

In some implementations, the first and second product might not be presented using the same spatially aware media. FIG. 21 illustrates the user device 1800 displaying a further screen page 2100 of the online store. The screen page 2100 generally corresponds to the screen page 1802, but with an instance 2102 of augmented spatially aware media included in place of the instance 1808. The instance 2102 includes a render 2104 of the 3D model of the second product overlaid onto an image 2106 of a real-world office space. This office space is different from the living room 402 associated with the instance 1806, but may still be personal to the user of the user device 1800. For example, the office space may correspond to the user's workplace.

In some implementations, the spatially aware media corresponding to the living room 402 is automatically selected to display the first product and the spatially aware media corresponding to the office space is automatically selected to display the second product. For example, one or more ML models might be implemented to determine suitable spatially aware media in which to present first and second products. The output of the ML models may suggest that the first product be displayed in a living room and the second product be displayed in an office. The instances 1806, 2102 may then be generated based on these suggestions. This might help depict the first and second product in suitable real-world environments, allowing the user to view realistic settings for the first and second products.

In some implementations, the determined position for the second product in the office space may correspond to a position of a real-world object that is in the office space. This real-world object may be identified as a movable 3D spatial feature by the spatially aware media for the office space. Therefore, the instance 2102 may have removed this 3D spatial feature from the image 2106 to show the render 2104 of the 3D model of the second product in its place. Further, the moveable 3D spatial feature may include a tag that relates to the search query "Vase". Based on this tag, a spatially aware media engine may have determined the position of the movable 3D spatial feature to be a suitable position for the second product. By way of example, the office space may include a real-world flowerpot which is identified as a moveable 3D feature by the spatially aware media for the office space. The flowerpot may further be tagged as a "vase" by the spatially aware media. Based on the tag and the flowerpot being identified as a moveable 3D feature, a spatially aware media engine may have recommended the position of the flowerpot as a position for the second product. As such, the flowerpot is removed in the instance 2102 and the render 2104 of the 3D model of the second product provided in its place.

CONCLUSION

Although the present invention has been described with reference to specific features and embodiments thereof, various modifications and combinations can be made thereto without departing from the invention. The description and drawings are, accordingly, to be regarded simply as an illustration of some embodiments of the invention as defined by the appended claims, and are contemplated to cover any and all modifications, variations, combinations or equivalents that fall within the scope of the present invention. Therefore, although the present invention and its advantages have been described in detail, various changes, substitutions and alterations can be made herein without departing from the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

Moreover, any module, component, or device exemplified herein that executes instructions may include or otherwise have access to a non-transitory computer/processor readable storage medium or media for storage of information, such as computer/processor readable instructions, data structures, program modules, and/or other data. A non-exhaustive list of examples of non-transitory computer/processor readable storage media includes magnetic cassettes, magnetic tape, magnetic disk storage or other magnetic storage devices, optical disks such as compact disc read-only memory (CD-ROM), digital video discs or digital versatile disc (DVDs), Blu-ray Disc™, or other optical storage, volatile and non-volatile, removable and non-removable media implemented in any method or technology, random-access memory (RAM), read-only memory (ROM), electrically erasable programmable read-only memory (EEPROM), flash memory or other memory technology. Any such non-transitory computer/processor storage media may be part of a device or accessible or connectable thereto. Any application or module herein described may be implemented using computer/processor readable/executable instructions that may be stored or otherwise held by such non-transitory computer/processor readable storage media.

The invention claimed is:

1. A computer-implemented method comprising:
obtaining a three-dimensional (3D) model of a product;
obtaining stored media including: a first image of a real-world space from a first perspective, a second image of the real-world space from a different second perspective, and information identifying 3D spatial features of the real-world space;
generating a first instance of augmented media including the first image of the real-world space from the first perspective overlaid with a first render of the 3D model defined relative to the 3D spatial features of the real-world space, the first render of the 3D model showing a first portion of the product and not a second portion of the product;
generating a second instance of augmented media including the second image of the real-world space from the second perspective overlaid with a different second render of the 3D model defined relative to the 3D spatial features of the real-world space, the second render of the 3D model showing the second portion of the product; and
outputting both the first instance of augmented media and the second instance of augmented media for simultaneous display on a device.

2. The computer-implemented method of claim 1, wherein the first render of the 3D model and the second render of the 3D model are both at a same position relative to the 3D spatial features of the real-world space.

3. The computer-implemented method of claim 2, wherein the position is a recommended position for the 3D model relative to the 3D spatial features of the real-world space, and wherein the method further comprises determining the recommended position.

4. The computer-implemented method of claim 3, wherein the recommended position is based on at least one of: the first image, the second image, or the 3D model.

5. The computer-implemented method of claim 1, wherein the first image of the real-world space and the second image of the real-world space have a mapping to a 3D scan of the real-world space associated with the information identifying the 3D spatial features of the real-world space.

6. The computer-implemented method of claim 1, further comprising receiving an instruction to move the 3D model to a new position, and in response updating both the first instance of augmented media and the second instance of augmented media to render the 3D model at the new position in both the first instance of augmented media and the second instance of augmented media.

7. The computer-implemented method of claim 1, further comprising obtaining results of a search query, and obtaining the 3D model based on the results of the search query.

8. The computer-implemented method of claim 7, further comprising selecting spatially aware media based on a search string or a search result associated with the search query, wherein the spatially aware media comprises the first image, the second image, and the information identifying the 3D spatial features of the real-world space.

9. The computer-implemented method of claim 2, wherein the 3D model is a first 3D model, and wherein the method further comprises obtaining a different second 3D model and updating both the first instance of augmented media and the second instance of augmented media to render the second 3D model instead of the first 3D model in both the first instance of augmented media and the second instance of augmented media.

10. The computer-implemented method of claim 9, wherein the render of the second 3D model is at the same position relative to the 3D spatial features of the real-world space.

11. A system comprising:
at least one processor; and
a memory storing processor-executable instructions that, when executed by the at least one processor, cause the system to:
  obtain a three-dimensional (3D) model of a product;
  obtain stored media including: a first image of a real-world space from a first perspective, a second image of the real-world space from a different second perspective, and information identifying 3D spatial features of the real-world space;
  generate a first instance of augmented media including the first image of the real-world space from the first perspective overlaid with a first render of the 3D model defined relative to the 3D spatial features of the real-world space, the first render of the 3D model showing a first portion of the product and not a second portion of the product;
  generate a second instance of augmented media including the second image of the real-world space from the second perspective overlaid with a different second render of the 3D model defined relative to the 3D spatial features of the real-world space, the second render of the 3D model showing the second portion of the product; and
  output both the first instance of augmented media and the second instance of augmented media for simultaneous display on a device.

12. The system of claim 11, wherein the first render of the 3D model and the second render of the 3D model are both at a same position relative to the 3D spatial features of the real-world space.

13. The system of claim 12, wherein the position is a recommended position for the 3D model relative to the 3D spatial features of the real-world space, and wherein the processor-executable instructions, when executed, further cause the system to determine the recommended position.

14. The system of claim 13, wherein the recommended position is based on at least one of: the first image, the second image, or the 3D model.

15. The system of claim 11, wherein the first image of the real-world space and the second image of the real-world space have a mapping to a 3D scan of the real-world space associated with the information identifying the 3D spatial features of the real-world space.

16. The system of claim 11, wherein the processor-executable instructions, when executed, further cause the system to receive an instruction to move the 3D model to a new position, and in response update both the first instance of augmented media and the second instance of augmented media to render the 3D model at the new position in both the first instance of augmented media and the second instance of augmented media.

17. The system of claim 11, wherein the processor-executable instructions, when executed, further cause the system to obtain results of a search query, and obtain the 3D model based on the results of the search query.

18. The system of claim 17, wherein the processor-executable instructions, when executed, further cause the system to select spatially aware media based on a search string or a search result associated with the search query, wherein the spatially aware media comprises the first image, the second image, and the information identifying the 3D spatial features of the real-world space.

19. The system of claim 12, wherein the 3D model is a first 3D model, and wherein the processor-executable instructions, when executed, further cause the system to obtain a different second 3D model and update both the first instance of augmented media and the second instance of augmented media to render the second 3D model instead of the first 3D model in both the first instance of augmented media and the second instance of augmented media.

20. A non-transitory computer-readable medium having stored thereon computer-executable instructions that, when executed by a computer, cause the computer to the perform operations comprising:
  obtaining a three-dimensional (3D) model of a product;
  obtaining stored media including: a first image of a real-world space from a first perspective, a second image of the real-world space from a different second perspective, and information identifying 3D spatial features of the real-world space;
  generating a first instance of augmented media including the first image of the real-world space from the first perspective overlaid with a first render of the 3D model defined relative to the 3D spatial features of the real-world space, the first render of the 3D model showing a first portion of the product and not a second portion of the product;
  generating a second instance of augmented media including the second image of the real-world space from the second perspective overlaid with a different second render of the 3D model defined relative to the 3D spatial features of the real-world space, the second render of the 3D model showing the second portion of the product; and
  outputting both the first instance of augmented media and the second instance of augmented media for simultaneous display on a device.

* * * * *